(12) United States Patent
Nag et al.

(10) Patent No.: US 11,037,058 B2
(45) Date of Patent: Jun. 15, 2021

(54) TRANSFERABLE TRAINING FOR AUTOMATED REINFORCEMENT-LEARNING-BASED APPLICATION-MANAGERS

(71) Applicant: VMware, Inc., Palo Alto, CA (US)

(72) Inventors: Dev Nag, Palo Alto, CA (US); Yanislav Yankov, Palo Alto, CA (US); Dongni Wang, Palo Alto, CA (US); Gregory T. Burk, Colorado Springs, CO (US); Nicholas Mark Grant Stephen, Paris (FR)

(73) Assignee: VMware, Inc., Palo Alto, CA (US)

( * ) Notice: Subject to any disclaimer, the term of this patent is extended or adjusted under 35 U.S.C. 154(b) by 148 days.

(21) Appl. No.: 16/518,831

(22) Filed: Jul. 22, 2019

(65) Prior Publication Data

US 2020/0065670 A1    Feb. 27, 2020

Related U.S. Application Data

(63) Continuation-in-part of application No. 16/261,253, filed on Jan. 29, 2019, now Pat. No. 10,802,864.

(60) Provisional application No. 62/723,388, filed on Aug. 27, 2018.

(51) Int. Cl.
| | |
|---|---|
| *G06N 20/00* | (2019.01) |
| *G06F 9/455* | (2018.01) |
| *G06N 5/04* | (2006.01) |
| *G06N 3/08* | (2006.01) |
| *G06F 9/30* | (2018.01) |
| *G06K 9/62* | (2006.01) |
| *G06N 3/04* | (2006.01) |

(52) U.S. Cl.
CPC ........... *G06N 3/08* (2013.01); *G06F 9/30036* (2013.01); *G06K 9/6259* (2013.01); *G06N 3/0472* (2013.01)

(58) Field of Classification Search
USPC ............................................................ 718/1
See application file for complete search history.

(56) References Cited

U.S. PATENT DOCUMENTS

| | | | | |
|---|---|---|---|---|
| 10,802,864 | B2* | 10/2020 | Nag | G06F 9/4843 |
| 2007/0203871 | A1* | 8/2007 | Tesauro | G06N 3/006 |
| | | | | 706/53 |
| 2009/0012922 | A1* | 1/2009 | Tesauro | G06Q 10/06 |
| | | | | 706/12 |

(Continued)

OTHER PUBLICATIONS

Tasauro, Reinforcement Learning in Autonomic Computing, 2007, IEEE, pp. 22-30. (Year: 2007).*

*Primary Examiner* — John Q Chavis

(57) ABSTRACT

The current document is directed to transfer of training received by a first automated reinforcement-learning-based application manager while controlling a first application is transferred to a second automated reinforcement-learning-based application manager which controls a second application different from the first application. Transferable training provides a basis for automated generation of applications from application components. Transferable training is obtained from composition of applications from application components and composition of reinforcement-learning-based-control-and-learning constructs from reinforcement-learning-based-control-and-learning constructs of application components.

21 Claims, 54 Drawing Sheets

(56) References Cited

U.S. PATENT DOCUMENTS

| | | | |
|---|---|---|---|
| 2020/0065156 A1* | 2/2020 | Nag | .................. G06N 20/00 |
| 2020/0065157 A1* | 2/2020 | Nag | .................. G06N 3/08 |
| 2020/0065702 A1* | 2/2020 | Nag | .................. G06N 5/043 |
| 2020/0065703 A1* | 2/2020 | Nag | .................. G06F 9/542 |

* cited by examiner addVirtualServer ("Rochester", data_center4, , memory:20GB, processors:48, storage:6TB)

~ 2730

Actions

| 635 | addServers | DataCenter | 4 | addVirtualServer |
|---|---|---|---|---|

| 635 | 1 | constInteger | number of servers |
|---|---|---|---|
| 635 | 1 | constInteger | number of servers |
| 635 | 1 | constInteger | number of servers |
| 635 | 1 | constInteger | number of servers |

| 635 | 1 | 1 |
|---|---|---|

2732

| addServer |
|---|
| Rochester |
| 4 |
| 1 |
| 20 |
| 48 |
| 6000 |

2734

→ addServers (1, 20, 48, 6000) sent to "Rochester.4"

~ 2736

{635, "Rochester", 4, 20, 48, 6000}

2802 — $V^\pi(s) = E_\pi\{Rt \mid s_t = s\} = E_\pi\{\sum_{k=0}^{\infty} \gamma^k r_{t+k+1} \mid s_t = s\}$ 2804 — $Q^\pi(s,a) = E_\pi\{Rt \mid s_t = s_1 a_t = a\} = E_\pi\{\sum_{k=0}^{\infty} \gamma^k r_{t+k+1} \mid s_t = s_1 a_t = a\}$ 2805 — $P_{ss'}^a = Pr\{s_{t+1} = s' \mid s_t = s_1 a_t = a\}$ 2806 — $R_{ss'}^a = E\{r_{t+1} \mid s_t = s_1 a_t = a_1 s_{t+1} = s'\}$ 2807 — $V^\pi(s) = \sum_a \pi(s,a) \sum_{s'} P_{ss'}[R_{ss'} + \gamma V^\pi(s')]$ 2808 $\begin{cases} V^*(s) = \max_\pi V^\pi(s) \\ Q^*(s,a) = \max_\pi Q^\pi(s,a) \\ Q^*(s,a) = E\{r_{t+1} \gamma V^*(s_{t+1}) \mid s_t = s_1 a_t = a\} \end{cases}$ 2809 $\begin{cases} \pi(s): r = \text{rand}(\,); \\ \quad \begin{cases} r < \epsilon, a = \text{avgmax}_{a \in A} Q(s,a) \\ \text{otherwise, randomly select a from A} \end{cases} \end{cases}$

FIG. 28

TRANSFERABLE TRAINING FOR AUTOMATED REINFORCEMENT-LEARNING-BASED APPLICATION-MANAGERS

CROSS-REFERENCE TO RELATED APPLICATIONS

This application is a continuation-in-part of application Ser. No. 16/261,253, filed Jan. 29, 2019, which claims the benefit of Provisional Application No. 62/723,388, filed Aug. 27, 2018.

TECHNICAL FIELD

The current document is directed to standalone, networked, and distributed computer systems, to system management and, in particular, to an automated reinforcement-learning-based application manager to which training gained by operation of a different automated reinforcement-learning-based application manager is transferred.

BACKGROUND

During the past seven decades, electronic computing has evolved from primitive, vacuum-tube-based computer systems, initially developed during the 1940s, to modern electronic computing systems in which large numbers of multiprocessor servers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems are made possible by advances in computer networking, distributed operating systems and applications, data-storage appliances, computer hardware, and software technologies. However, despite all of these advances, the rapid increase in the size and complexity of computing systems has been accompanied by numerous scaling issues and technical challenges, including technical challenges associated with communications overheads encountered in parallelizing computational tasks among multiple processors, component failures, and distributed-system management. As new distributed-computing technologies are developed, and as general hardware and software technologies continue to advance, the current trend towards ever-larger and more complex distributed computing systems appears likely to continue well into the future.

As the complexity of distributed computing systems has increased, the management and administration of distributed computing systems has, in turn, become increasingly complex, involving greater computational overheads and significant inefficiencies and deficiencies. In fact, many desired management-and-administration functionalities are becoming sufficiently complex to render traditional approaches to the design and implementation of automated management and administration systems impractical, from a time and cost standpoint, and even from a feasibility standpoint. Therefore, designers and developers of various types of automated management and control systems related to distributed computing systems are seeking alternative design-and-implementation methodologies, including machine-learning-based approaches. The application of machine-learning technologies to the management of complex computational environments is still in early stages, but promises to expand the practically achievable feature sets of automated administration-and-management systems, decrease development costs, and provide a basis for more effective optimization Of course, administration-and-management control systems developed for distributed computer systems can often be applied to administer and manage standalone computer systems and individual, networked computer systems.

SUMMARY

The current document is directed to transfer of training received by a first automated reinforcement-learning-based application manager while controlling a first application is transferred to a second automated reinforcement-learning-based application manager which controls a second application different from the first application. Transferable training provides a basis for automated generation of applications from application components. Transferable training is obtained from composition of applications from application components and composition of reinforcement-learning-based-control-and-learning constructs from reinforcement-learning-based-control-and-learning constructs of application components.

BRIEF DESCRIPTION OF THE DRAWINGS

In FIG. 9, three different physical data centers 902-904 are shown below planes representing the cloud-director layer of abstraction 906-908.

FIGS. 27A-B illustrate one example of a data representation of actions and metrics.

FIG. 28 provides numerous expressions that indicate a generic implementation of several different types of value functions and an $\epsilon$-greedy policy.

DETAILED DESCRIPTION

Figure 1:
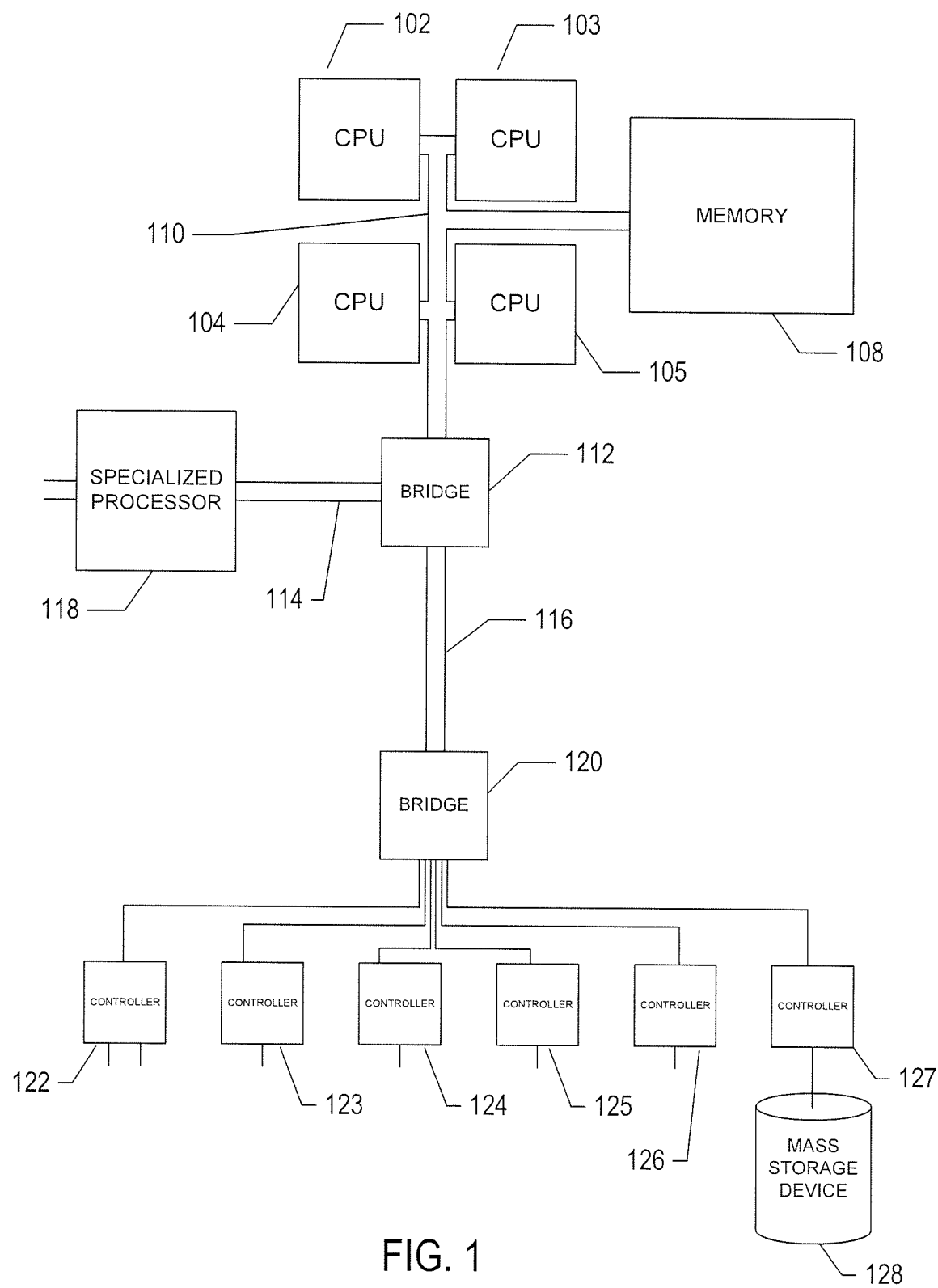
FIG. 1 provides a general architectural diagram for various types of computers.

The current document is directed to the transfer of training from one automated reinforcement-learning-based application manager to another. In a first subsection, below, a detailed description of computer hardware, complex computational systems, and virtualization is provided with reference to FIGS. 1-11. In a second subsection, application management and reinforcement learning are discussed with reference to FIGS. 11-25. In a third subsection, control and learning processes of reinforcement-learning-based application manager are discussed with reference to FIGS. 26-29B. In a fourth subsection, implementations of the currently disclosed automated reinforcement-learning-based application manager that can receive training obtained by operation of one or more different automated reinforcement-learning-based application managers are discussed with reference to FIGS. 32-40.

Computer Hardware, Complex Computational Systems, Virtualization, and Generation of Status, Informational, and Error Data The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
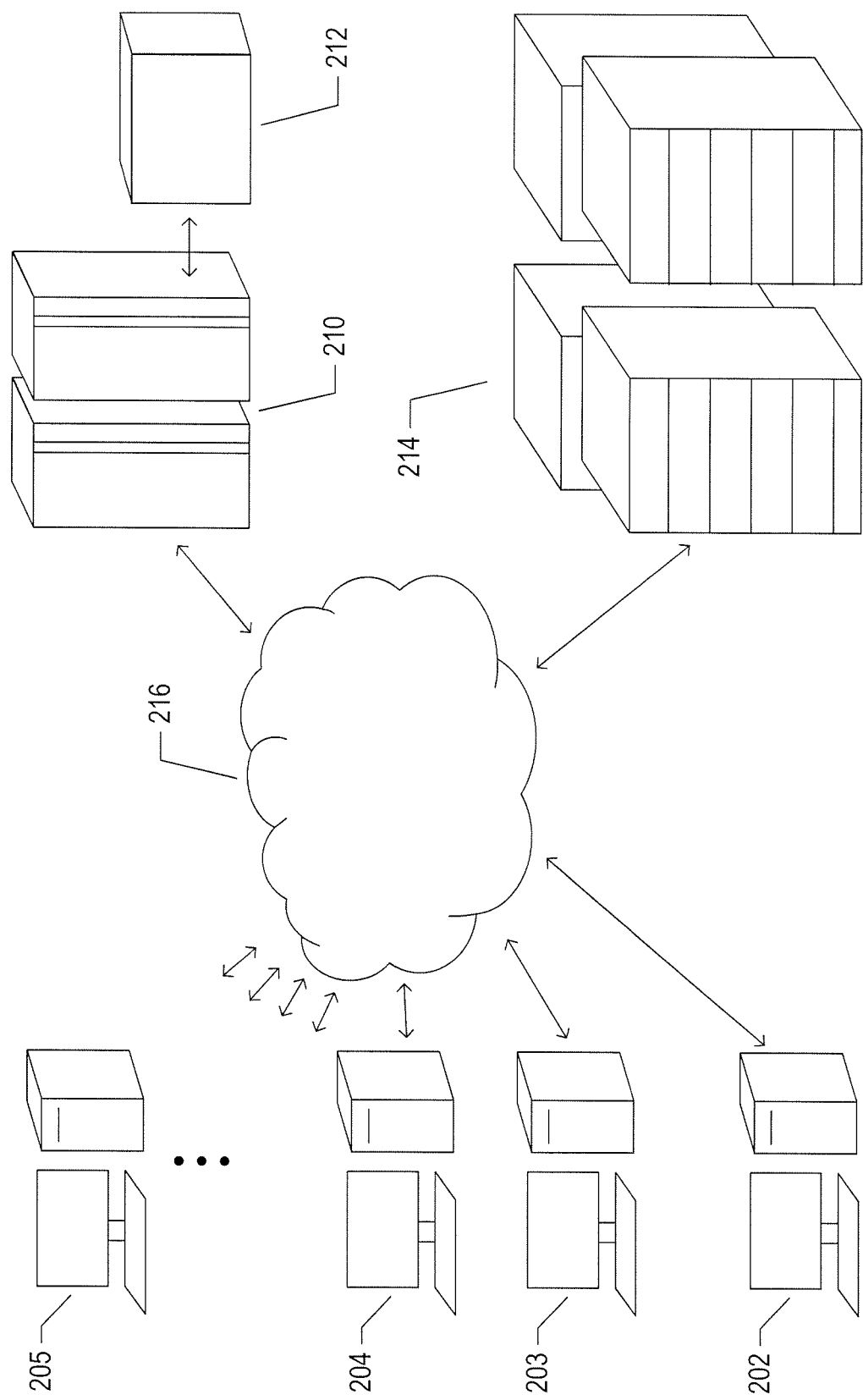
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
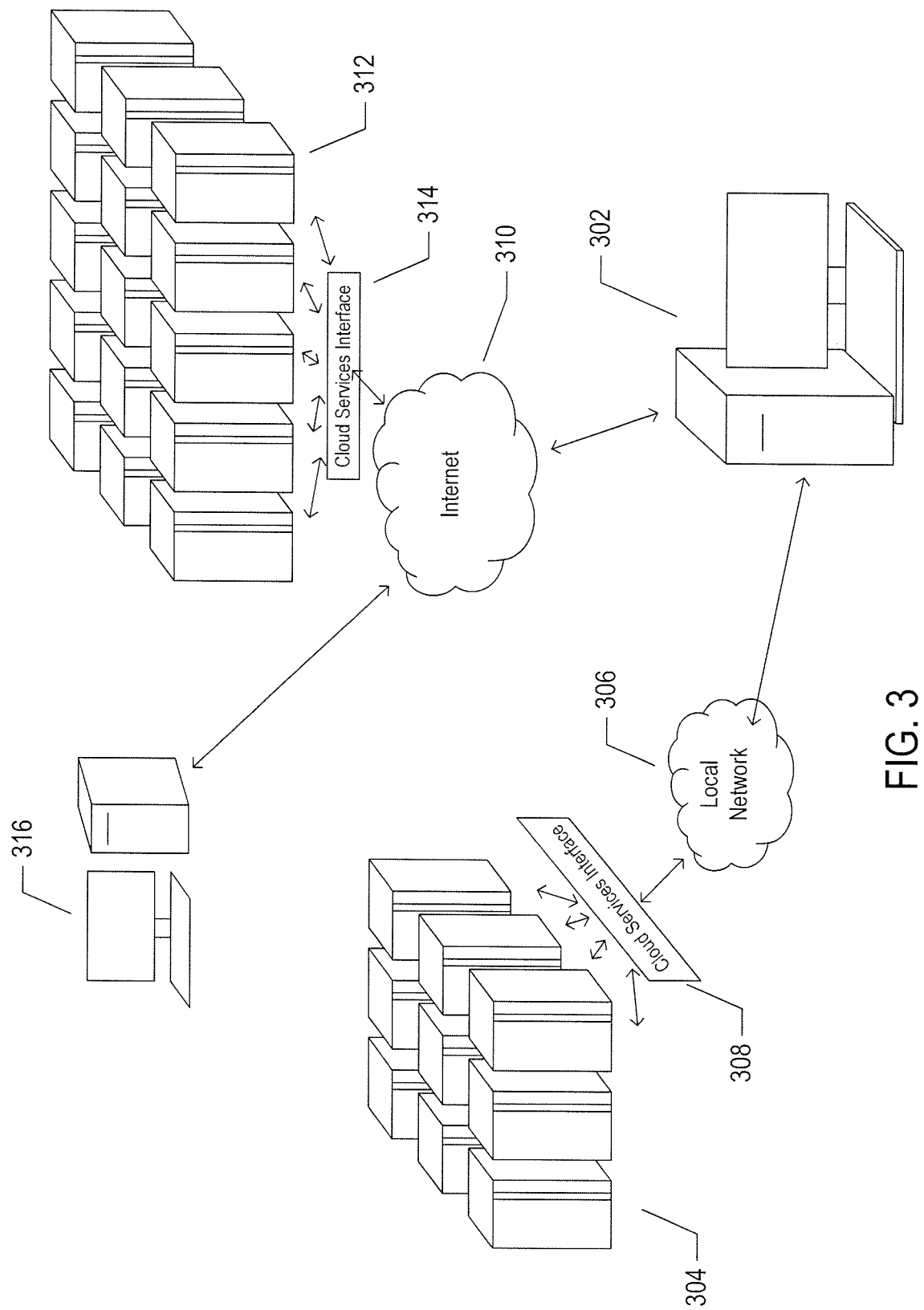
FIG. 3 illustrates cloud computing. In the recently developed cloud-computing paradigm, computing cycles and data-storage facilities are provided to organizations and individuals by cloud-computing providers.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
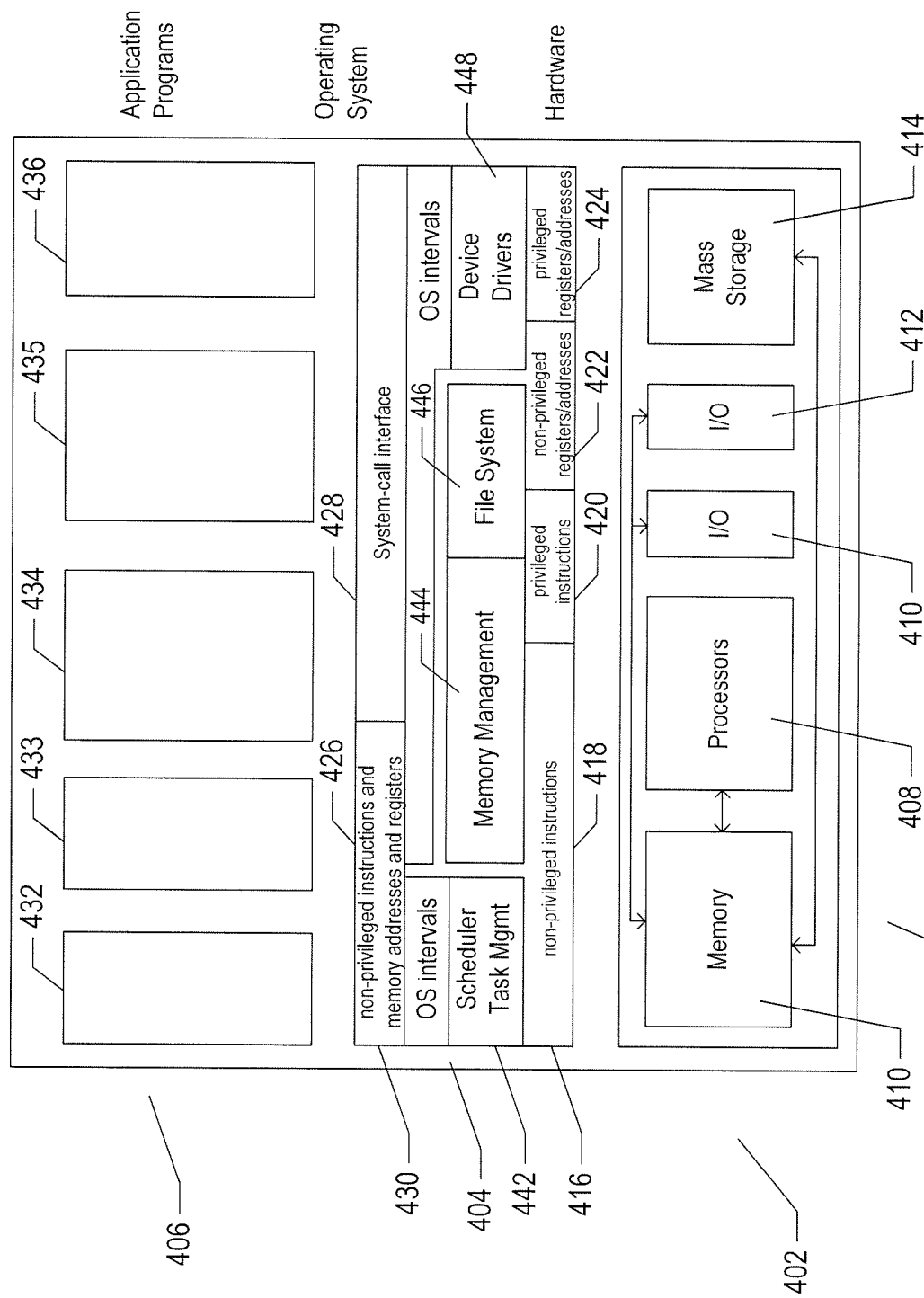
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
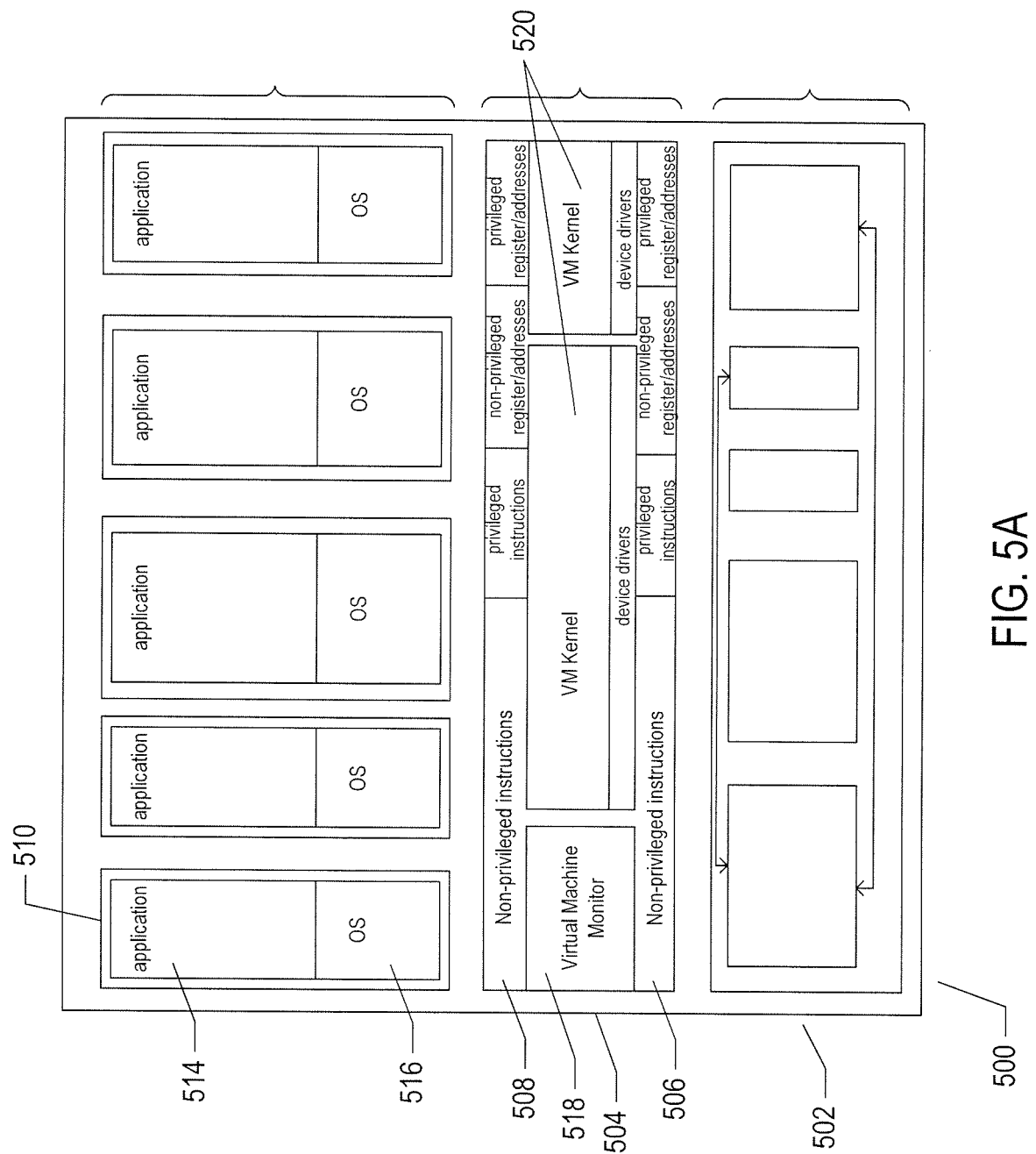
FIGS. 5A-B illustrate two types of virtual machine and virtual-machine execution environments.
Figure 5B:
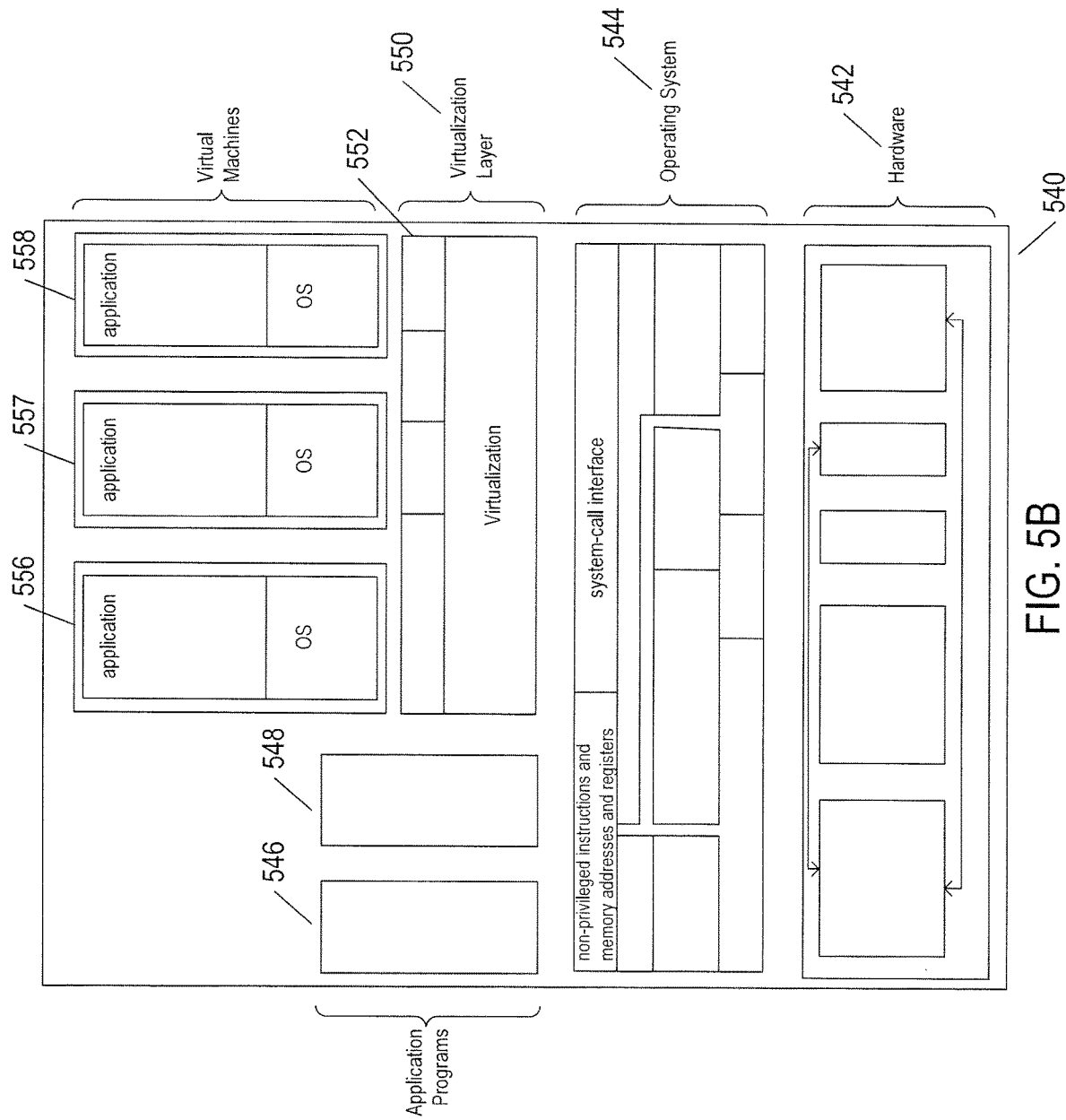

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-B illustrate two types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

In FIGS. 5A-B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
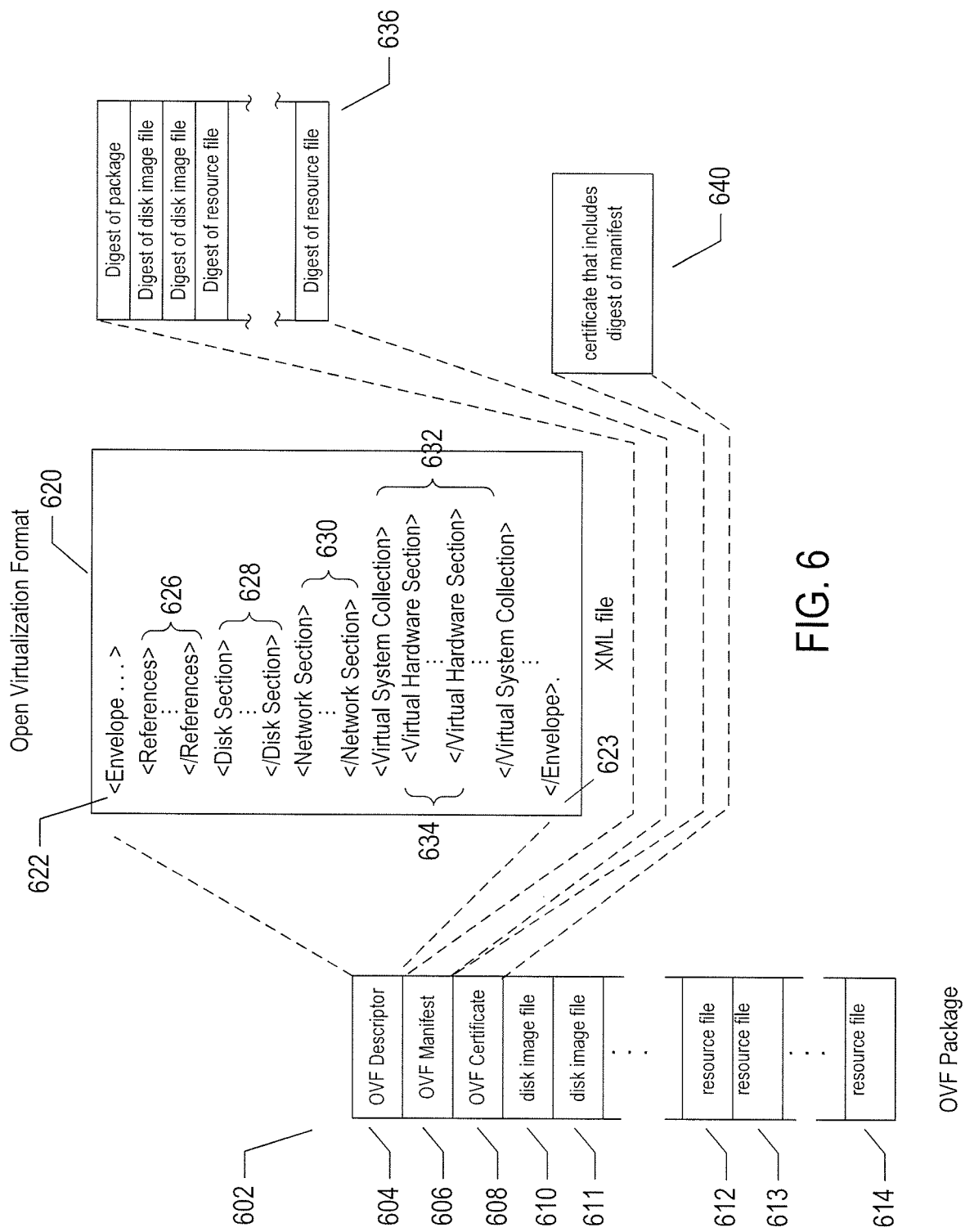
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
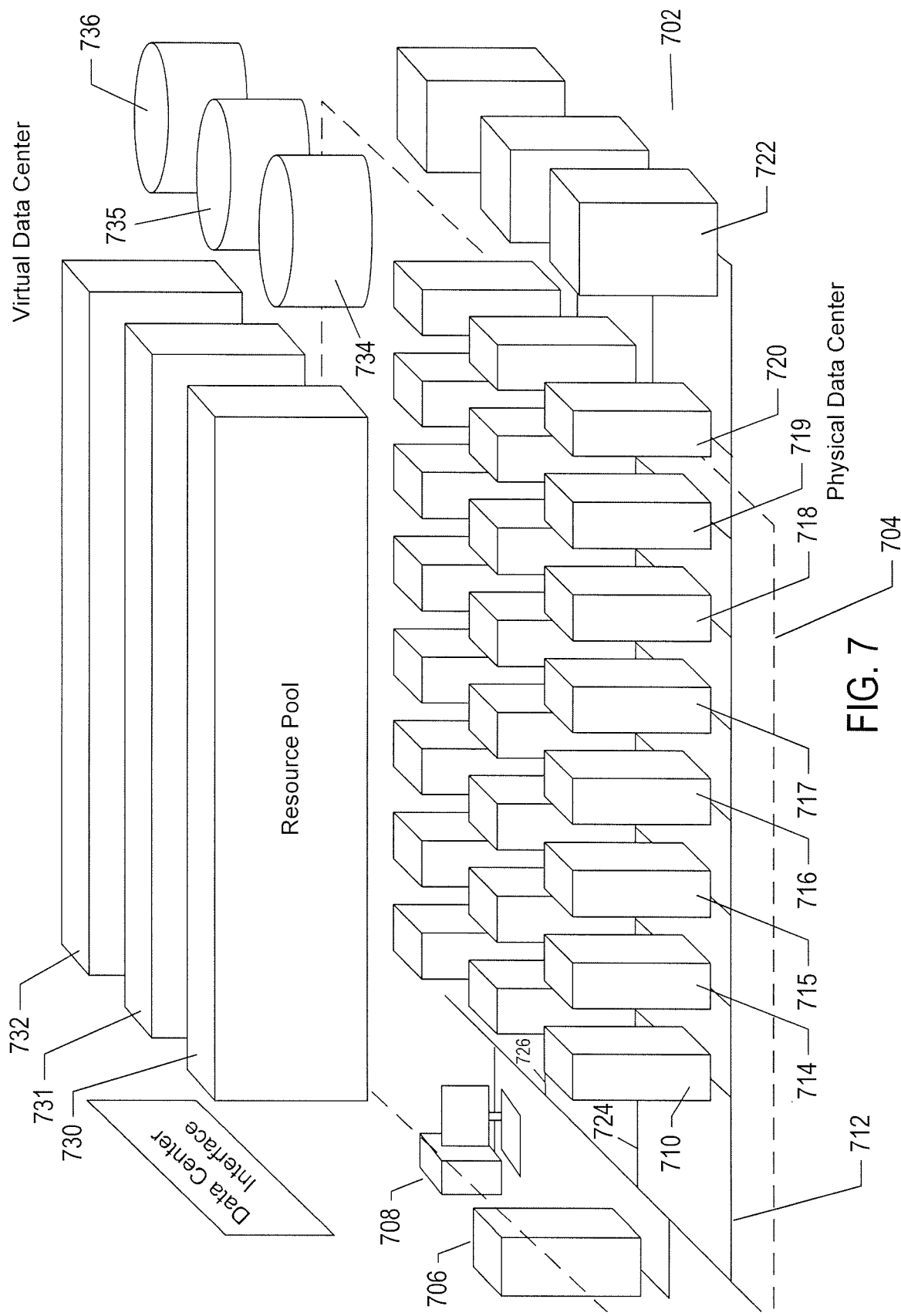
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-data-center management server 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

Figure 8:
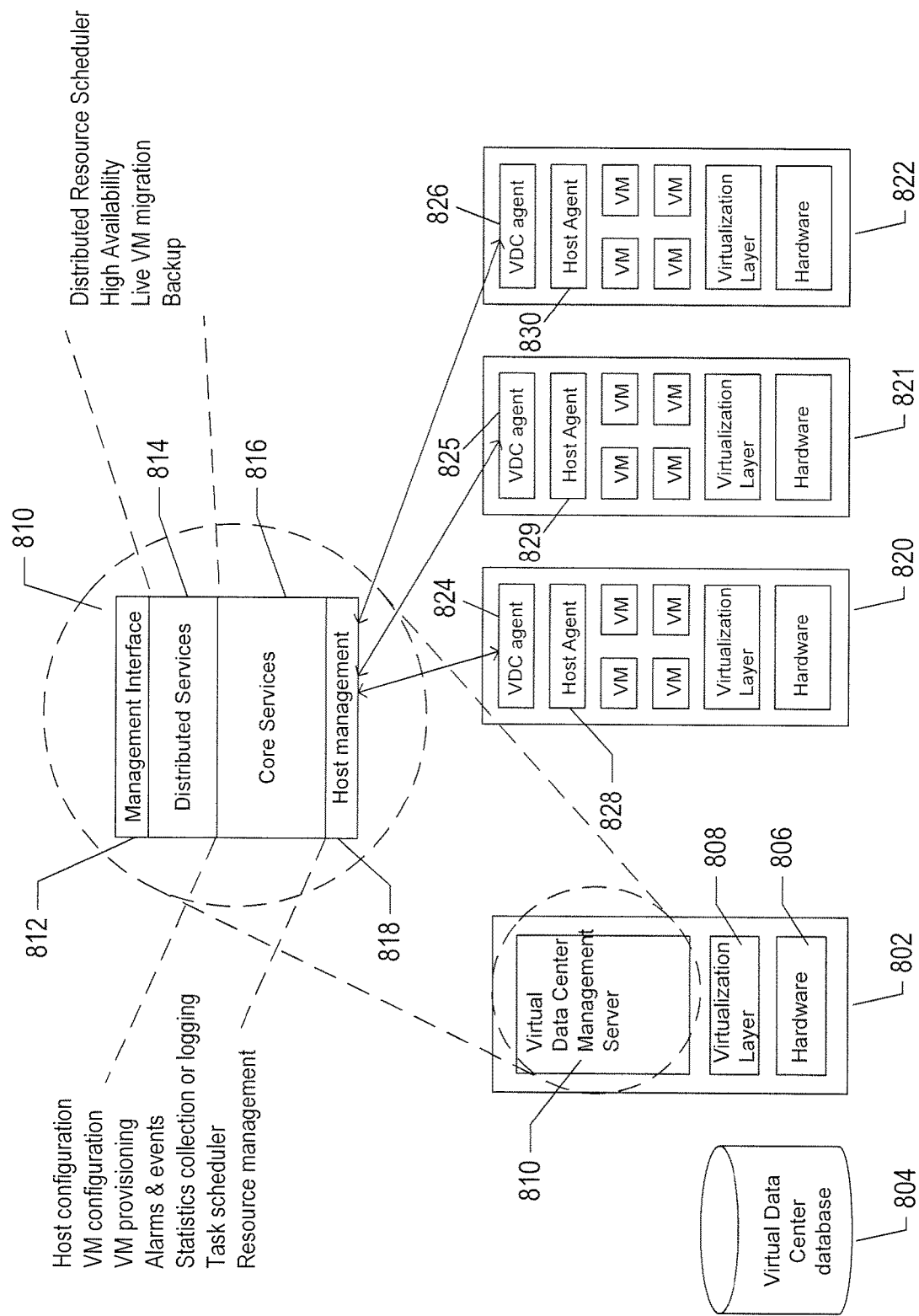
FIG. 8 illustrates virtual-machine components of a virtual-data-center management server and physical servers of a physical data center above which a virtual-data-center interface is provided by the virtual-data-center management server.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the virtual-data-center management server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability. FIG. 8 illustrates virtual-machine components of a virtual-data-center management server and physical servers of a physical data center above which a virtual-data-center interface is provided by the virtual-data-center management server. The virtual-data-center management server 802 and a virtual-data-center database 804 comprise the physical components of the management component of the virtual data center. The virtual-data-center management server 802 includes a hardware layer 806 and virtualization layer 808, and runs a virtual-data-center management-server virtual machine 810 above the virtualization layer. Although shown as a single server in FIG. 8, the virtual-data-center management server ("VDC management server") may include two or more physical server computers that support multiple VDC-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VDC management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VDC management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for off-loading certain of the virtual-data-center management-server functions specific to a particular physical server to that physical server. The virtual-data-center agents relay and enforce resource allocations made by the VDC management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
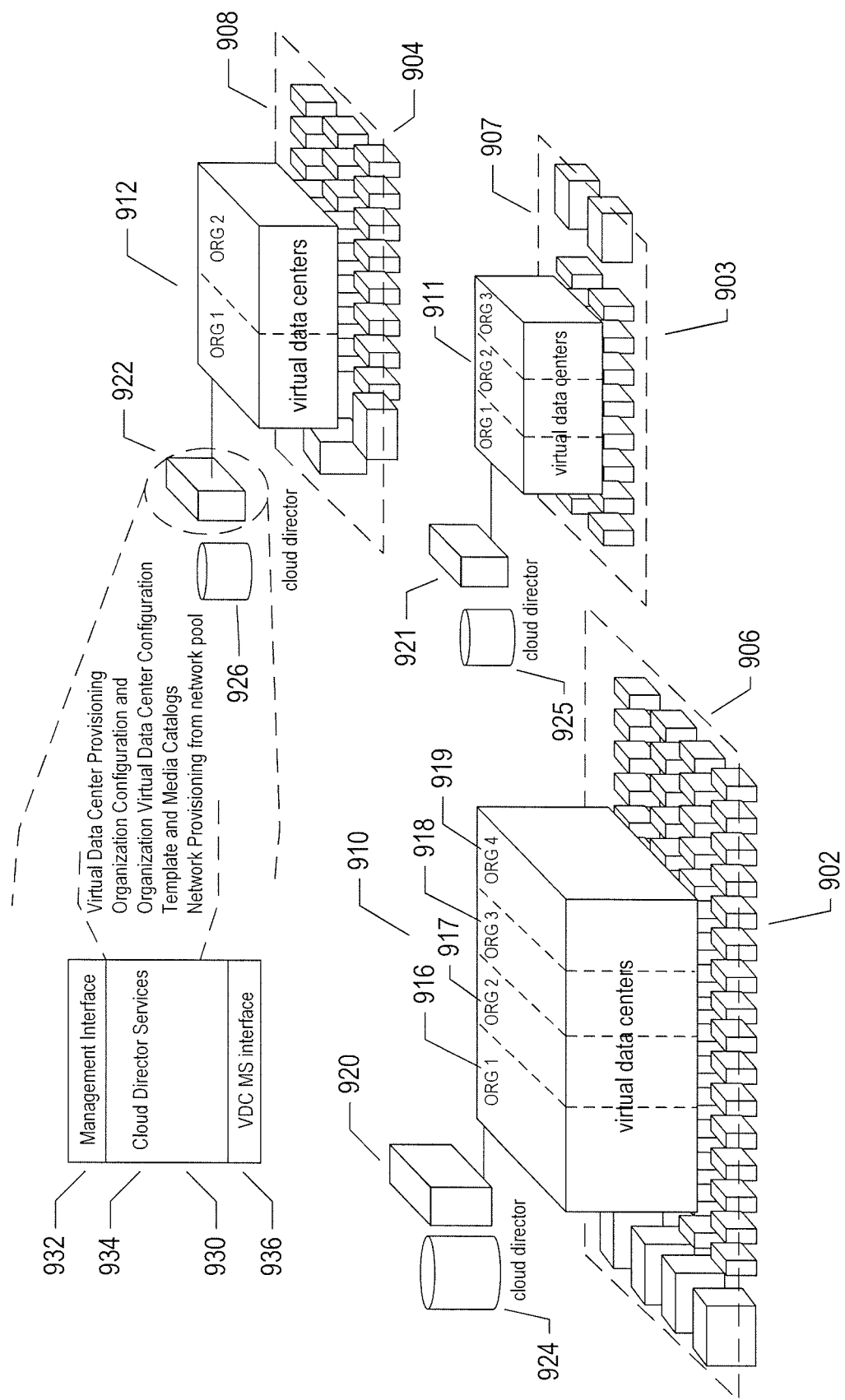
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
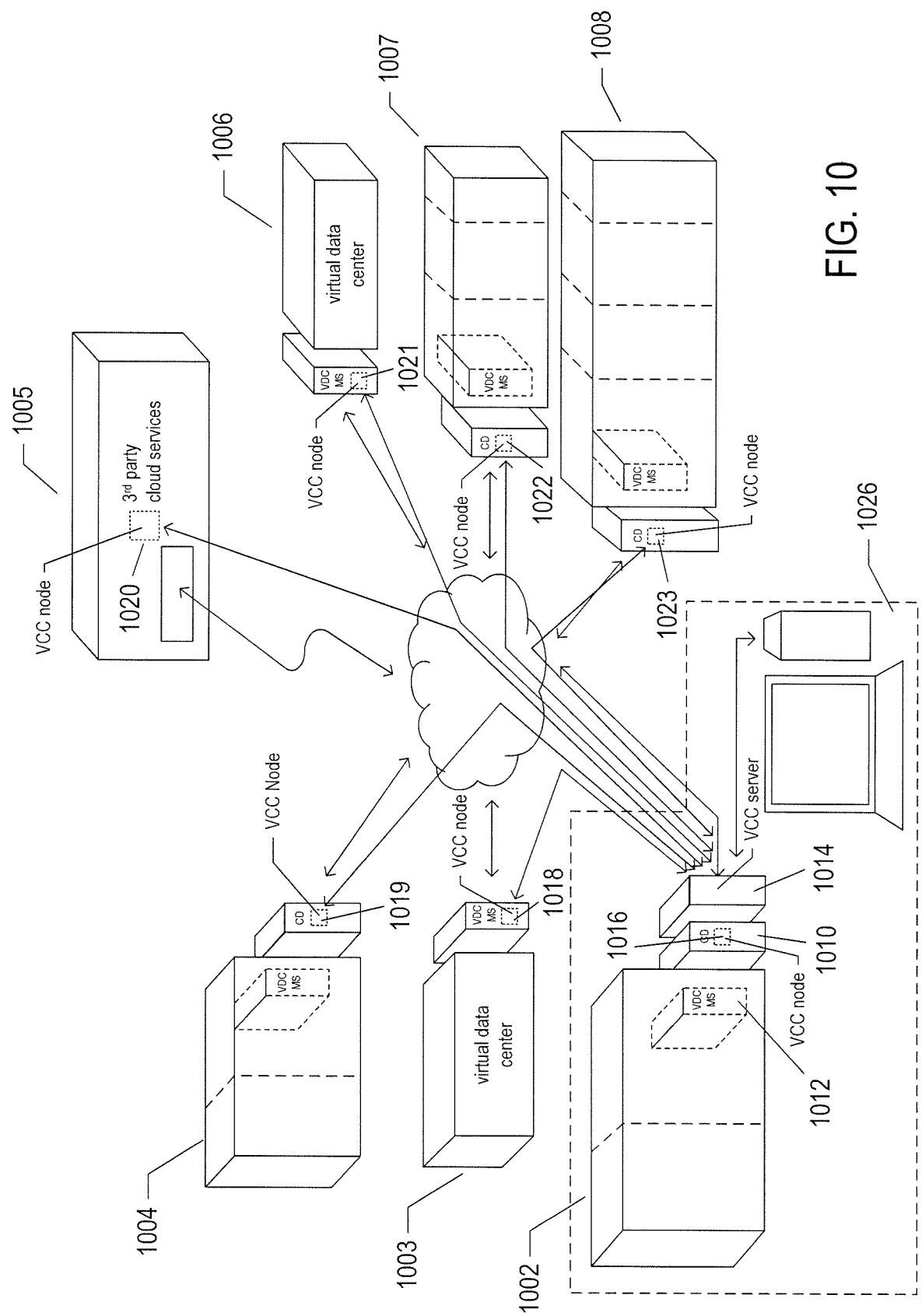
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Application Management and Reinforcement Learning

Figure 11A:
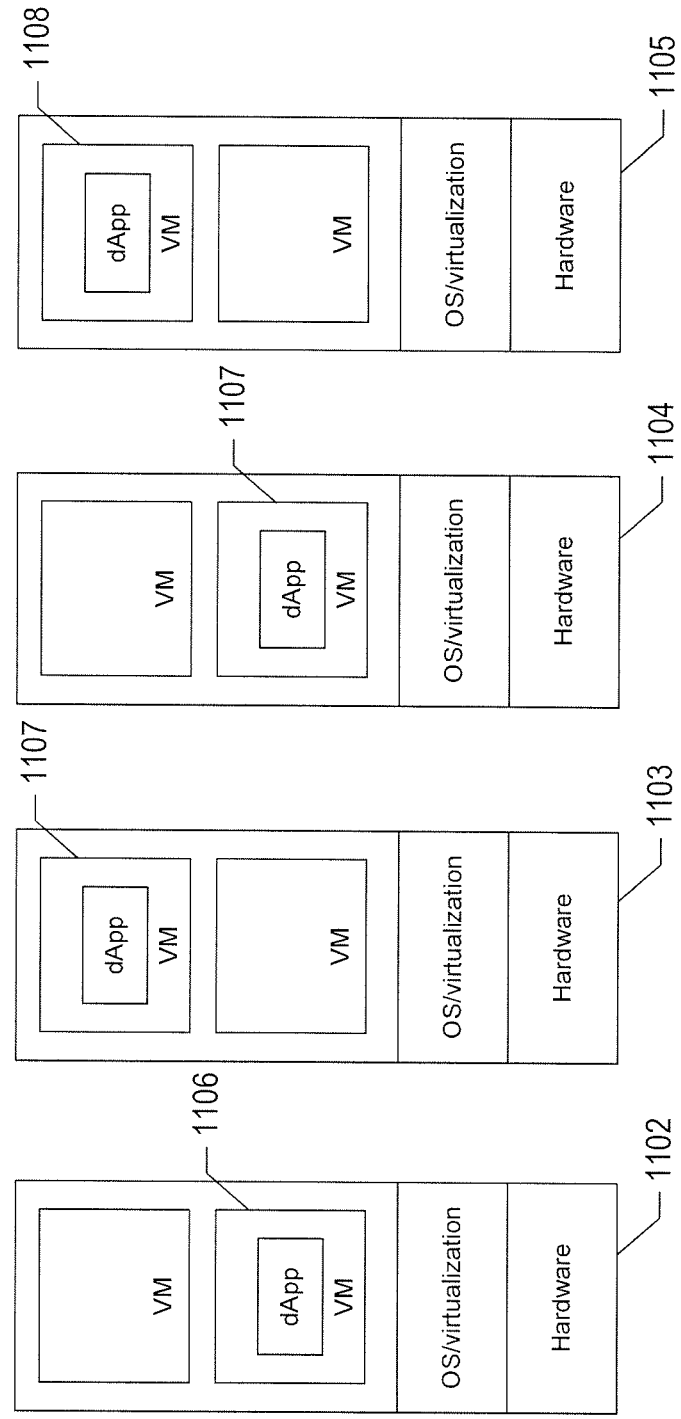
FIGS. 11A-C illustrate an application manager.
Figure 11B:
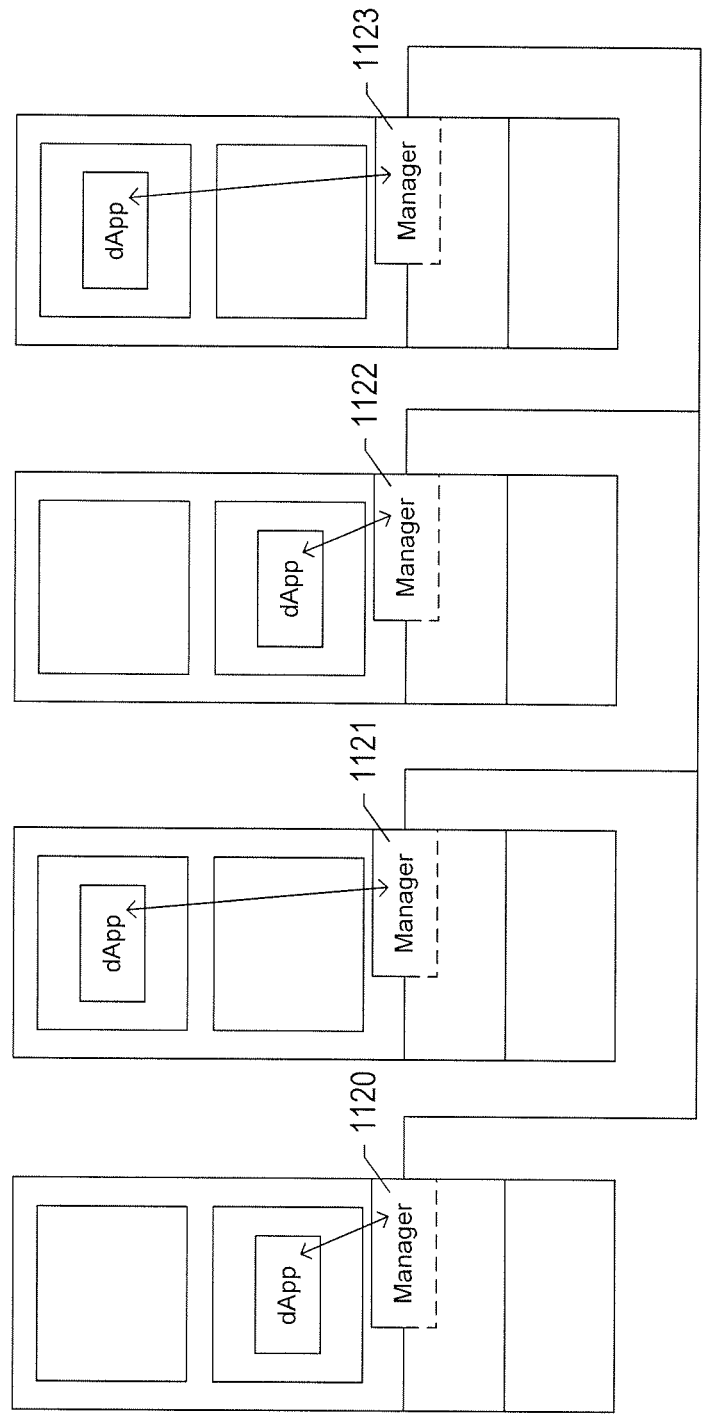
Figure 11C:
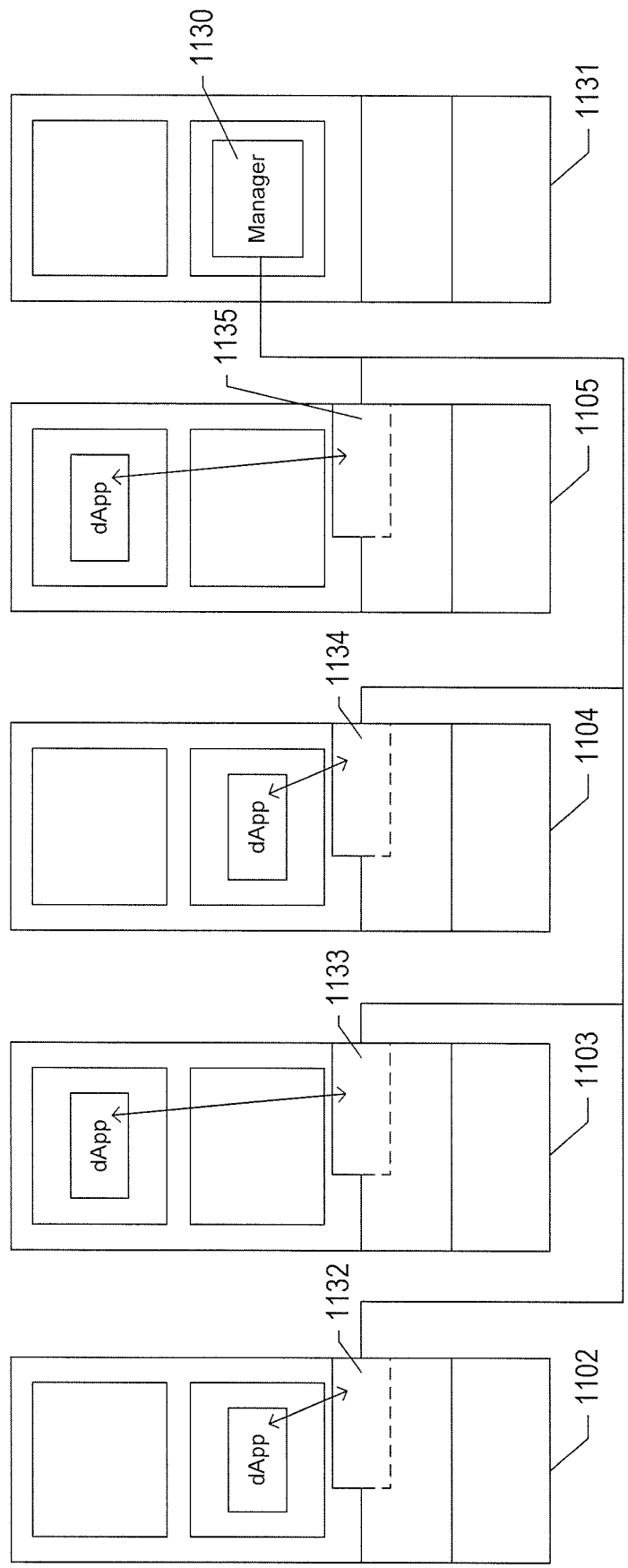

FIGS. 11A-C illustrate an application manager. All three figures use the same illustration conventions, next described with reference to FIG. 11A. The distributed computing system is represented, in FIG. 11A, by four servers 1102-1105 that each support execution of a virtual machine, 1106-1108 respectively, that provides an execution environment for a local instance of the distributed application. Of course, in real-life cloud-computing environments, a particular distributed application may run on many tens to hundreds of individual physical servers. Such distributed applications often require fairly continuous administration and management. For example, instances of the distributed application may need to be launched or terminated, depending on current computational loads, and may be frequently relocated to different physical servers and even to different cloud-computing facilities in order to take advantage of favorable pricing for virtual-machine execution, to obtain necessary computational throughput, and to minimize networking latencies. Initially, management of distributed applications as well as the management of multiple, different applications executing on behalf of a client or client organization of one or more cloud-computing facilities was carried out manually through various management interfaces provided by cloud-computing facilities and distributed-computer data centers. However, as the complexity of distributed-computing environments has increased and as the numbers and complexities of applications concurrently executed by clients and client organizations have increased, efforts have been undertaken to develop automated application managers for automatically monitoring and managing applications on behalf of clients and client organizations of cloud-computing facilities and distributed-computer-system-based data centers.

As shown in FIG. 11B, one approach to automated management of applications within distributed computer systems is to include, in each physical server on which one or more of the managed applications executes, a local instance of the distributed application manager 1120-1123. The local instances of the distributed application manager cooperate, in peer-to-peer fashion, to manage a set of one or more applications, including distributed applications, on behalf of a client or client organization of the data center or cloud-computing facility. Another approach, as shown in FIG. 11C, is to run a centralized or centralized-distributed application manager 1130 on one or more physical servers 1131 that communicates with application-manager agents 1132-1135 on the servers 1102-1105 to support control and management of the managed applications. In certain cases, application-management facilities may be incorporated within the various types of management servers that manage virtual data centers and aggregations of virtual data centers discussed in the previous subsection of the current document. The phrase "application manager" means, in this document, an automated controller than controls and manages applications programs and the computational environment in which they execute. Thus, an application manager may interface to one or more operating systems and virtualization layers, in addition to applications, in various implementations, to control and manage the applications and their computational environments. In certain implementations, an application manager may even control and manage virtual and/or physical components that support the computational environments in which applications execute.

In certain implementations, an application manager is configured to manage applications and their computational environments within one or more distributed computing systems based on a set of one or more policies, each of which may include various rules, parameter values, and other types of specifications of the desired operational characteristics of the applications. As one example, the one or more policies may specify maximum average latencies for responding to user requests, maximum costs for executing virtual machines per hour or per day, and policy-driven approaches to optimizing the cost per transaction and the number of transactions carried out per unit of time. Such overall policies may be implemented by a combination of finer-grain policies, parameterized control programs, and other types of controllers that interface to operating-system and virtualization-layer-management subsystems. However, as the numbers and complexities of applications desired to be managed on behalf of clients and client organizations of data centers and cloud-computing facilities continues to increase, it is becoming increasingly difficult, if not practically impossible, to implement policy-driven application management by manual programming and/or policy construction. As a result, a new approach to application management based on the machine-learning technique referred to as "reinforcement learning" has been undertaken.

Figure 12:
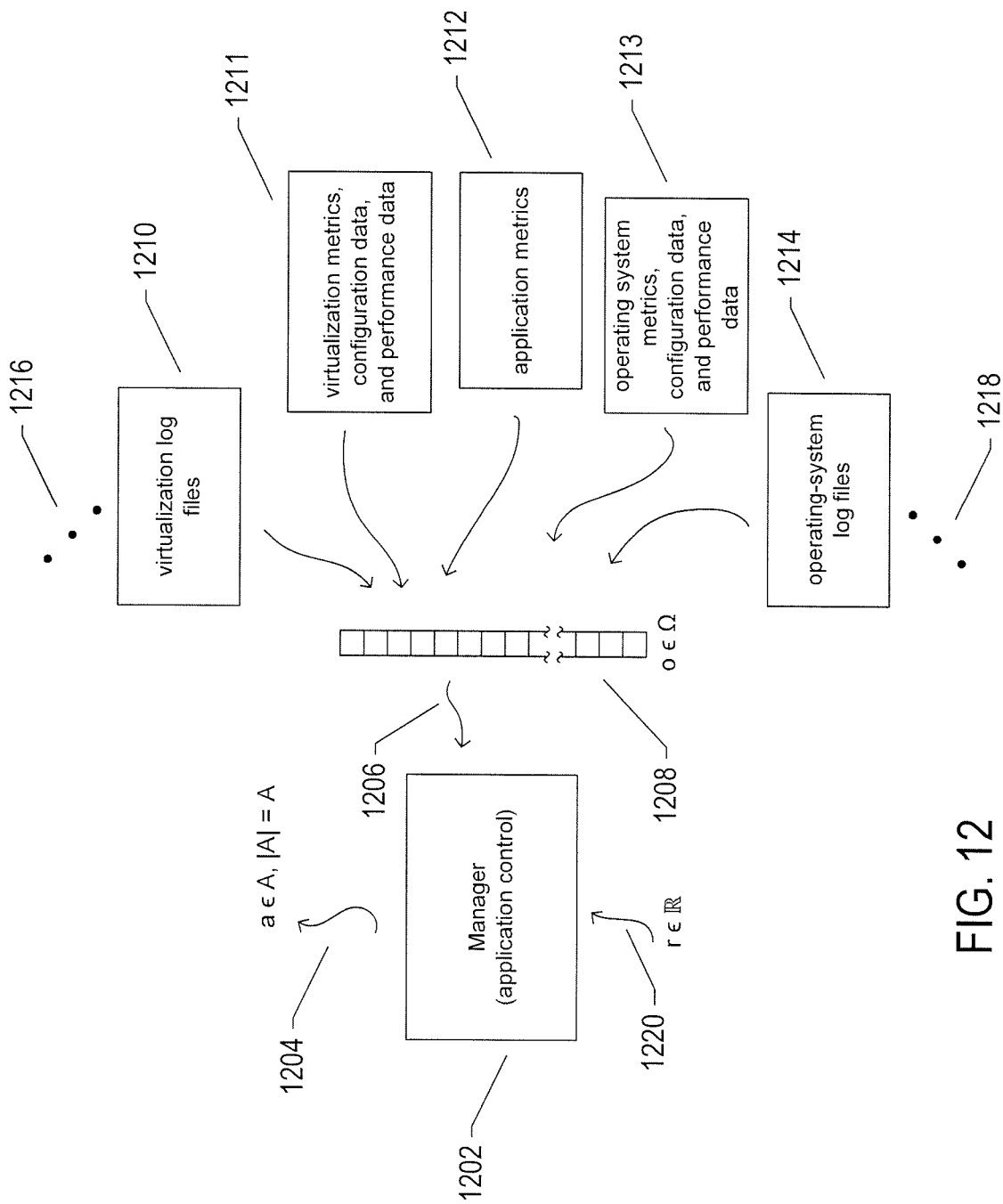
FIG. 12 illustrates, at a high level of abstraction, a reinforcement-learning-based application manager controlling a computational environment, such as a cloud-computing facility.

FIG. 12 illustrates, at a high level of abstraction, a reinforcement-learning-based application manager controlling a computational environment, such as a cloud-computing facility. The reinforcement-learning-based application manager 1202 manages one or more applications by emitting or issuing actions, as indicated by arrow 1204. These actions are selected from a set of actions A of cardinality |A|. Each action a in the set of actions A can be generally thought of as a vector of numeric values that specifies an operation that the manager is directing the environment to carry out. The environment may, in many cases, translate the action into one or more environment-specific operations that can be carried out by the computational environment controlled by the reinforcement-learning-based application manager. It should be noted that the cardinality |A| may be indeterminable, since the numeric values may include real values, and the action space may be therefore effectively continuous or effectively continuous in certain dimensions. The operations represented by actions may be, for example, commands, including command arguments, executed by operating systems, distributed operating systems, virtualization layers, management servers, and other types of control components and subsystems within one or more distributed computing systems or cloud-computing facilities. The reinforcement-learning-based application manager receives observations from the computational environment, as indicated by arrow 1206. Each observation o can be thought of as a vector of numeric values 1208 selected from a set of possible observation vectors $\Omega$. The set $\Omega$ may, of course, be quite large and even practically innumerable. Each element of the observation o represents, in certain implementations, a particular type of metric or observed operational characteristic or parameter, numerically encoded, that is related to the computational environment. The metrics may have discrete values or real values, in various implementations. For example, the metrics or observed operational characteristics may indicate the amount of memory allocated for applications and/or application instances, networking latencies experienced by one or more applications, an indication of the number of instruction-execution cycles carried out on behalf of applications or local-application instances, and many other types of metrics and operational characteristics of the managed applications and the computational environment in which the managed applications run. As shown in FIG. 12, there are many different sources 1210-1214 for the values included in an observation o, including virtualization-layer and operating-system log files 1210 and 1214, virtualization-layer metrics, configuration data, and performance data provided through a virtualization-layer management interface 1211, various types of metrics generated by the managed applications 1212, and operating-system metrics, configuration data, and performance data 1213. Ellipses 1216 and 1218 indicate that there may be many additional sources for observation values. In addition to receiving observation vectors o, the reinforcement-learning-based application manager receives rewards, as indicated by arrow 1220. Each reward is a numeric value that represents the feedback provided by the computational environment to the reinforcement-learning-based application manager after carrying out the most recent action issued by the manager and transitioning to a resultant state, as further discussed below. The reinforcement-learning-based application manager is generally initialized with an initial policy that specifies the actions to be issued in response to received observations and over time, as the application manager interacts with the environment, the application manager adjusts the internally maintained policy according to the rewards received following issuance of each action. In many cases, after a reasonable period of time, a reinforcement-learning-based application manager is able to learn a near-optimal or optimal policy for the environment, such as a set of distributed applications, that it manages. In addition, in the case that the managed environment evolves over time, a reinforcement-learning-based application manager is able to continue to adjust the internally maintained policy in order to track evolution of the managed environment so that, at any given point in time, the internally maintained policy is near-optimal or optimal. In the case of an application manager, the computational environment in which the applications run may evolve through changes to the configuration and components, changes in the computational load experienced by the applications and computational environment, and as a result of many additional changes and forces. The received observations provide the information regarding the managed environment that allows the reinforcement-learning-based application manager to infer the current state of the environment which, in turn, allows the reinforcement-learning-based application manager to issue actions that push the managed environment towards states that, over time, produce the greatest reward feedbacks. Of course, similar reinforcement-learning-based application managers may be employed within standalone computer systems, individual, networked computer systems, various processor-controlled devices, including smart phones, and other devices and systems that run applications.

Figure 13:
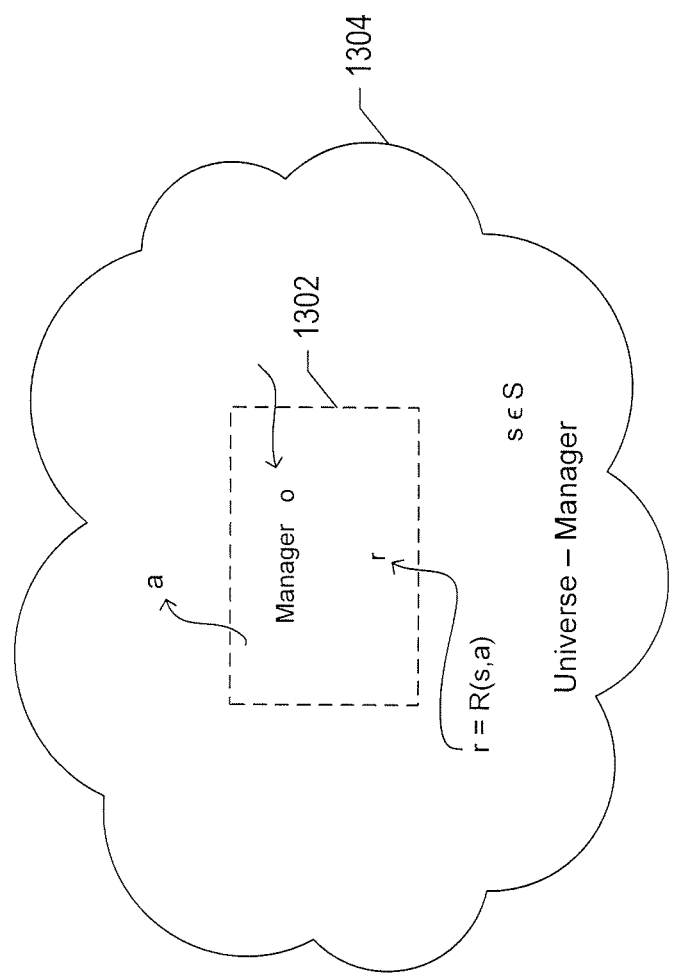
FIG. 13 summarizes the reinforcement-learning-based approach to control.

FIG. 13 summarizes the reinforcement-learning-based approach to control. The manager or controller 1302, referred to as a "reinforcement-learning agent," is contained within, but is distinct and separate from, the universe 1304. Thus, the universe comprises the manager or controller 1302 and the portion of the universe not included in the manager, in set notation referred to as "universe-manager." In the current document, the portion of the universe not included in the manager is referred to as the "environment." In the case of an application manager, the environment includes the managed applications, the physical computational facilities in which they execute, and even generally includes the physical computational facilities in which the manager executes. The rewards are generated by the environment and the reward-generation mechanism cannot be controlled or modified by the manager.

Figure 14A:
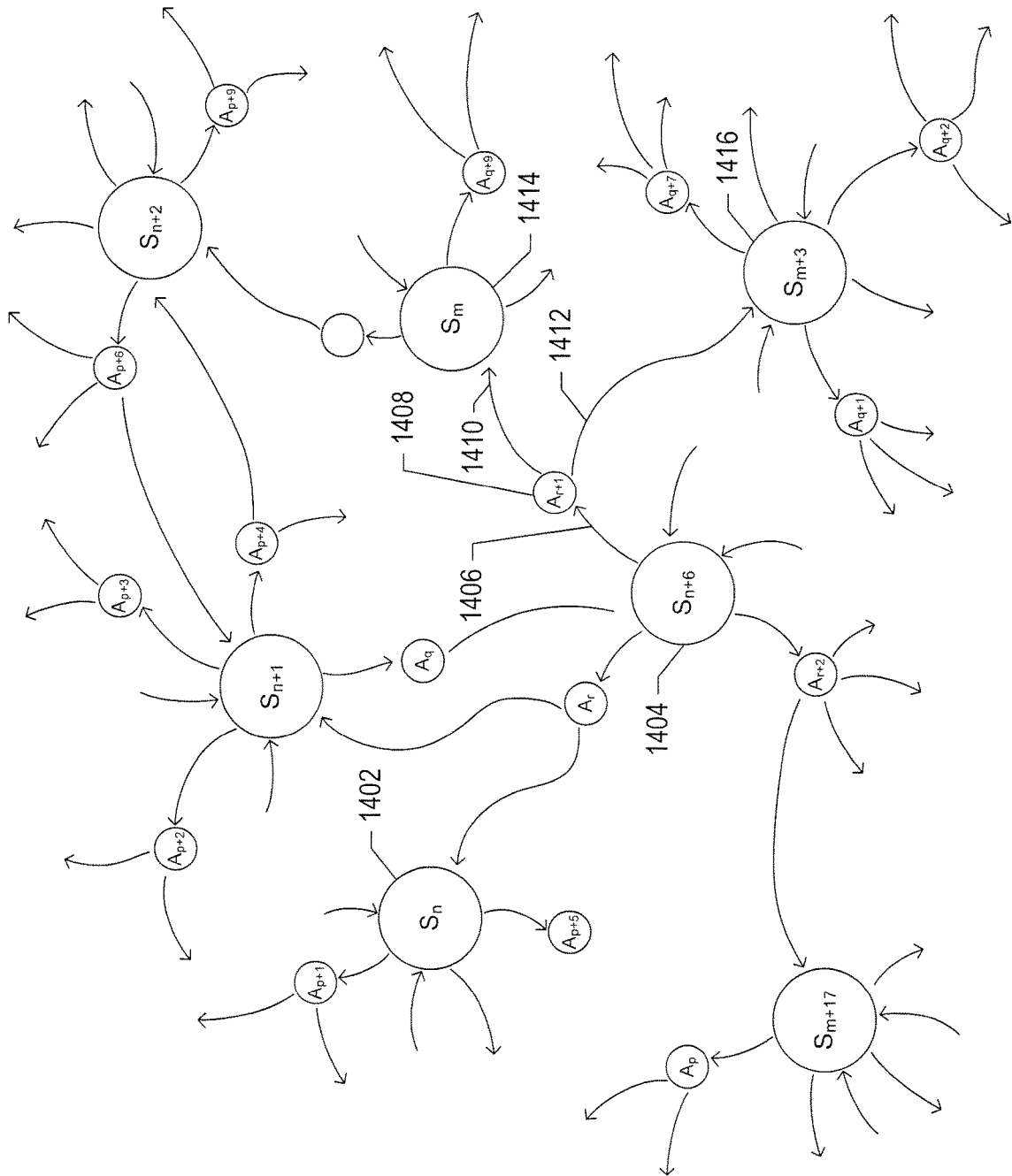
FIGS. 14A-B illustrate states of the environment.
Figure 14B:
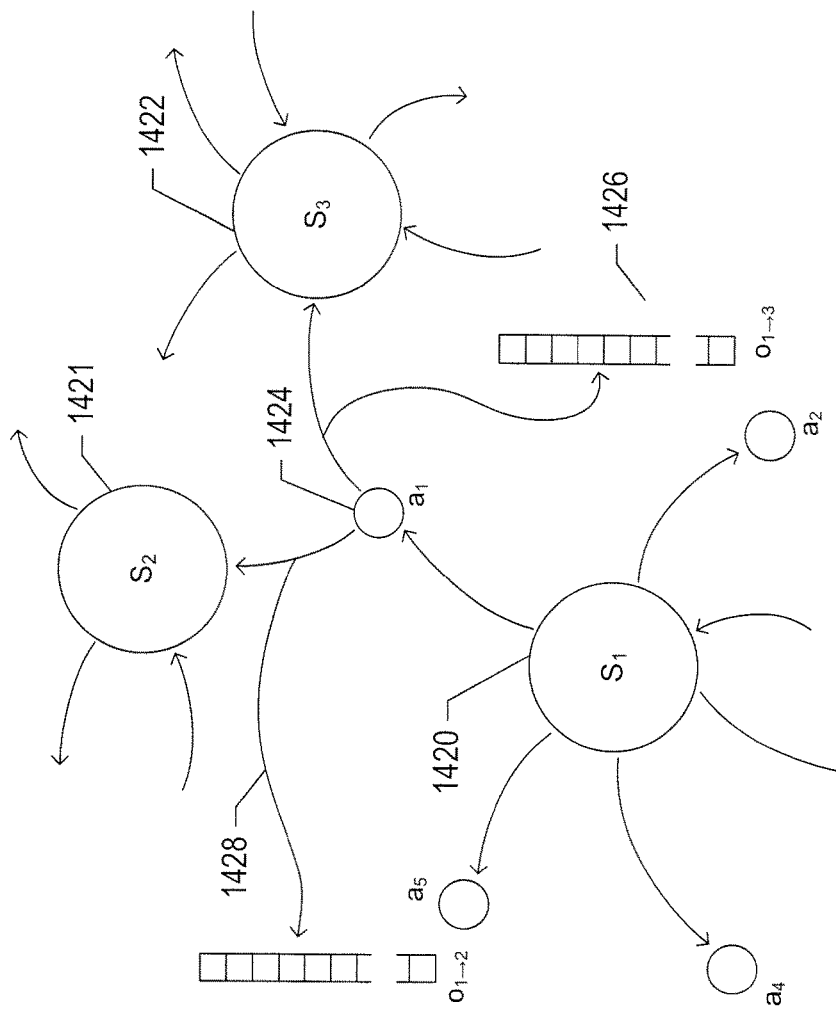

FIGS. 14A-B illustrate states of the environment. In the reinforcement-learning approach, the environment is considered to inhabit a particular state at each point in time. The state may be represented by one or more numeric values or character-string values, but generally is a function of hundreds, thousands, millions, or more different variables. The observations generated by the environment and transmitted to the manager reflect the state of the environment at the time that the observations are made. The possible state transitions can be described by a state-transition diagram for the environment. FIG. 14A illustrates a portion of a state-transition diagram. Each of the states in the portion of the state-transition diagram shown in FIG. 14A are represented by large, labeled disks, such as disc 1402 representing a particular state $S_n$. The transition between one state to another state occurs as a result of an action, emitted by the manager, that is carried out within the environment. Thus, arrows incoming to a given state represent transitions from other states to the given state and arrows outgoing from the given state represent transitions from the given state to other states. For example, one transition from state 1404, labeled $S_{n+6}$, is represented by outgoing arrow 1406. The head of this arrow points to a smaller disc that represents a particular action 1408. This action node is labeled $A_{r+1}$. The labels for the states and actions may have many different forms, in different types of illustrations, but are essentially unique identifiers for the corresponding states and actions. The fact that outgoing arrow 1406 terminates in action 1408 indicates that transition 1406 occurs upon carrying out of action 1408 within the environment when the environment is in state 1404. Outgoing arrows 1410 and 1412 emitted by action node 1408 terminate at states 1414 and 1416, respectively. These arrows indicate that carrying out of action 1408 by the environment when the environment is in state 1404 results in a transition either to state 1414 or to state 1416. It should also be noted that an arrow emitted from an action node may return to the state from which the outgoing arrow to the action node was emitted. In other words, carrying out of certain actions by the environment when the environment is in a particular state may result in the environment maintaining that state. Starting at an initial state, the state-transition diagram indicates all possible sequences of state transitions that may occur within the environment. Each possible sequence of state transitions is referred to as a "trajectory."

FIG. 14B illustrates additional details about state-transition diagrams and environmental states and behaviors. FIG. 14B shows a small portion of a state-transition diagram that includes three state nodes 1420-1422. A first additional detail is the fact that, once an action is carried out, the transition from the action node to a resultant state is accompanied by the emission of an observation, by the environment, to the manager. For example, a transition from state 1420 to state 1422 as a result of action 1424 produces observation 1426, while transition from state 1420 to state 1421 via action 1424 produces observation 1428. A second additional detail is that each state transition is associated with a probability. Expression 1430 indicates that the probability of transitioning from state $s_1$ to state $s_2$ as a result of the environment carrying out action $a_1$, where s indicates the current state of the environment and s' indicates the next state of the environment following s, is output by the state-transition function T, which takes, as arguments, indications of the initial state, the final state, and the action. Thus, each transition from a first state through a particular action node to a second state is associated with a probability. The second expression 1432 indicates that probabilities are additive, so that the probability of a transition from state $s_1$ to either state $s_2$ or state $s_3$ as a result of the environment carrying out action $a_1$ is equal to the sum of the probability of a transition from state $s_1$ to state $s_2$ via action $a_1$ and the probability of a transition from state $s_1$ to state $s_3$ via action $a_1$. Of course, the sum of the probabilities associated with all of the outgoing arrows emanating from a particular state is equal to 1.0, for all non-terminal states, since, upon receiving an observation/reward pair following emission of a first action, the manager emits a next action unless the manager terminates. As indicated by expressions 1434, the function O returns the probability that a particular observation o is returned by the environment given a particular action and the state to which the environment transitions following execution of the action. In other words, in general, there are many possible observations o that might be generated by the environment following transition to a particular state through a particular action, and each possible observation is associated with a probability of occurrence of the observation given a particular state transition through a particular action.

Figure 15:
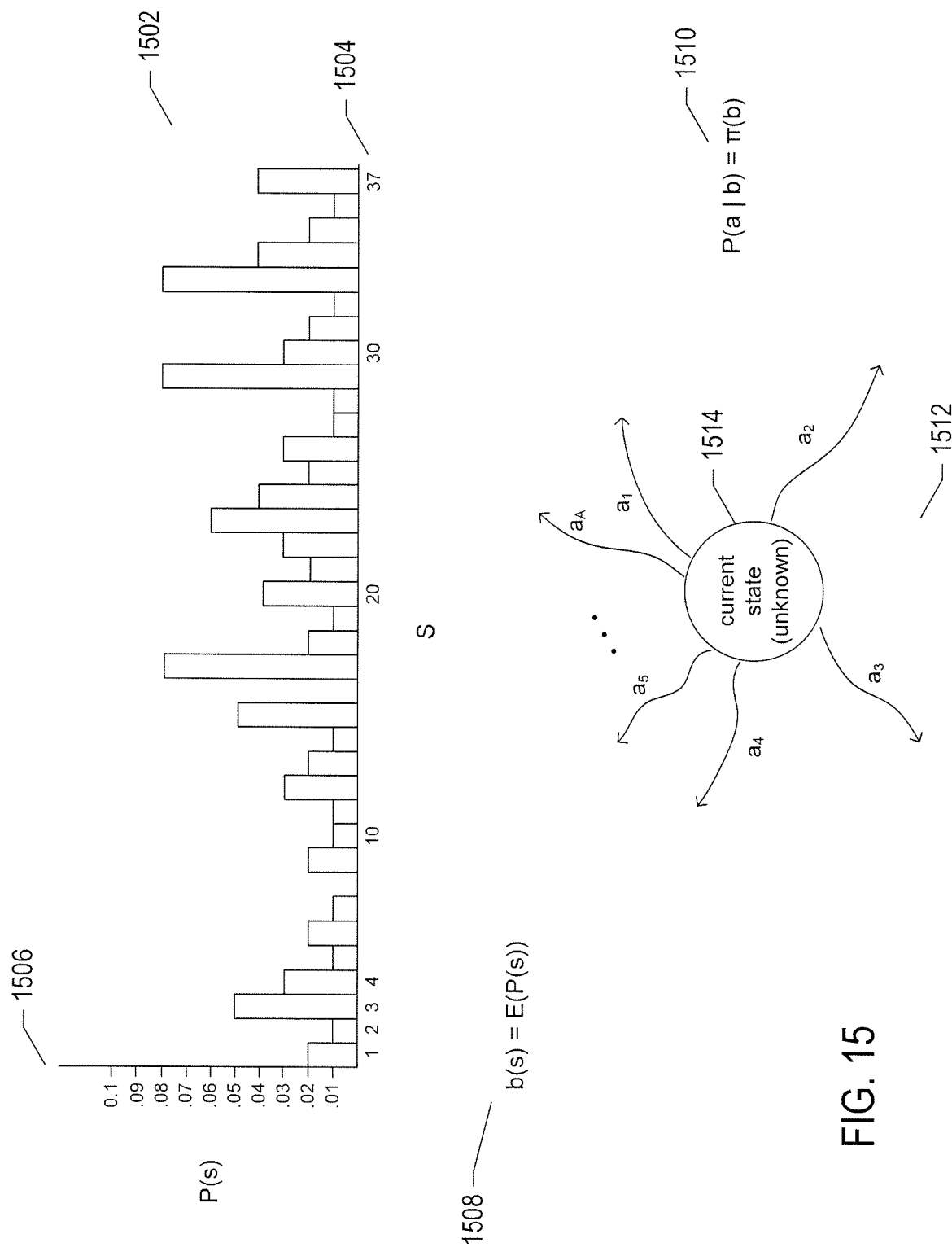
FIG. 15 illustrates the concept of belief.

FIG. 15 illustrates the concept of belief. At the top of FIG. 15, a histogram 1502 is shown. The horizontal axis 1502 represents 37 different possible states for a particular environment and the vertical axis 1506 represents the probability of the environment being in the corresponding state at some point in time. Because the environment must be in one state at any given point in time, the sum of the probabilities for all the states is equal to 1.0. Because the manager does not know the state of the environment, but instead only knows the values of the elements of the observation following the last executed action, the manager infers the probabilities of the environment being in each of the different possible states. The manager's belief $b(s)$ is the expectation of the probability that the environment is in state s, as expressed by equation 1508. Thus, the belief b is a probability distribution which could be represented in a histogram similar to histogram 1502. Over time, the manager accumulates information regarding the current state of the environment and the probabilities of state transitions as a function of the belief distribution and most recent actions, as a result of which the probability distribution b shifts towards an increasingly non-uniform distribution with greater probabilities for the actual state of the environment. In a deterministic and fully observable environment, in which the manager knows the current state of the environment, the policy $\pi$ maintained by the manager can be thought of as a function that returns the next action a to be emitted by the manager to the environment based on the current state of the environment, or, in mathematical notation, $a=\pi(s)$. However, in the non-deterministic and non-transparent environment in which application managers operate, the policy $\pi$ maintained by the manager determines a probability for each action based on the current belief distribution b, as indicated by expression 1510 in FIG. 15, and an action with the highest probability is selected by the policy $\pi$, which can be summarized, in more compact notation, by expression 1511. Thus, as indicated by the diagram of a state 1512, at any point in time, the manager does not generally certainly know the current state of the environment, as indicated by the label 1514 within the node representation of the current date 1512, as a result of which there is some probability, for each possible state, that the environment is currently in that state. This, in turn, generally implies that there is a non-zero probability that each of the possible actions that the manager can issue should be the next issued action, although there are cases in which, although the state of the environment is not known with certain, there is enough information about the state of the environment to allow a best action to be selected.

Figure 16A:
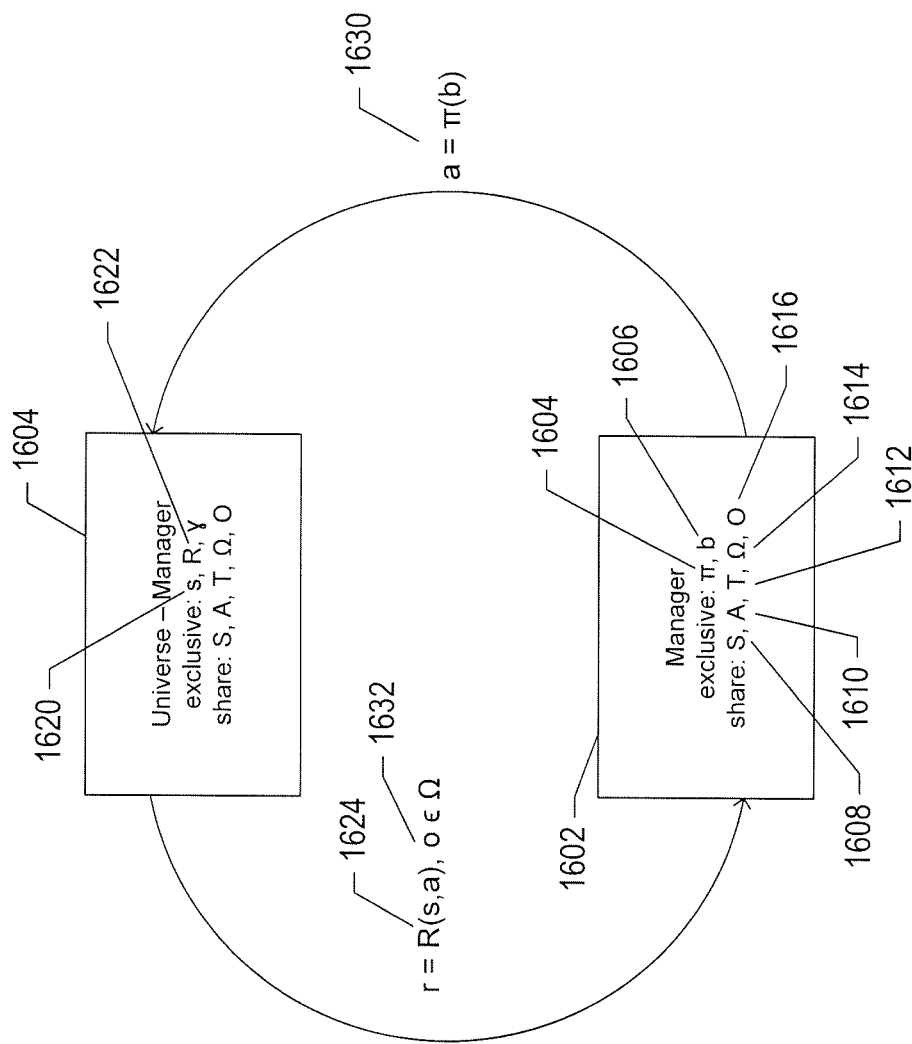
FIGS. 16A-B illustrate a simple flow diagram for the universe comprising the manager and the environment in one approach to reinforcement learning.
Figure 16B:
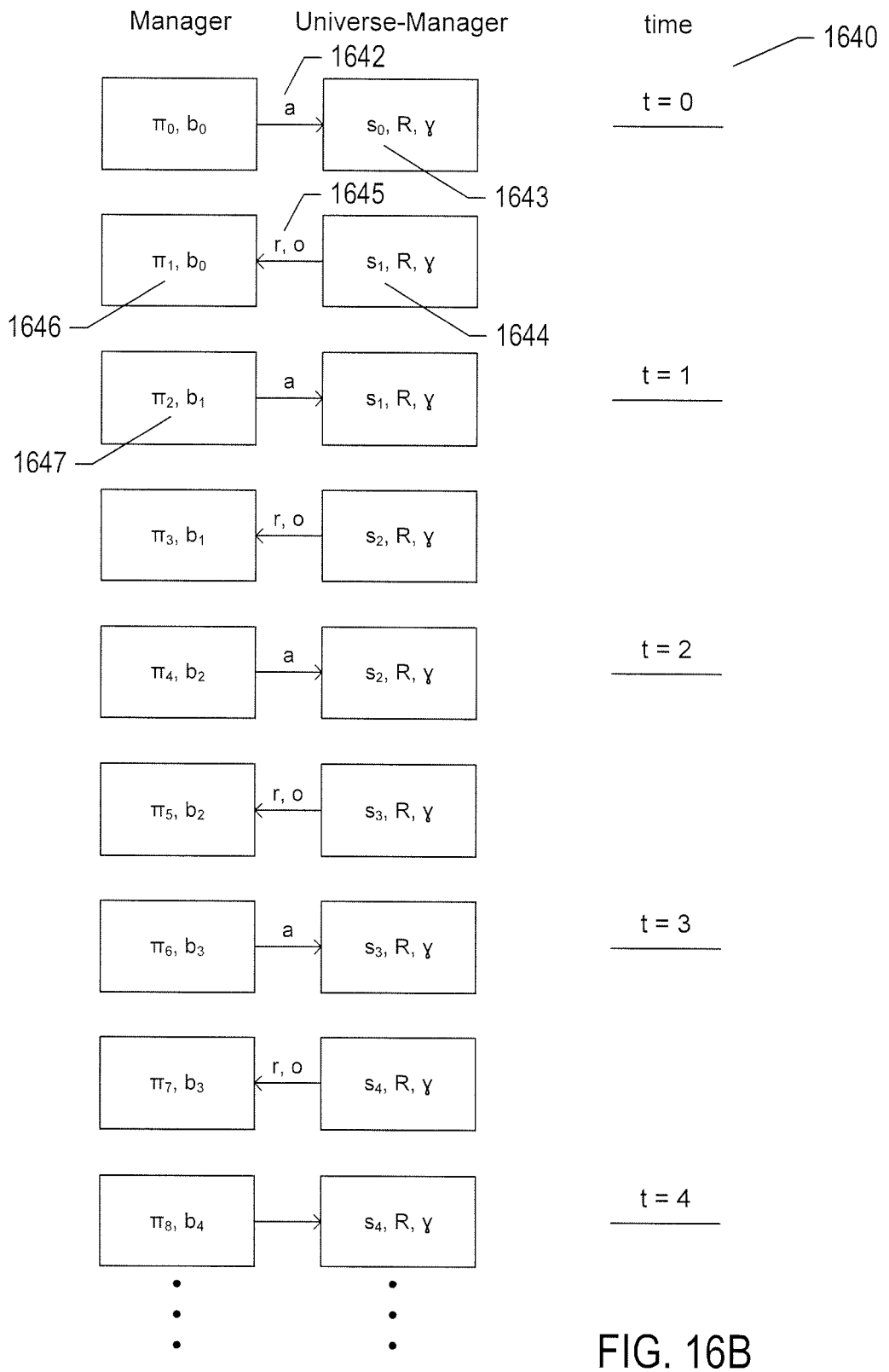

FIGS. 16A-B illustrate a simple flow diagram for the universe comprising the manager and the environment in one approach to reinforcement learning. The manager 1602 internally maintains a policy $\pi$ 1604 and a belief distribution b 1606 and is aware of the set of environment states S 1608, the set of possible actions A 1610, the state-transition function T 1612, the set of possible observations $\Omega$ 1614 and, and the observation-probability function O 1616, all discussed above. The environment 1604 shares knowledge of the sets A, and $\Omega$ with the manager. Usually, the true state space S and the functions T and O are unknown and estimated by the manager. The environment maintains the current state of the environment s 1620, a reward function R 1622 that returns a reward r in response to an input current state s and an input action a received while in the current state 1624, and a discount parameter $\gamma$ 1626, discussed below. The manager is initialized with an initial policy and belief distribution. The manager emits a next action 1630 based on the current belief distribution which the environment then carries out, resulting in the environment occupying a resultant state and then issues a reward 1624 and an observation o 1632 based on the resultant state and the received action. The manager receives the reward and observation, generally updates the internally stored policy and belief distribution, and then issues a next action, in response to which the environment transitions to a resultant state and emits a next reward and observation. This cycle continues indefinitely or until a termination condition arises.

It should be noted that this is just one model of a variety of different specific models that may be used for a reinforcement-learning agent and environment. There are many different models depending on various assumptions and desired control characteristics. In certain models which employ policy-gradient approaches, for example, a belief distribution may not be needed.

FIG. 16B shows an alternative way to illustrate operation of the universe. In this alternative illustration method, a sequence of time steps is shown, with the times indicated in a right-hand column 1640. Each time step consists of issuing, by the manager, an action to the environment and issuing, by the environment, a reward and observation to the manager. For example, in the first time step $t=0$, the manager issues an action a 1642, the environment transitions from state $s_0$ 1643 to $s_1$ 1644, and the environment issues a reward r and observation o 1645 to the manager. As a result, the manager updates the policy and belief distribution in preparation for the next time step. For example, the initial policy and belief distribution $\pi_0$ and $b_0$ 1646 are updated to the policy and belief distribution $\pi_1$ and $b_1$ 1647 at the beginning of the next time step $t=1$. The sequence of states $\{s_0, s_1, \ldots\}$ represents the trajectory of the environment as controlled by the manager. Each time step is thus equivalent to one full cycle of the control-flow-diagram-like representation discussed above with reference to FIG. 16A.

Figure 17:
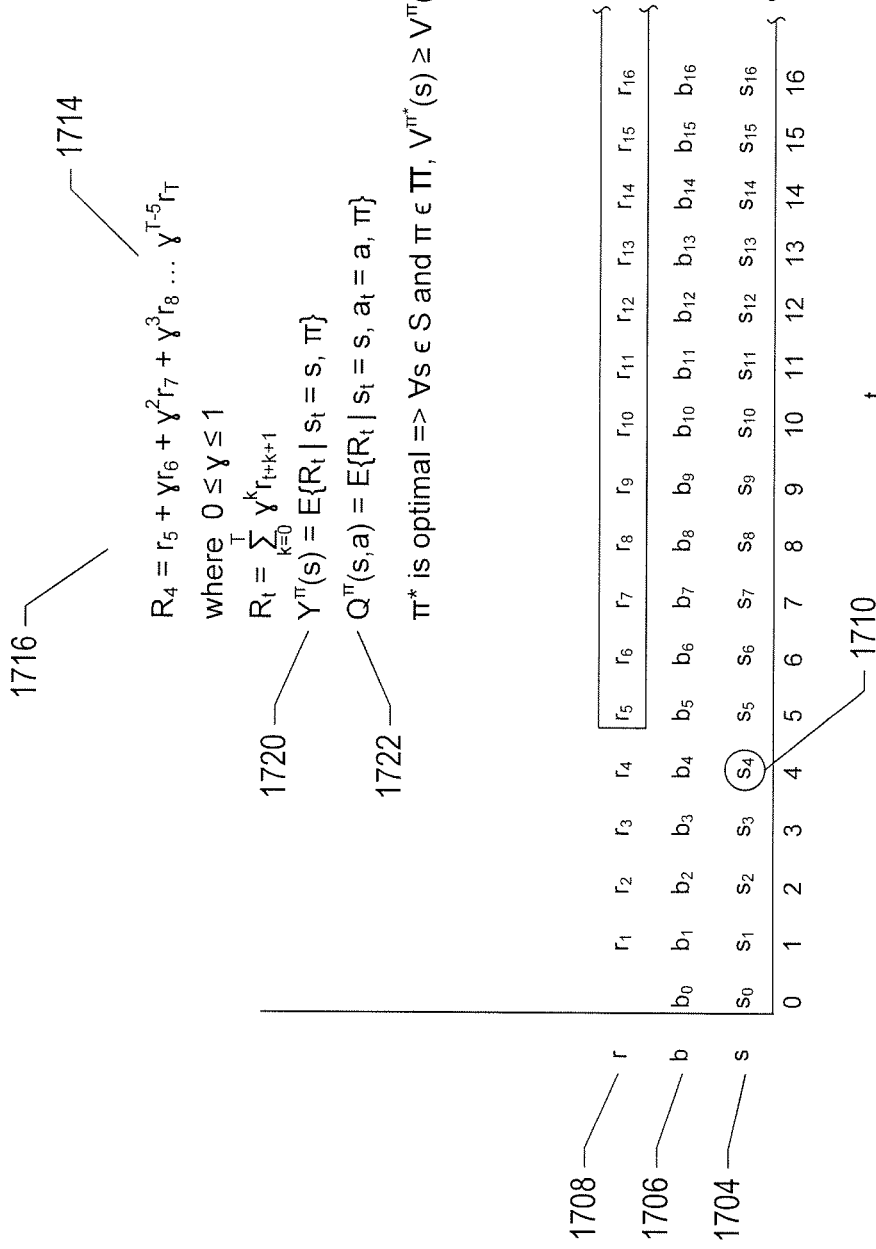
FIG. 17 provides additional details about the operation of the manager, environment, and universe.

FIG. 17 provides additional details about the operation of the manager, environment, and universe. At the bottom of FIG. 17, a trajectory for the manager and environment is laid out horizontally with respect to the horizontal axis 1702 representing the time steps discussed above with reference to FIG. 16B. A first horizontal row 1704 includes the environment states, a second horizontal row 1706 includes the belief distributions, and a third horizontal row 1708 includes the issued rewards. At any particular state, such as circled state $s_4$ 1710, one can consider all of the subsequent rewards, shown for state $s_4$ within box 1712 in FIG. 17. The discounted return for state $s_4$, $G_4$, is the sum of a series of discounted rewards 1714. The first term in the series 1716 is the reward $r_5$ returned when the environment transitions from state $s_4$ to state $s_5$. Each subsequent term in the series includes the next reward multiplied by the discount rate $\gamma$ raised to a power. The discounted reward can be alternatively expressed using a summation, as indicated in expression 1718. The value of a given state s, assuming a current policy $\pi$, is the expected discounted return for the state, and is returned by a value function $V^\pi(\ )$, as indicated by expression 1720. Alternatively, an action-value function returns a discounted return for a particular state and action, assuming a current policy, as indicated by expression 1722. An optimal policy π* provides a value for each state that is greater than or equal to the value provided by any possible policy π in the set of possible policies Π. There are many different ways for achieving an optimal policy. In general, these involve running a manager to control an environment while updating the value function $V^\pi(\ )$ and policy π, either in alternating sessions or concurrently. In some approaches to reinforcement learning, when the environment is more or less static, once an optimal policy is obtained during one or more training runs, the manager subsequently controls the environment according to the optimal policy. In other approaches, initial training generates an initial policy that is then continuously updated, along with the value function, in order to track changes in the environment so that a near-optimal policy is maintained by the manager.

Figure 18:
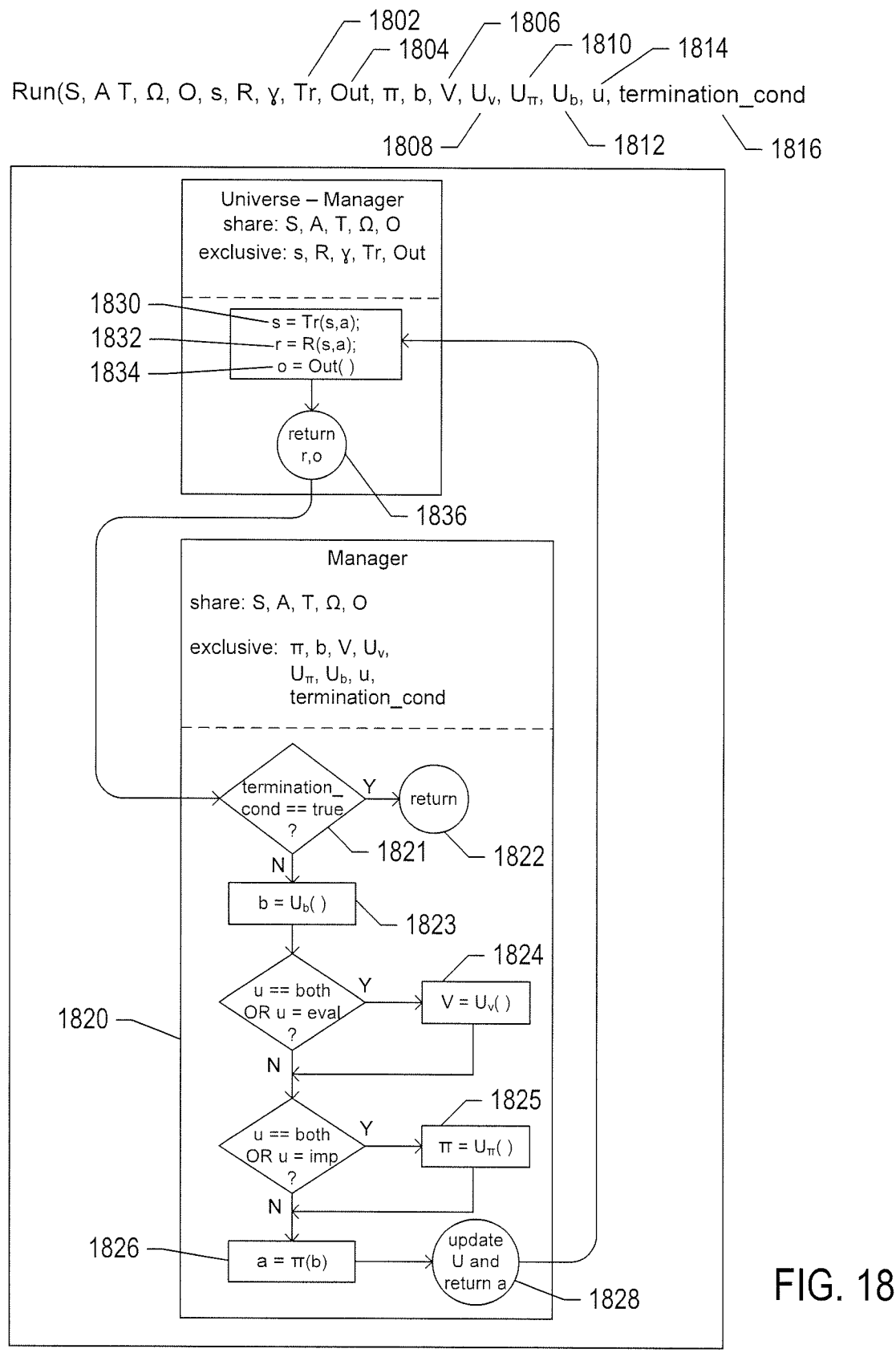
FIG. 18 provides a somewhat more detailed control-flow-like description of operation of the manager and environment than originally provided in FIG. 16A.

FIG. 18 provides a somewhat more detailed control-flow-like description of operation of the manager and environment than originally provided in FIG. 16A. The control-flow-like presentation corresponds to a run of the manager and environment that continues until a termination condition evaluates to TRUE. In addition to the previously discussed sets and functions, this model includes a state-transition function Tr 1802, an observation-generation function Out 1804, a value function V 1806, update functions $U_V$ 1808, $U_\pi$ 1810, and $U_b$ 1812 that update the value function, policy, and belief distribution, respectively, an update variable u 1814 that indicates whether to update the value function, policy, or both, and a termination condition 1816. The manager 1820 determines whether the termination condition evaluates to TRUE, in step 1821, and, if so, terminates in step 1822. Otherwise, the manager updates the belief, in step 1823 and updates one or both of the value function and policy, in steps 1824 and 1825, depending on the current value of the update variable u. In step 1826, the manager generates a new action and, in step 1828, updates the update variable u and issues the generated action to the environment. The environment determines a new state 1830, determines a reward 1832, and determines an observation 1834 and returns the generated reward and observation in step 1836.

Figure 19:
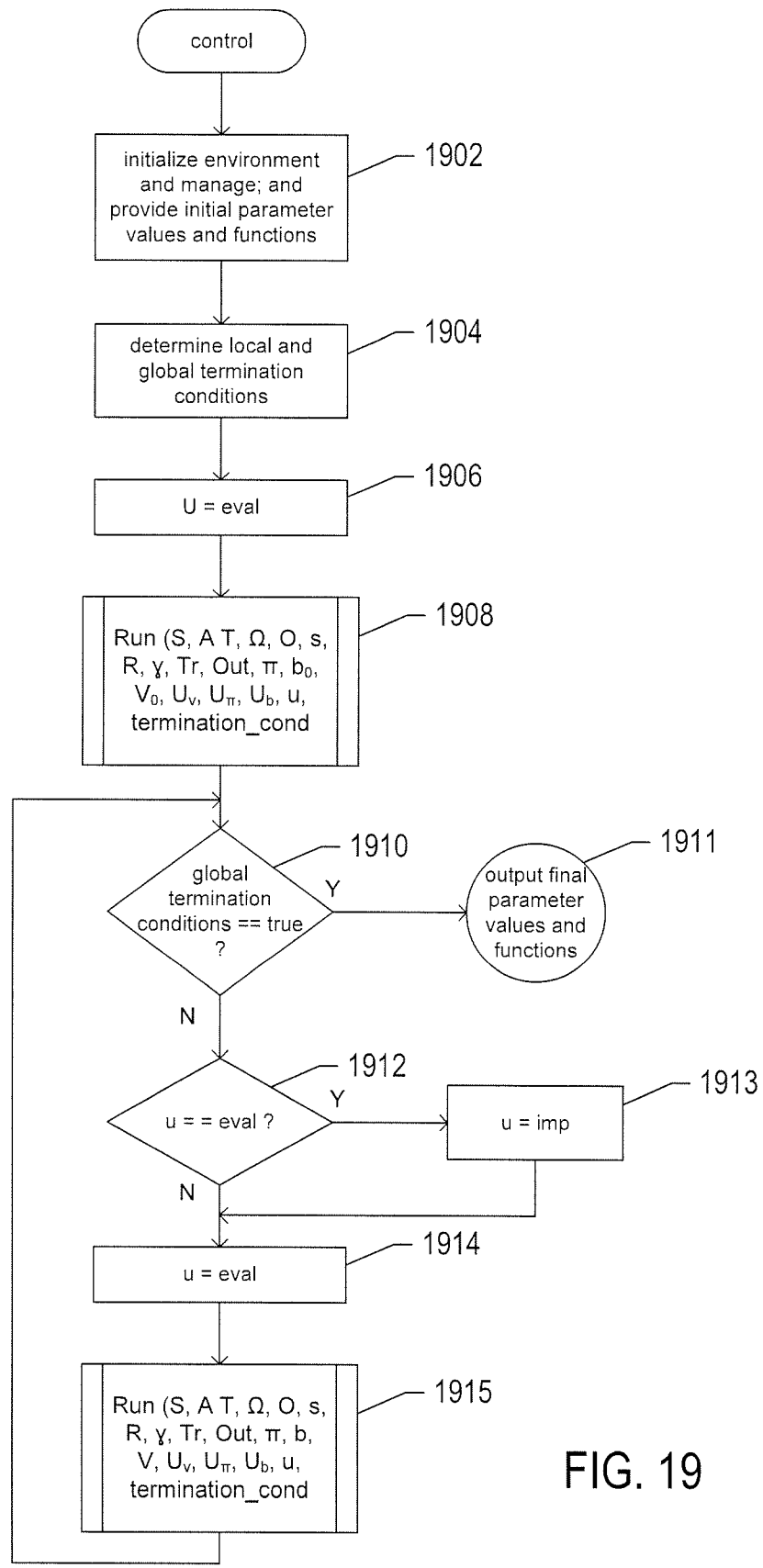
FIG. 19 provides a traditional control-flow diagram for operation of the manager and environment over multiple runs.

FIG. 19 provides a traditional control-flow diagram for operation of the manager and environment over multiple runs. In step 1902, the environment and manager are initialized. This involves initializing certain of the various sets, functions, parameters, and variables shown at the top of FIG. 18. In step 1904, local and global termination conditions are determined. When the local termination condition evaluates to TRUE, the run terminates. When the global termination condition evaluates to TRUE, operation of the manager terminates. In step 1906, the update variable u is initialized to indicate that the value function should be updated during the initial run. Step 1908 consists of the initial run, during which the value function is updated with respect to the initial policy. Then, additional runs are carried out in the loop of steps 1910-1915. When the global termination condition evaluates to TRUE, as determined in step 1910, operation of the manager is terminated in step 1911, with output of the final parameter values and functions. Thus, the manager may be operated for training purposes, according to the control-flow diagram shown in FIG. 19, with the final output parameter values and functions stored so that the manager can be subsequently operated, according to the control-flow diagram shown in FIG. 19, to control a live system. Otherwise, when the global termination condition does not evaluate to TRUE and when the update variable u has a value indicating that the value function should be updated, as determined in step 1912, the value stored in the update variable u is changed to indicate that the policy should be updated, in step 1913. Otherwise, the value stored in the update variable u is changed to indicate that the value function should be updated, in step 1914. Then, a next run, described by the control-flow-like diagram shown in FIG. 18, is carried out in step 1915. Following termination of this run, control flows back to step 1910 for a next iteration of the loop of steps 1910-1915. In alternative implementations, the update variable u may be initially set to indicate that both the value function and policy should be updated during each run and the update variable u is not subsequently changed. This approach involves different value-function and policy update functions than those used when only one of the value function and policy is updated during each run.

Figure 20:
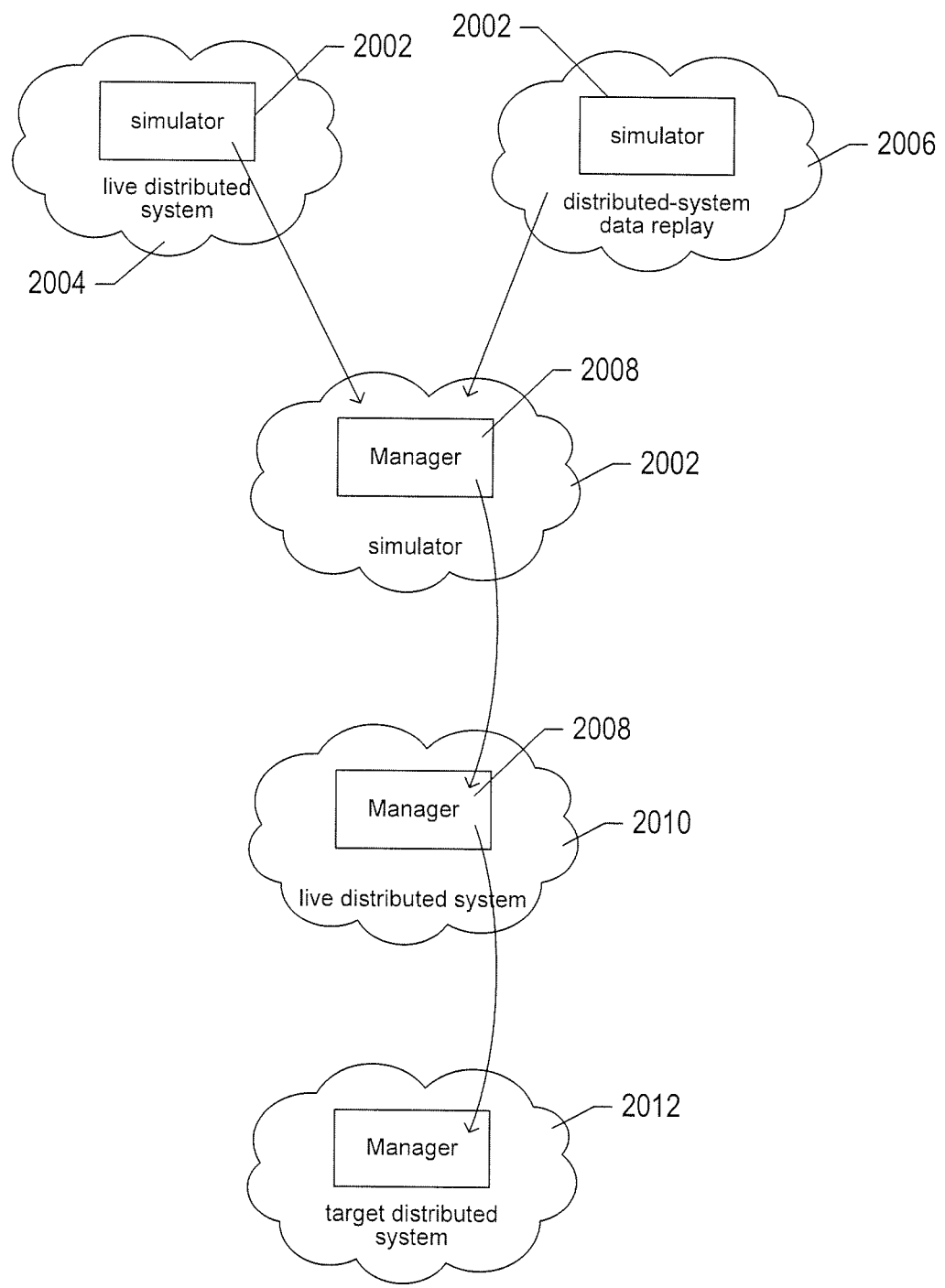
FIG. 20 illustrates one approach to using reinforcement learning to generate and operate an application manager.

FIG. 20 illustrates one approach to using reinforcement learning to generate and operate an application manager. First, reinforcement learning is used to train an environment simulator 2002 by one or both of operating the simulator against a live-distributed-system environment 2004 or against a simulated distributed-system environment that replays archived data generated by a live distributed system to the simulator 2006. Then, a manager 2008 is initially trained by controlling an environment consisting of the simulator 2002. The manager, once trained, is then operated for a time to control an environment comprising a live distributed system 2010. Once the manager has been trained both against the simulator and the live distributed system, it is ready to be deployed to manage an environment 2012 comprising a target live distributed system.

Figure 21:
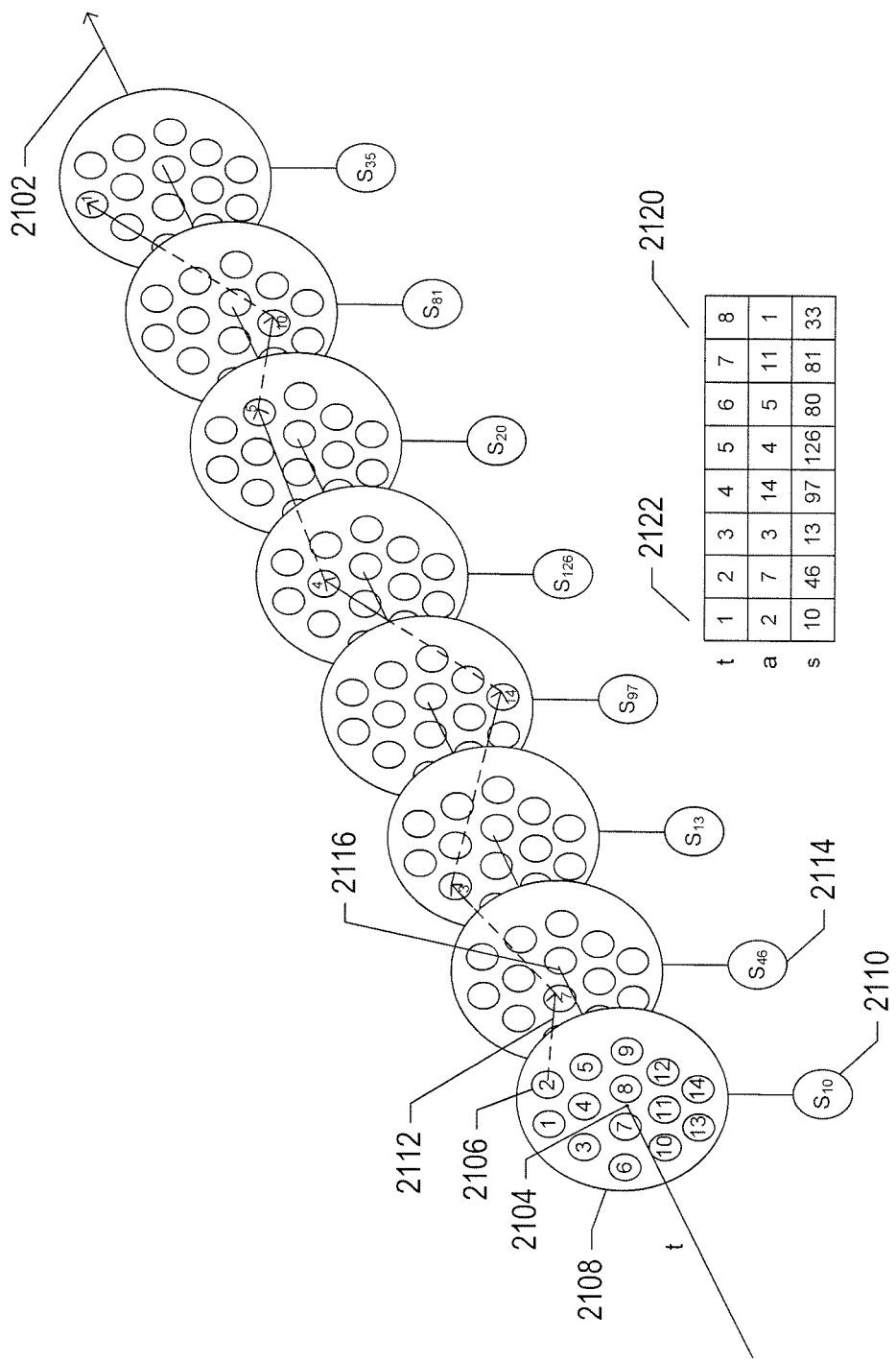
FIG. 21 illustrates an alternative view of a control trajectory comprising a sequence of executed of actions, each accompanied by a managed-environment state change.

FIG. 21 illustrates an alternative view of a control trajectory comprising a sequence of executed of actions, each accompanied by a managed-environment state change. In FIG. 21, arrow 2102 represents a timeline. At the beginning of each of multiple time intervals, a reinforcement-learning-based controller invokes the above-discussed policy π to select a next action from a set of actions A. For example, at the time interval that begins with time 2104, the reinforcement-learning-based controller invokes the policy π to select action 2106, represented as a circle inscribing a numerical label "2," from the set of possible actions A, represented by disk 2108, which contains 14 different possible actions represented by smaller circles that each inscribe a different numeric label. Of course, in real-world situations, there may be hundreds, thousands, tens of thousands, or more different possible actions. The state of the managed-environment, at time 2104, is represented by the circle 2110 inscribing the label "$s_{10}$" indicating the managed-environment state. When the reinforcement-learning-based controller executes the selected action, as represented by arrow 2112, the managed environment transitions to a new state 2114 at a next point in time 2116, where the process is repeated to produce a next action and next state transition. Thus, reinforcement-learning-based control can be thought of as a trajectory through a state/action space. In the simple example of FIG. 21, with both actions and states represented by integers, the state/action space can be imagined as a two-dimensional plane with two orthogonal coordinate axes corresponding to actions and states. A control trajectory can be represented as a table, such as table 2120 shown in FIG. 21, containing three-value columns, such as column 2122, that each includes a time value, an indication of an action, and an indication of the state. Again, as mentioned above, actions and states may be represented by integers, floating-point numbers, and other types of symbols and symbol strings, including character strings.

Figure 22:
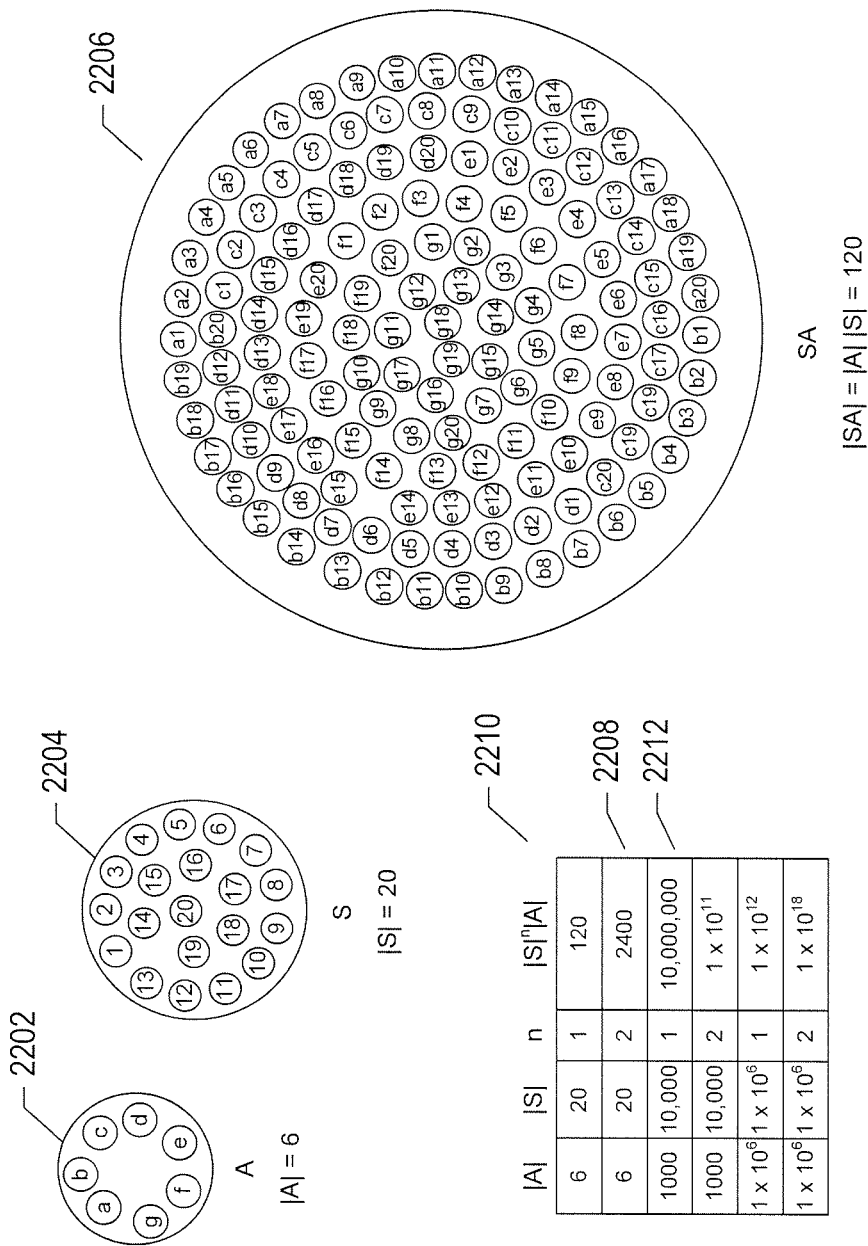
FIG. 22

FIG. 22 illustrates the potential sizes of the set of possible state/action pairs. Using similar illustration conventions as used in FIG. 21, FIG. 22 shows an illustration of a set of actions A 2202, with a cardinality of 6, and a set of states S 2204, with a cardinality of 20. In certain reinforcement-learning-based controller implementations, the policy π is based on an assumed Markov model. In a Markov-model based policy, the policy π selects a next action based on the current managed-environment state or, when the state is unknown to the reinforcement-learning-based controller, on the belief distribution b for the current managed-environment state, as discussed above. The set of possible state/action pairs SA 2206 can be thought of as the set of all possible current-state/next-action control decisions that can be generated from the set of possible actions A and the set of possible states S. For a Markov-based reinforcement-learning-based controller, the number of possible state/action pairs is equal to the product of the cardinalities of the set of possible actions A and the set of possible states S. In the example shown in FIG. 22, the number of possible state/action pairs is 120, even though there are only 6 possible actions and 20 possible states. Other types of reinforcement-learning-based controllers may consider the current state and the preceding state in order to choose a next action. In this case, each possible action-selection decision can be considered to be a triple comprising an action and two states. In this case, the number of possible control decisions is equal to the product of the cardinality of the set of possible actions A and the square of the cardinality of the set of possible states S. In yet other types of reinforcement-learning-based controllers, the n most recent states, including the current state, of the managed environment are considered when making an action-selection decision. The most general expression for the number of possible control decisions is: $|S|^n|A|$. In the case that n equals 2, there are 2400 possible control decisions for the example shown in FIG. 22, as indicated in the second row 2208 of the table 2210 shown in FIG. 22. Of course, in real-world problem domains, there may be very large numbers of different possible actions and states. As shown in the third row 2212 of the table 2210, when there are 1000 possible actions and 10,000 possible states, a controller using a Markov policy, where n is equal to 1, includes 10,000,000 different possible control decisions. It would take on the order of many months of testing time for a controller, given these figures, to sample each possible control decision. For a controller using a policy based on a model for which n is equal to 2, with 1000 possible actions and 10,000 possible states, there are $10^{11}$ different possible control decisions, which would take many thousands of years for controller to sample once each. Thus, in practical, real-world situations, the number of possible control decisions, which represents the state space that a reinforcement-learning-based control system needs to explore in order to find an optimal policy, can be enormous.

Figure 23A:
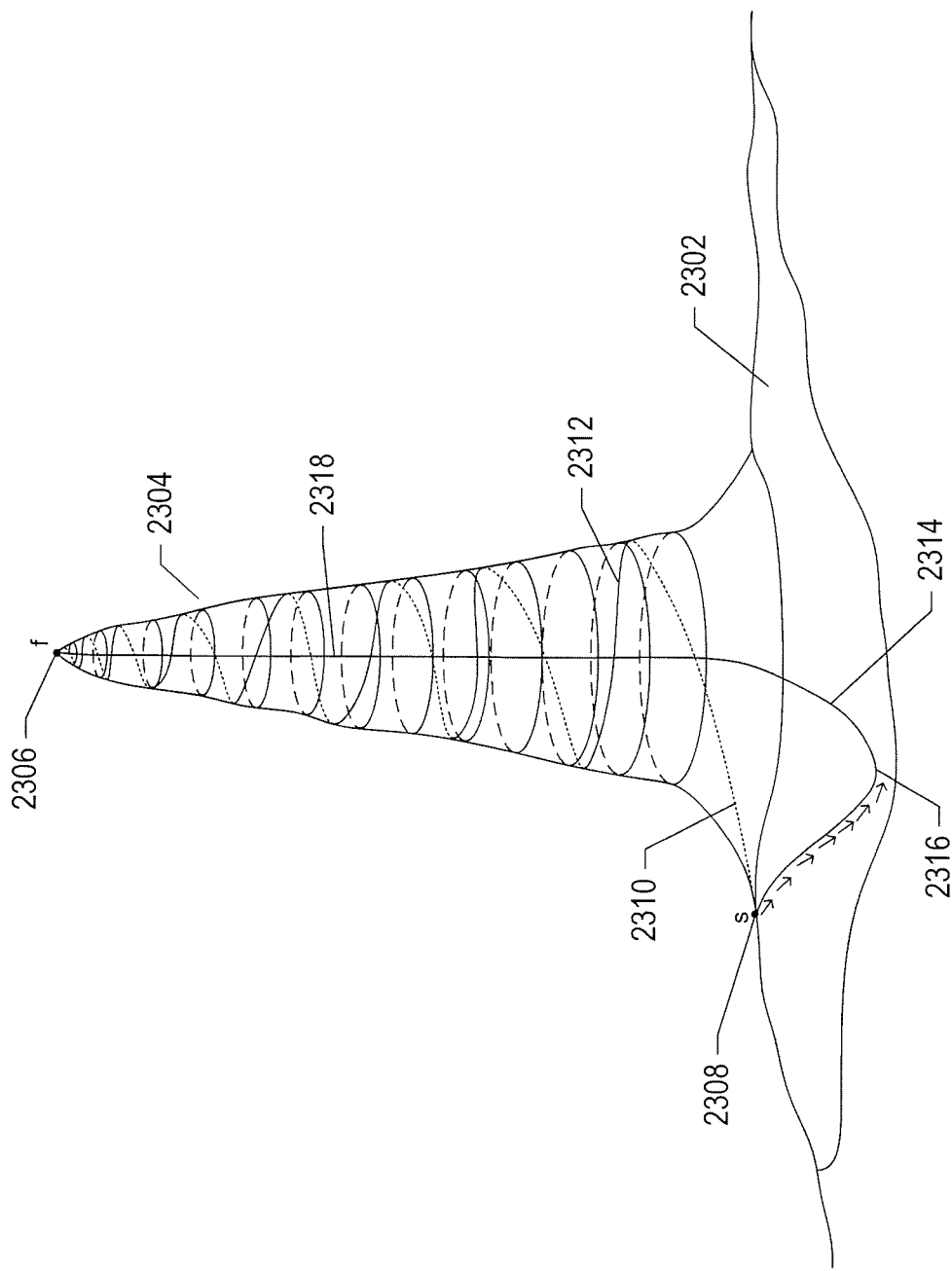
FIGS. 23A-B illustrate the need for state/action exploration by a reinforcement-learning-based controller.
Figure 23B:
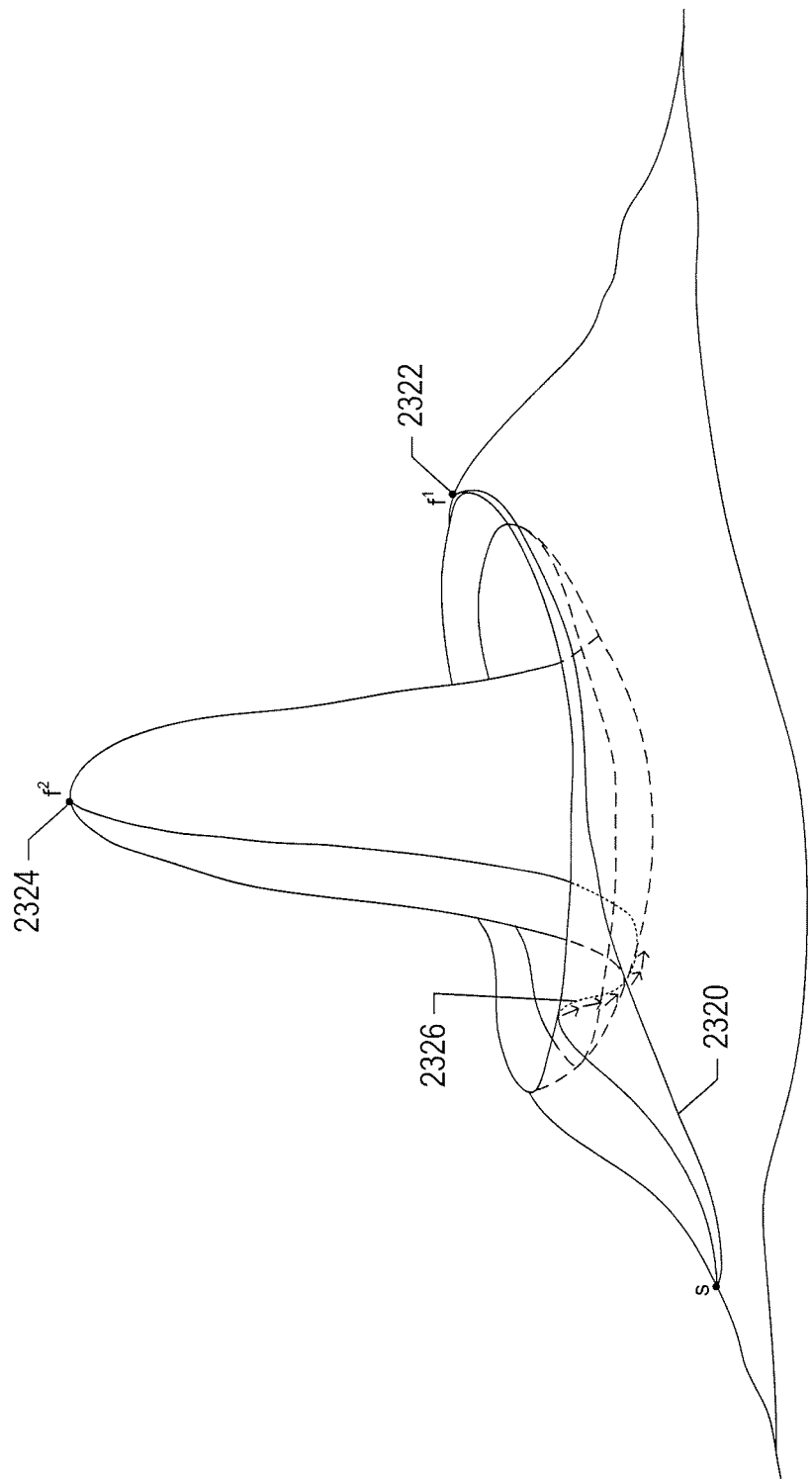

FIGS. 23A-B illustrate the need for state/action exploration by a reinforcement-learning-based controller. FIGS. 23A-B both use the same illustration conventions, next described with reference to FIG. 23A. A portion of a surface 2302 that represents the value or expected reward for state/action pairs includes a rather prominent peak 2304. The point at the summit of the surface 2306 represents a state/action pair that generates the greatest expected reward or value. In static environments, a reinforcement-learning-based controller, over time, seeks to obtain the maximum possible value by reaching point 2306, starting from an initial point 2308. Two different trajectories are shown in FIG. 23A. In non-static environments, the controller seeks to obtain a maximum discounted reward over the most recent window in time. A first trajectory 2310 gradually ascends the peak, initially ascending the back side of the peak, wrapping around to the front side of the peak 2312, and slowly spiraling upward, continuously reaching higher-valued state/action pairs until reaching point 2306. A second trajectory 2314 initially descends to a lower point on the surface 2316 and then directly and steeply ascends 2318 to point 2306. In this case, if the number of actions needed to be taken in order to reach the optimal control decision is a measure of the efficiency of the reinforcement-learning-based controller, the second trajectory 2314 is by far most efficient. However, the second trajectory involves initially carrying out locally suboptimal actions of decreasing value. Of course, this is a somewhat artificial example and illustration, since trajectories would not generally map to quasi-continuous curves and would normally not continuously increase in value, but is intended to show that, unless the reinforcement-learning-based controller carries out a certain amount of state/action space exploration, the reinforcement-learning-based controller cannot discover optimal policies π*. In other words, were the reinforcement-learning-based controller to always select the currently most valuable action, and thus follow a greedy policy, the reinforcement-learning-based controller would generally fail to find the most efficient trajectories. As shown in FIG. 23B, in a different example, a greedy policy may allow a reinforcement-learning-based controller to find a trajectory 2320 that results in discovery of a locally optimal state/action pair 2322, but would not allow the reinforcement-learning-based controller to find the global optimal 2324, since all trajectories leading to the global optimum involve a stretch of non-optimal action selections 2326.

Figure 24:
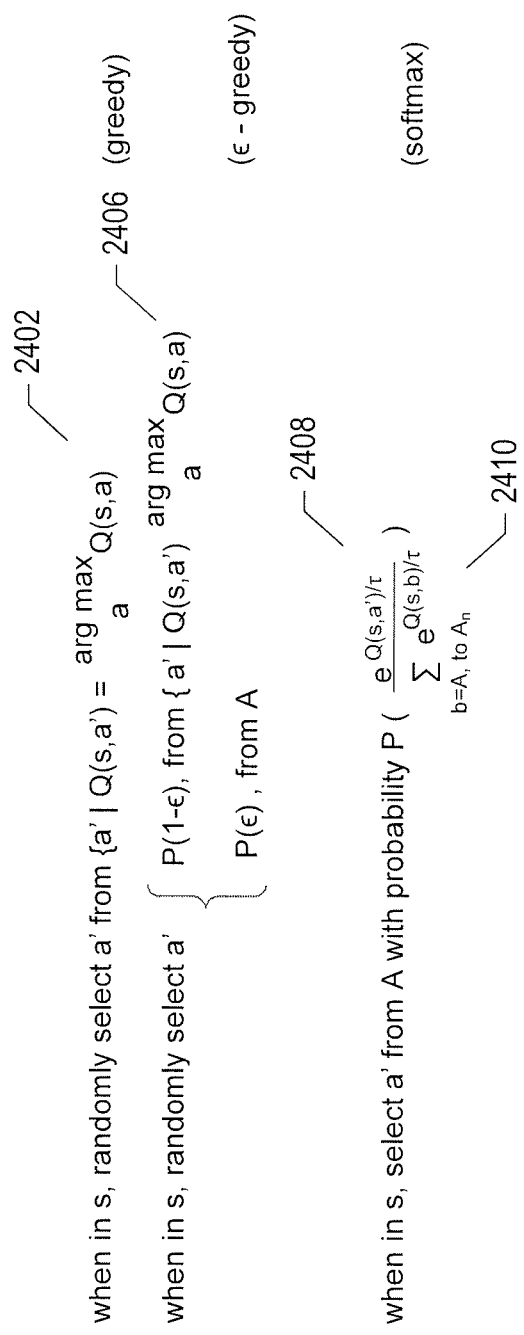
FIG. 24 provides expressions illustrating various types of policies.

FIG. 24 provides expressions illustrating various types of policies. As discussed above, an action-value function $Q^\pi$(s, a) (1722 in FIG. 17) returns a discounted return for a particular state and action, assuming a current policy π. A first expression 2402 represents the greedy policy. When the reinforcement-learning-based controller is in a state s, the greedy policy selects a next action a' for which the discounted expected return value is maximum among all possible actions a. As discussed above, the greedy policy generally does not allow a reinforcement-learning-based controller to efficiently find optimally efficient trajectories and optimal state/action pairs, and may not allow a reinforcement-learning-based controller to efficiently find optimally efficient trajectories regardless of the control/learning period during which the reinforcement-learning-based controller operates. The ϵ-greedy policy 2406 selects a next action a' according to the greedy policy with a probability of 1-ϵ and selects a next action randomly from A with a probability of ϵ. In general, ϵ as a relatively low value, such as 0.1 or 0.01, so that, most of the time, the ϵ-greedy policy selects a next action with the maximum discounted-return value. However, occasionally, the ϵ-greedy policy randomly selects a next action, so that, over time, the reinforcement-learning-based controller tries a wide variety of the many possible control decisions. By exploring the state/action space, the reinforcement-learning-based controller gradually learns to assign accurate discounted expected-return values to the various different state/action pairs so that the policy can be optimized. The Soft Max policy 2408 randomly selects a next action a' from A with the probability 2410, which corresponds to the Boltzmann distribution used in statistical mechanics. When the temperature factor τ has a low value, approaching 0, the probabilities of selection very dramatically with the estimated discounted return for the state/action, but when the temperature factor τ has a large value, the differences in the probabilities of selection diminish. Like the ε-greedy policy, the Soft Max policy favors selection of an action with the greatest estimated return value, but occasionally selects non-optimal actions in order to facilitate state/action space exploration.

Figure 25:
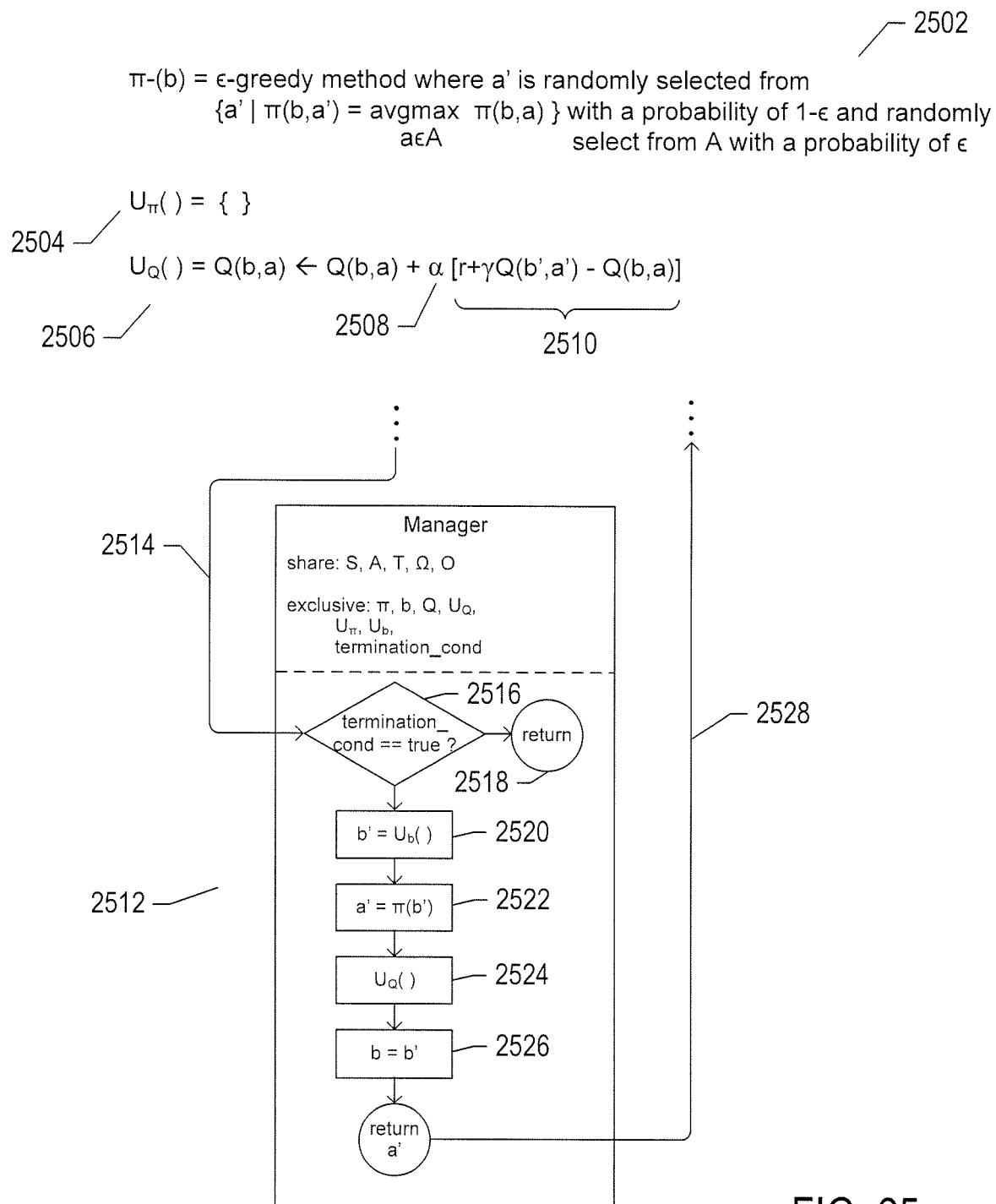
FIG. 25 illustrates one implementation of a reinforcement-learning-based application manager that employs state/action-space exploration via the above-discussed $\epsilon$-greedy policy.

FIG. 25 illustrates one implementation of a reinforcement-learning-based application manager that employs state/action-space exploration via the above-discussed ε-greedy policy. As indicated by expression 2502, the policy employed by this implementation, π(b), selects a next action a' with maximum estimated value with a probability of 1-ε and randomly selects the next action a' from A the probability of ε, and is therefore an ε-greedy policy. In this implementation, as indicated by expression 2504, there is no explicit policy-update function, unlike the case in the implementation illustrated in FIG. 18. Instead, a state/action-value update function $U_Q(\ )$ 2506 is employed. This function updates the state/action value Q(b,a) by adding to the state/action value Q(b,a) the product of a learning rate α 2508 and an estimate of the most recent return value 2510, where r is the reward received from executing action a, γ is the above-discussed discount rate, and b' and a' are the updated belief distribution and new selected action following execution of action a. Diagram 2512 illustrates the application manager logic that replaces the logic 1820 previously shown in FIG. 18. After execution of an action a, the universe returns the resulting reward r and observation vector o via path 2514. If the termination condition has occurred, as determined in step 2516, the application manager terminates, in step 2518. Otherwise, in step 2520, the application manager generates an updated belief distribution b' using the belief-distribution-update function that, in turn, considers the returned observation vector o returned by the managed environment, and, in step 2522, applies the policy (2502) to generate a next action a' using the updated belief distribution b'. Then, in step 2524, the application manager updates the discounted return value for the preceding action and belief distribution using the state/action-value update function 2506. In step 2526, the application manager stores the updated belief distribution as the current belief distribution and then returns the next action a' to the managed environment via path 2528.

As discussed above, for even modest numbers of possible actions and states, the state/action space can be enormous. In many real-world scenarios, there may be enormous numbers of possible actions and states, as a result of which the state/action space may be many tens of orders of magnitude larger than could possibly be practically exhaustively searched by exploration policies. Furthermore, there would be insufficient memory in even the largest distributed computing systems for maintaining current discounted values for each possible state/action pair. For these reasons, as indicated by expression 2530, the reinforcement-learning-based controller uses a parameterized function $Q_t(s,a)$ that returns, at any point in time t, an estimate of the value of the state/action pair s/a. The function $Q_t(s,a)$ is a function of n parameters contained in a parameter vector $\theta_t$. As indicated by expression 2532, the action-value update function $U_Q(\ )$ updates the parameter values via a gradient-descent method rather than updating a stored action value Q(b,a). Thus, at time t+1, the previous parameter vector $\theta_t$ is updated to parameter vector $\theta_{t+1}$.

Control and Learning Processes of Reinforcement-Learning-Based Application Managers In the preceding subsection, reinforcement-learning-based application managers and aspects of the implementations of reinforcement-learning-based application managers were discussed with reference to FIGS. 11A-25. This discussion introduced observation vectors o, actions a, states s, and belief distributions b. Further details are provided in the current subsection.

Figure 26:
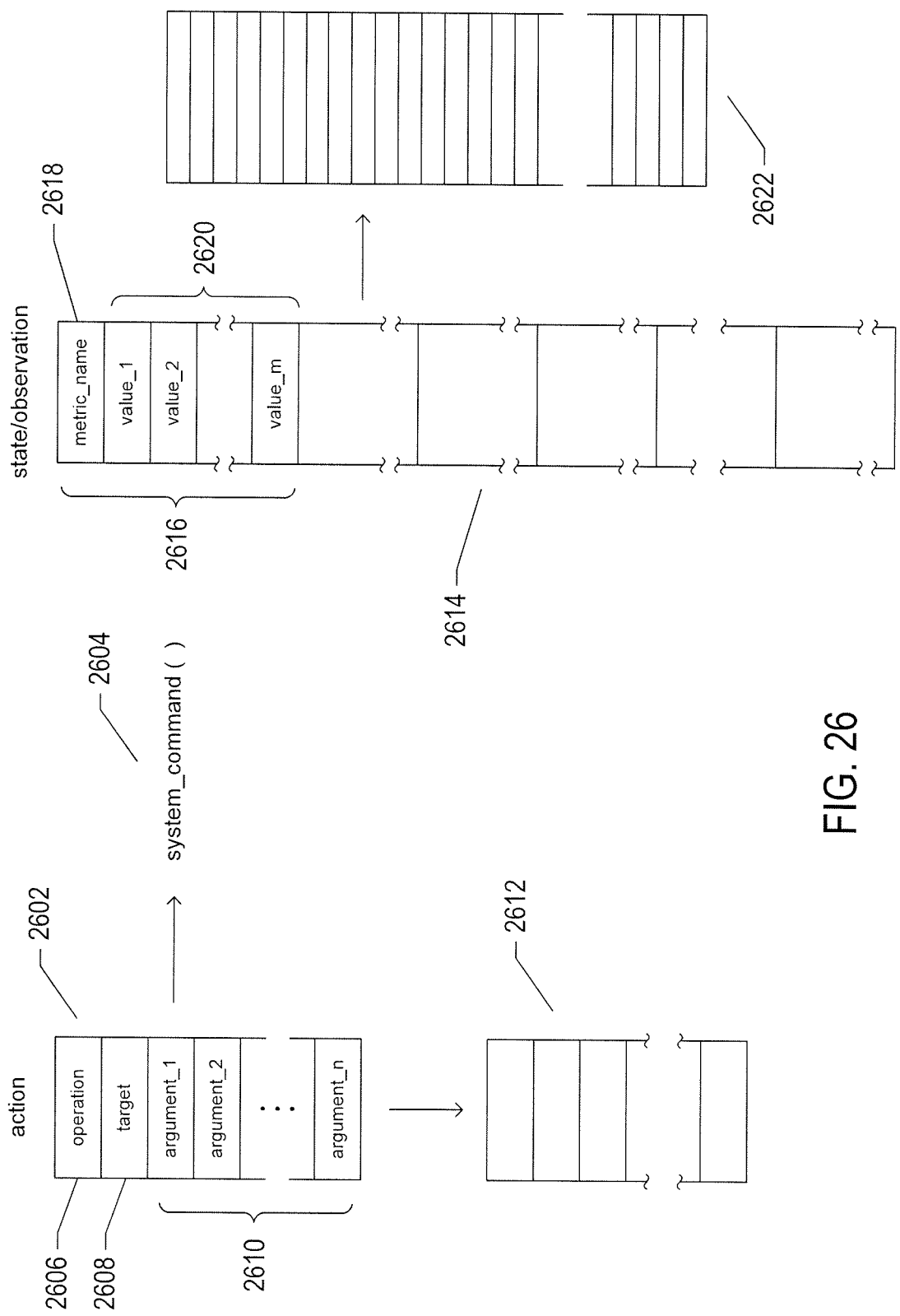
FIG. 26 illustrates actions, states, and observations.

FIG. 26 illustrates actions, states, and observations. In many implementations, an action is a vector of values 2602 that is more or less directly translated into a system command 2604 that is issued by the resource-learning-based application manager to a computational entity within the managed environment, such as a virtual-data-center management server, server computer, data-storage appliance, or other such computational entities. There may be various different numbers and types of values for different types of actions, which may be represented by action templates, but, for purposes of explaining action tags and metric tags, a generalized action format can be considered to comprise an indication of the operation or command, often referred to as an "op code," 2606, an indication of the type of target computational entity for the command 2608, and a number n of arguments 2610, including a target indication, were arguments are commonly floating-point and integer values. As mentioned above, although the values in the action vector 2602 have particular meanings within the managed environment, the above-described reinforcement-learning-based application manager essentially considers actions to be undifferentiated vectors of numeric values 2612 that, in the aggregate, represent a numeric indication of a specific action. Similarly, states vectors and observation vectors, in many implementations, comprise vectors of metrics 2614, where each metric, such as the first metric in the vector 2616, may include a metric name 2618 and m numeric values 2620 that represents the value of the metric. There may be many different types of metrics represented in an observation or state vector. For example, one metric may be the number of current external users or clients who are accessing a distributed application. Another metric might be the total cost, per hour, for the leased virtual machines currently allocated for executing a distributed application. As mentioned above, although the metrics and metric values have particular meanings within the managed environment, the above-described reinforcement-learning-based application manager essentially considers state and observation vectors to be undifferentiated vectors of numeric values 2622. In essence, the above-described reinforcement-learning-based application manager may consider action vectors, state vectors, and observation vectors to each be a single numeric value within a range of numeric values that can be expressed by the number of bits used to encode all of the values in the vectors.

Figure 27A:
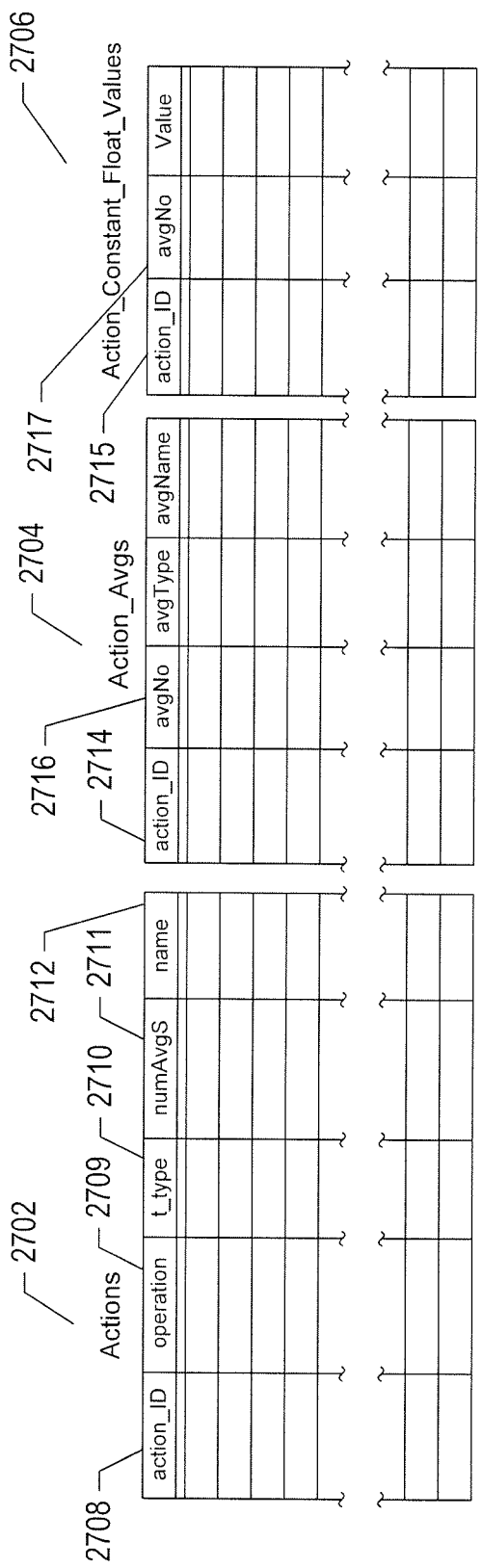

FIGS. 27A-B illustrate one example of a data representation of actions and metrics. This example uses a relational database for storing actions and metrics. Actions are stored in relational-database tables including the table Actions 2702, the table Action_Args 2704, and a variety of additional tables such as the table Action_Constant_Float_Values 2706. Each entry, or role, in the table Actions 2702 represents a different action. Each entry includes the fields: (1) action_ID 2708, a unique identifier for the action; (2) operation 2709, the opcode discussed above; (3) t_type 2710, the type of computational-entity target for the action; (4) numArgs 2711, the number of arguments included in the action; and (5) name 2712, the name of the action. The table Action_Args 2704 stores information about each of the arguments of each of the actions. Each entry in the table Action_Args is associated with an entry in the table Actions 2702 through a common value stored in the field action_ID 2708 and 2714 of both entries. The actual argument values are stored in additional tables, such as table 2706, which stores the floating-point-valued-argument values, with a particular entry in this table associated with an entry in the table Action_Args by the common values in the common two fields action_ID 2714 and 2715 and argNo 2716 and 2717. A similar scheme is used to store metric values in the table Metrics 2720, the table Metric_Fields 2722, and additional field-value tables, such as the action-values table 2706, discussed above.

FIG. 27B illustrates various representational forms of a particular action. The action "addVirtualServer" may be texturally expressed by expression 2730 in the general context of application management. The action is stored in the above-discussed relational-database tables as indicated by the table entries 2732. When the various pieces of information are extracted from the relational database tables, they are used to compose the action vector 2734, and this action vector is directly translated into the system command 2736. A reinforcement-learning-based application manager may more concisely represent the action by expression 2738.

FIG. 28 provides numerous expressions that indicate a generic implementation of several different types of value functions and an $\epsilon$-greedy policy. There are many different types of value functions and policies that may be used in implementing a reinforcement-learning-based application manager. The value functions and policies shown in FIG. 28 are provided to illustrate the nature of value functions and policies. Certain of this information has been discussed using different expressions in the previous subsection. A state-value function $V^\pi(s)$ for a particular policy $\pi$ is represented by expression 2802. This function receives a state vector, as input, and returns a value for the state s, where the value is the expected sum of returns that will accrue during subsequent control of the managed environment, with future values discounted by a discount rate $\gamma$. Expression 2804 provides a similar representation of a state/action-value function $Q^\pi(s,a)$, where the value of state/action pair is the expected cumulative return following execution of the action a when the managed environment is in the state s. Expression 2805 shows the meaning of the state-transition probability $P_{ss'}^a$, which is the probability that, when the managed environment is in the state s and the managed environment executes the action a, the managed environment will transition to the state s'. Expression 2806 shows the meaning of the expected reward $R_{ss'}^a$, which is the expected reward returned by the managed environment, when the managed environment is in the state s, following execution of the action a. Expression 2807 is an expression of an estimate of the state-value function $V^\pi(s)$, expressed as the weighted sum of all of the sums of the return values and discounted subsequent state values for all the possible actions taken from state s. This estimate provides a basis for iterative approaches to determining the state-value function for any particular policy. The three expressions 2808 illustrate the meaning of the optimal state-value and state/action-value functions $V^*(s)$ and $Q^*(s,a)$, which are the state-value functions and state/action-value functions for the optimal control policies. Finally, expressions 2809 again illustrates an example $\epsilon$-greedy policy, which selects, as a next action, the action corresponding to the state/action pair having the highest value according to the state/action-value function in most cases, but occasionally selects the next action a randomly from the set of possible actions A.

Figure 29A:
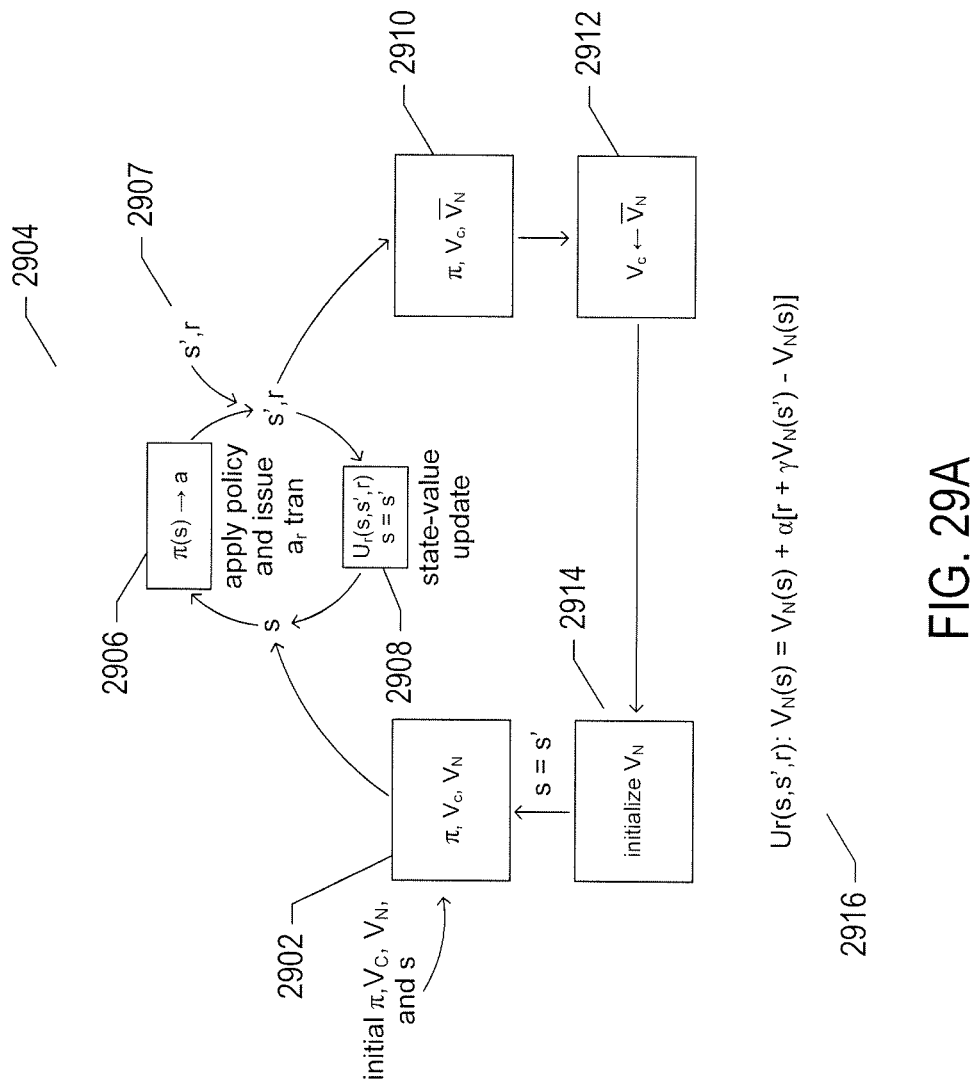
FIGS. 29A-B illustrate two different types of reinforcement-learning control-and-learning schemes that provide bases for three different reinforcement-learning-based application managers.
Figure 29B:
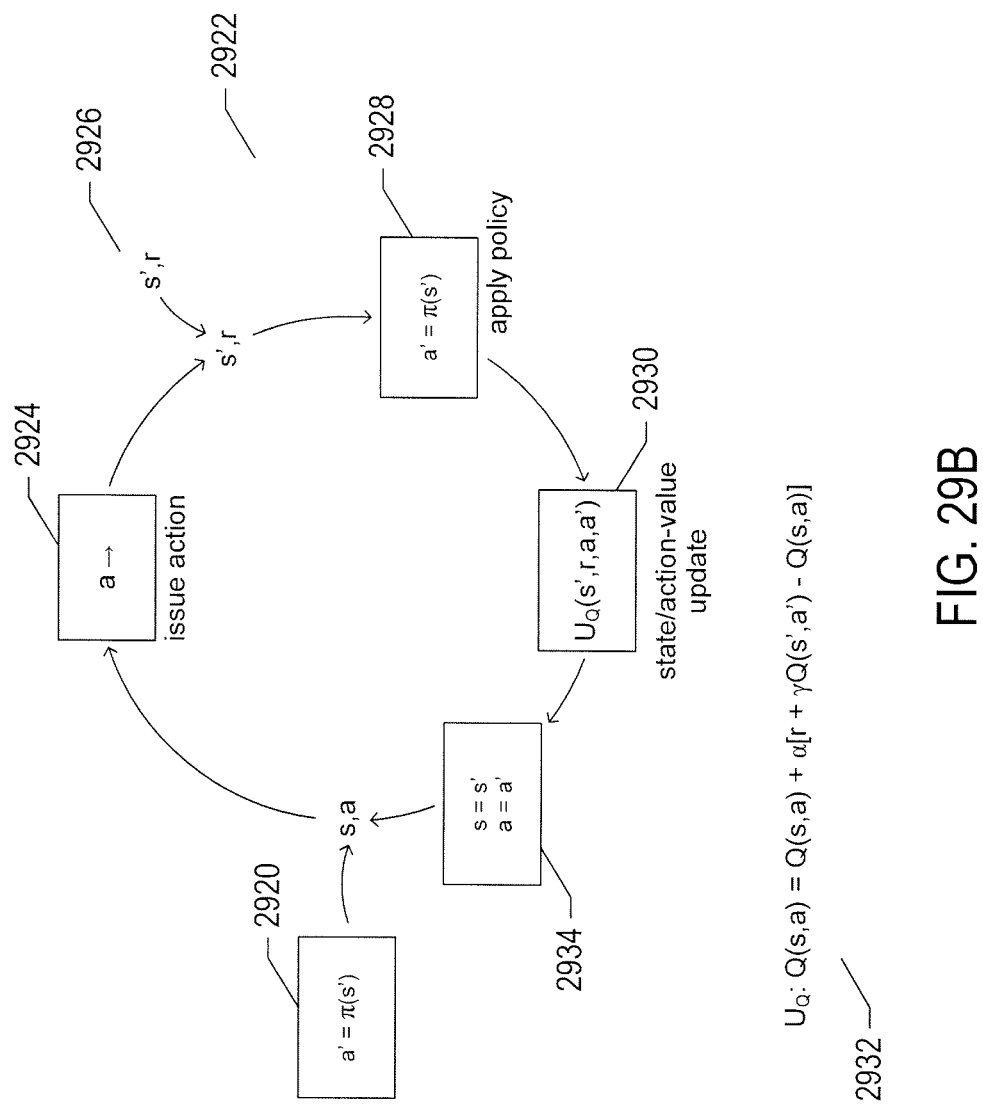

FIGS. 29A-B illustrate two different types of reinforcement-learning control-and-learning schemes that provide bases for two different reinforcement-learning-based application managers. The first implementation, shown in FIG. 29A, employs a $\epsilon$-greedy policy, which uses a current state-value function $V_C$ and a deterministic set of state transitions that indicate a next state given the current state and a next action, to, most often, select a next action that will result in a transition to the highest valued next state while learning a next state-value function but, occasionally, randomly select the next action. The process begins with step 2902, where an initial state, an initial current state-value function $V_C$, and a newly initialized next state-value function $V_N$ are provided to begin a next learning cycle. A learning cycle comprises iterative execution of a control cycle comprising action selection 2906 followed by action execution and input of a next state and reward 2907, in turn followed by update of the next state-value function 2908, which, as it is updated, diverges towards a next state-value function $\nabla_N$. Step 2910 represents the end of the current learning cycle. In step 2912, the current state-value function is changed to the next state-value function $\nabla_N$. and, in step 2914, a new next state-value function $V_N$ is initialized, after which the process continues with step 2902. Expression 2916 shows a representative state-value function update, where the new value for a current state in which an action has been executed is equal to the sum of the old value of the current state and the product of a learning rate $\alpha$ and the sum of the reward returned from executing the action and the difference between the discounted value of the next state and the old value of the current state. By using the $\epsilon$-greedy policy, the reinforcement-based-learning application manager continues to explore the state/action space, as discussed above in the preceding section of this document. This implementation might be useful when it is expected that the values of states change over time but when a constant policy is desired over periods of time corresponding to the time allocated to each learning cycle.

FIG. 29B illustrates a second reinforcement-learning-based application-manager implementation. In this implementation, an initial action is produced from an initial state, in step 2920, and then a continuous control-and-learning cycle 2922 executes. In step 2924, the next action is executed. In response, the managed environment returns a new state and reward 2926 and then, in step 2928, a new action is generated based on the new state. In step 2930, the state/action-value function Q is updated using an update function $U_Q$ represented by expression 2932. Then, in step 2934, the current state in action are set to the new state received from the managed environment 2926 and the new action generated from that new state in step 2928. This second implementation continuously updates the state/action-value function and continues to explore the state/action space by virtue of using the $\epsilon$-greedy policy.

As discussed above with reference to FIG. 20 in a preceding subsection of this document, a variety of approaches are used to train automated reinforcement-learning-based application managers prior to incorporation of the automated reinforcement-learning-based application managers into target computing environments for live control. FIGS. 30A-E illustrate the need for training and deficiencies that arise when an automated reinforcement-learning-based application manager is conventionally trained by controlling a simulated computational environment or by replay of acquired and stored control/response information from a previous controlled operation of a similar computational environment.

Figure 30A:
FIGS. 30A-E illustrate the need for training and deficiencies that arise when an automated reinforcement-learning-based application manager is conventionally trained by controlling a simulated computational environment or by replay of captured and stored control/response information from a previous controlled operation of a similar computational environment.

FIG. 30A illustrates a small portion of the system-state space for a computational environment controlled by an automated reinforcement-learning-based application manager. The system-state space is represented as a 3-dimensional volume, with an illustrated portion of this volume described by an x axis 3002 and a y axis 3004 that represent the parameter or element values of a state vector and by a z axis 3006 that represents the value or projected reward associated with the states. Of course, as discussed above, an actual system-state space is an extremely high-dimensional hyper-volume, since state vectors generally include many hundreds to thousands or more metric-value and configuration-parameter elements. In FIG. 30A, each state is represented by a sphere, such as sphere 3008. Only states above a small area 3010 in the xy plane are shown in FIG. 30A.

Figure 30B:
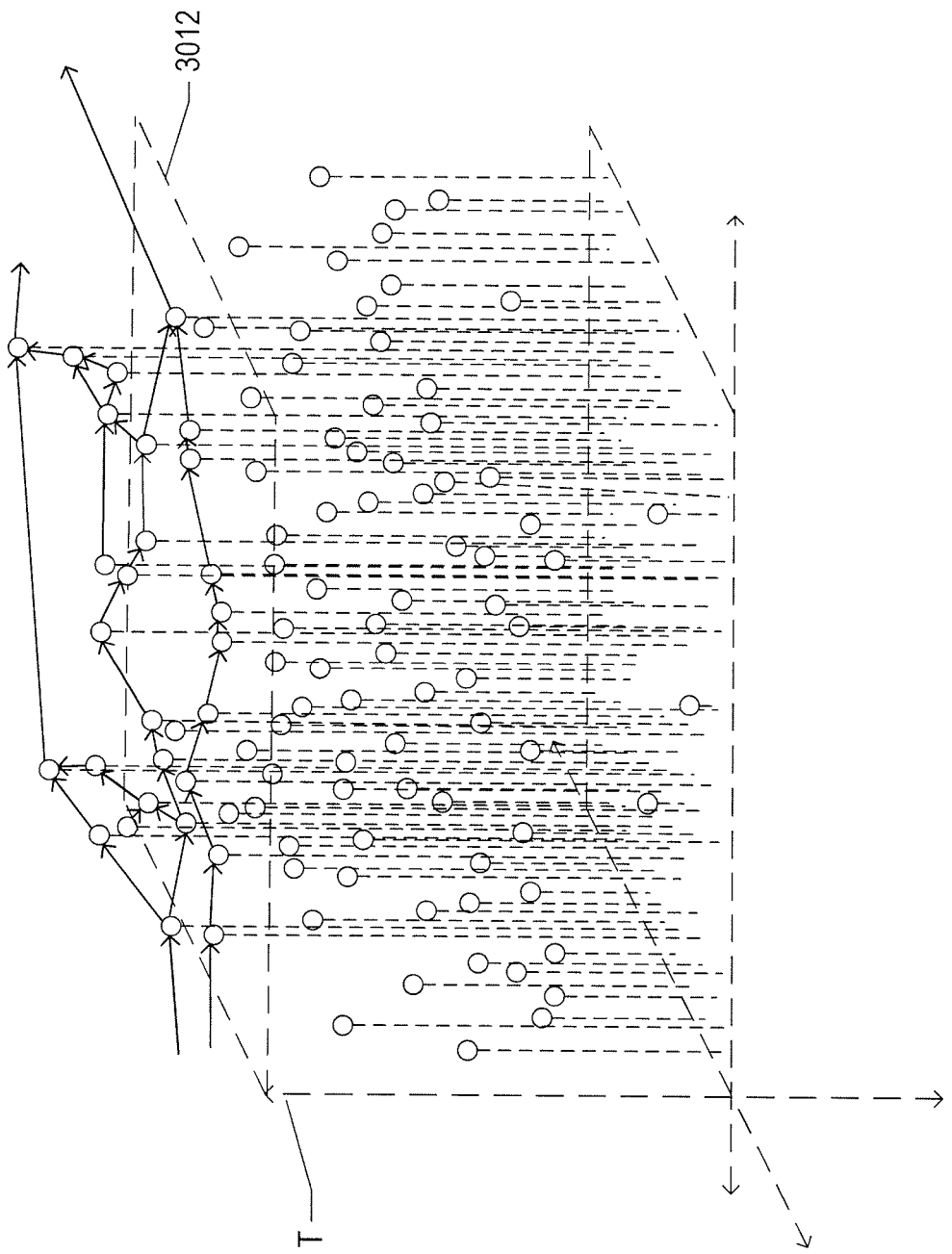

As shown in FIG. 30B, during control of a computing environment by an automated reinforcement-learning-based application manager that employs an optimal or near-optimal control policy for selecting next actions to issue to the computational environment, the states of the trajectories of the computational environment under optimal or near-optimal policy control generally inhabit a region of the system-state space above some threshold value T. In FIG. 30B, this region lies above the horizontal z=T plane 3012. A variety of different trajectories, represented by paths comprising states and arrows connecting the states, may occur in the region above the horizontal z=T plan within the computing environment controlled by an automated reinforcement-learning-based application manager using an optimal or near-optimal policy.

Figure 30C:
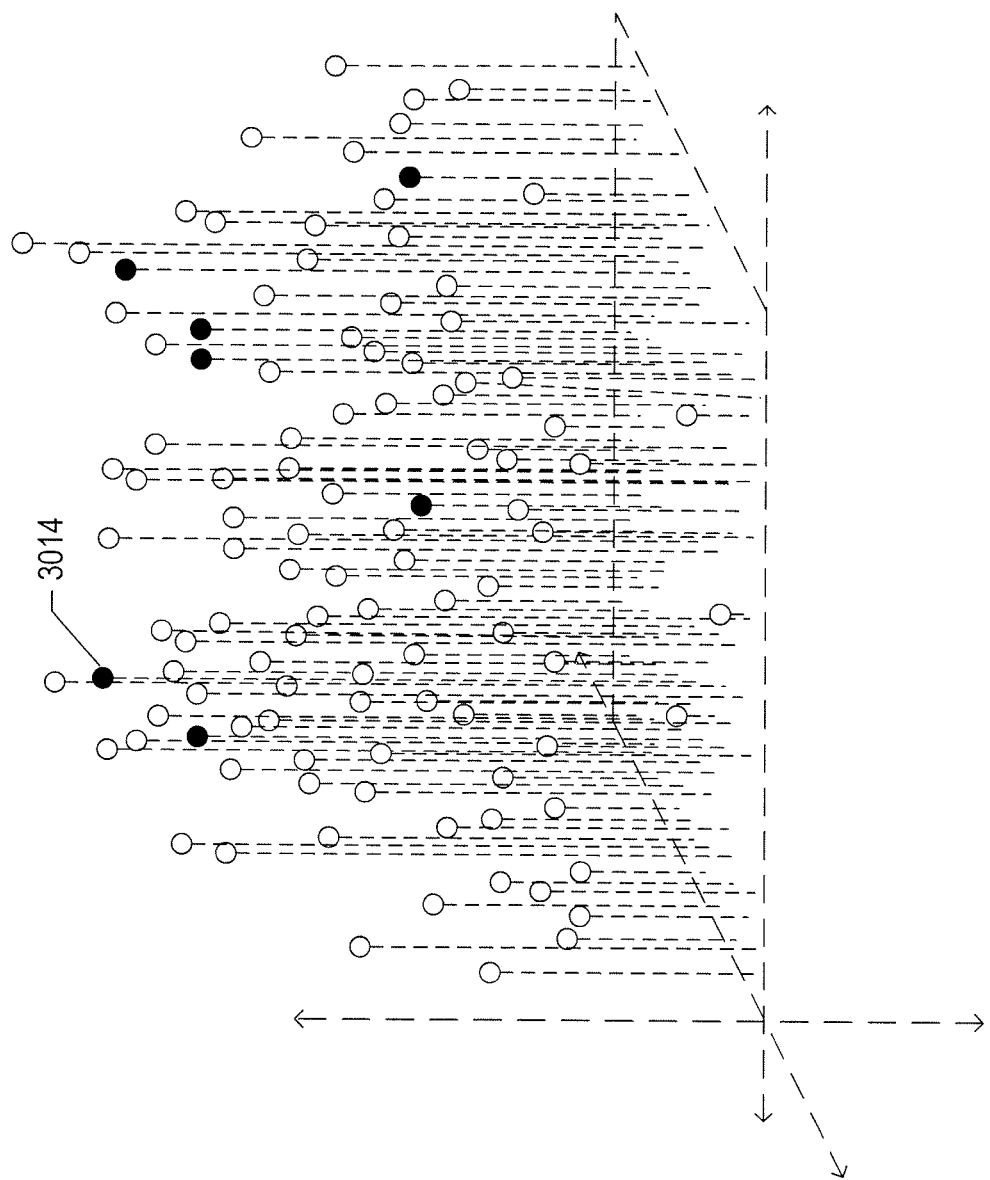

Unfortunately, as shown in FIG. 30C, during normal or conventional training of an automated reinforcement-learning-based application manager, only a very small subset of the possible system states of the controlled computational environment ever occur. In FIG. 30C, the system states that occur during conventional training of an automated reinforcement-learning-based application manager are shaded, such as system state 3014. The vast majority of system states are never visited during conventional training, as a result of which the control policy learned during training does not have any direct information or learned responses relevant to the unvisited states, and therefore must first encounter these states, by exploration, while controlling the computational environment in order to develop a rational learned control policy.

Figure 30D:
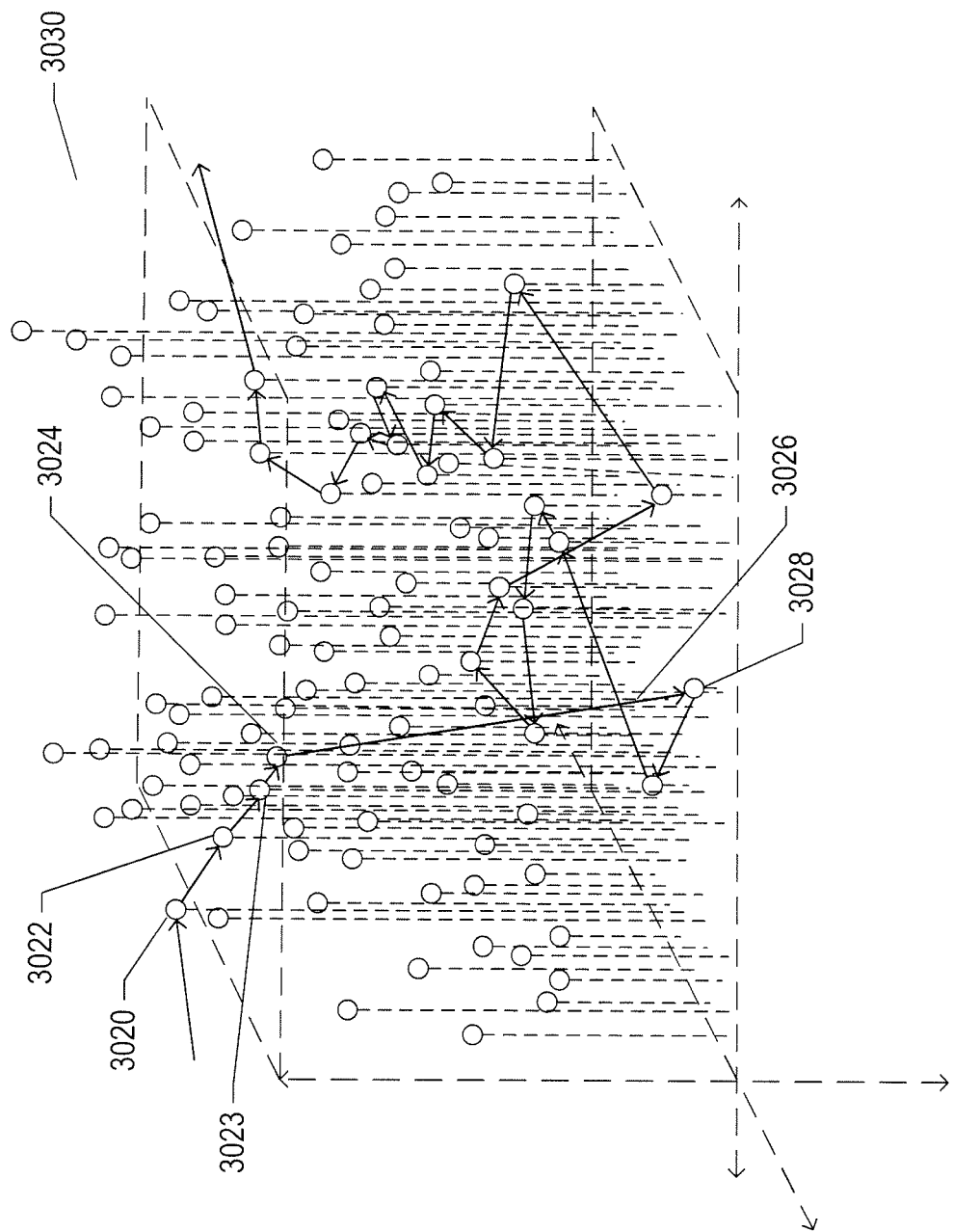
Figure 30E:
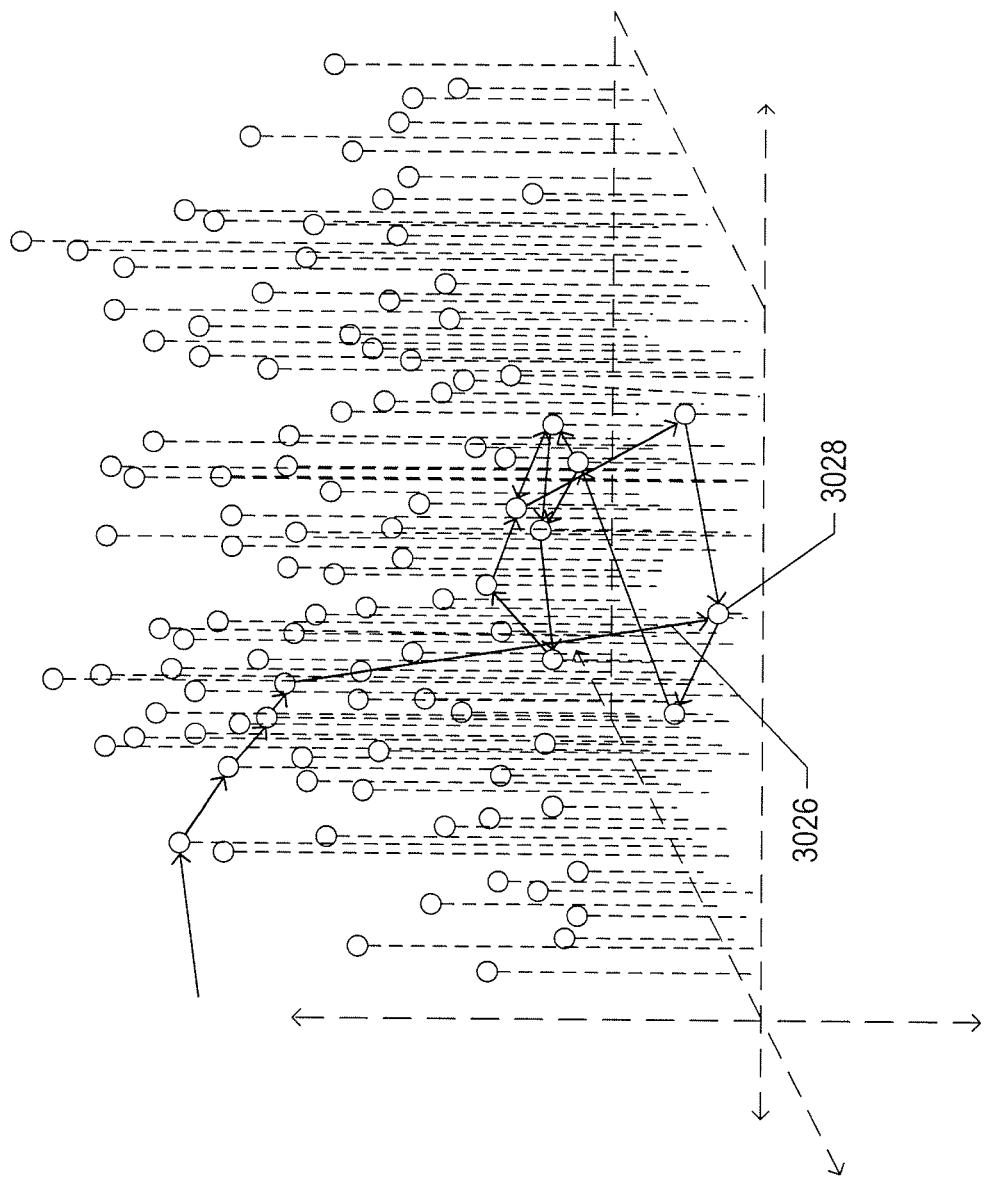

FIG. 30D illustrates a serious problem associated with the inevitable lack of experience of a conventionally trained automated reinforcement-learning-based application manager. In this example, the automated reinforcement-learning-based application manager arrives at system state 3020, during control of a computational environment, and then proceeds to issue actions that lead to subsequent system states 3022, 3023, and finally system state 3024. State 3024 has never yet been visited by the automated reinforcement-learning-based application manager, and therefore, depending on the type of control policy used, the automated reinforcement-learning-based application manager may only be able to randomly select a next action or attempt to infer the best action to select by considering information associated with another state that has been previously visited. When the control policy relies on parameterized functions, the parameterized function may be used to select a next action, but because the parameters were obtained from experience that did not include the current state, the parameterized function essentially infers of the next action from the limited experience acquired from visiting a limited subset of the states in the system-state space that do not include the current state. As a result, it is possible for the automated reinforcement-learning-based application manager to select a decidedly disadvantageous action that results in a very low reward and a transition to a very unfavorable state, as represented by transition 3026 and state 3028. At this point, because the trajectory is now in a region of system-state space that is likely to be extremely poorly represented by the current control-policy information, the automated reinforcement-learning-based application manager may spend many subsequent actions attempting to navigate back up to the desired, above-threshold state-space region 3030. As shown in FIG. 30E, in a worst case, the disadvantageous action 3026 and highly undesirable resulting state 3028 may lie in a region of system-state space from which the automated reinforcement-learning-based application manager is unable to extricate itself. This deficiency in conventional training methods is serious and difficult to address by obvious the remedial methods of extending the time of training or using multiple simulators or control/response data feedback acquired from multiple, different controlled computational environments.

Currently Disclosed Automated
Reinforcement-Learning-Based Application
Manager that Received Training Obtained by
Operations of One or More Different Automated
Reinforcement-Learning-Based Application
Managers Many different approaches for addressing the problems discussed in the previous subsection of this document with respect to conventional training have been considered. The current document is directed to an approach in which an automated reinforcement-learning-based application manager can be initialized with training obtained by prior operation of one or more different automated reinforcement-learning-based application managers. Were this approach to require that the automated reinforcement-learning-based application manager that is to be initialized with previously acquired training would need to control the same application within the same computing environment controlled by the one or more automated reinforcement-learning-based application managers which acquired the training, the approach would have relatively little practical use, since, in general, the types of applications for which automated-reinforcement-learning-based-application-manager control is desired are often complex and may significantly vary in component structure and implementation details between users and installations. Furthermore, even though of little practical use, transfer of training among automated reinforcement-learning-based application managers that control identical applications within identical computing environments would be quite straightforwardly achieved, in many cases, by simply importing state-value and state/action-value functions from an already trained automated reinforcement-learning-based application manager into a newly installed automated reinforcement-learning-based application manager. By contrast, transfer of training from one or more already operating automated reinforcement-learning-based application managers to a newly installed automated reinforcement-learning-based application manager intended to manage and control a different application and/or computing environment than those controlled by the already operating automated reinforcement-learning-based application managers is a more difficult problem, and one that has not been attempted to be addressed in many reinforcement-learning-based-controller contexts, since it would be expected that learned states-value and the state/action-value functions and other such information obtained through training would not be generally transferable.

Figure 31A:
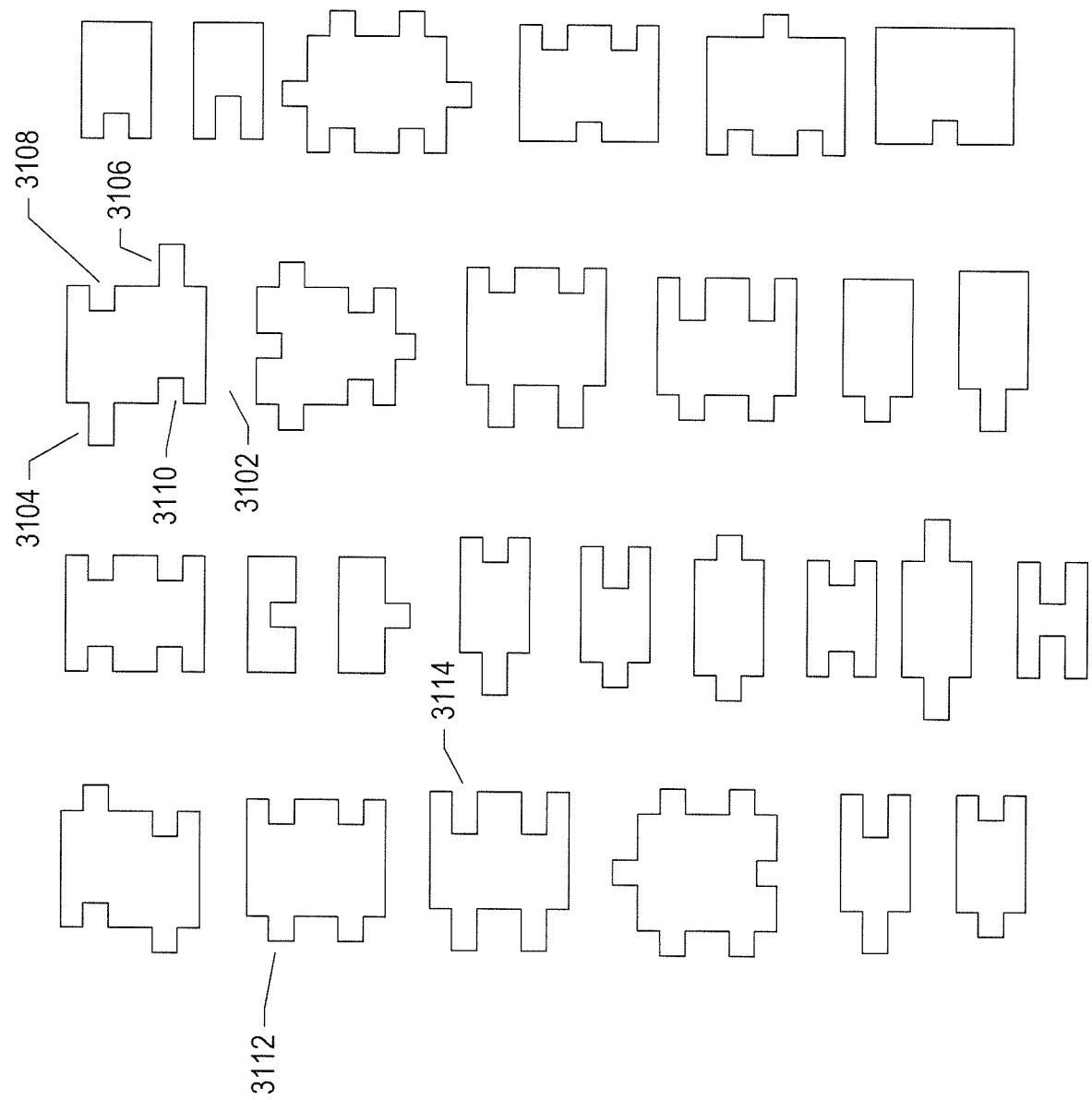
FIGS. 31A-B illustrate the concept of application composition using puzzle-piece-like application-component representations.
Figure 31B:
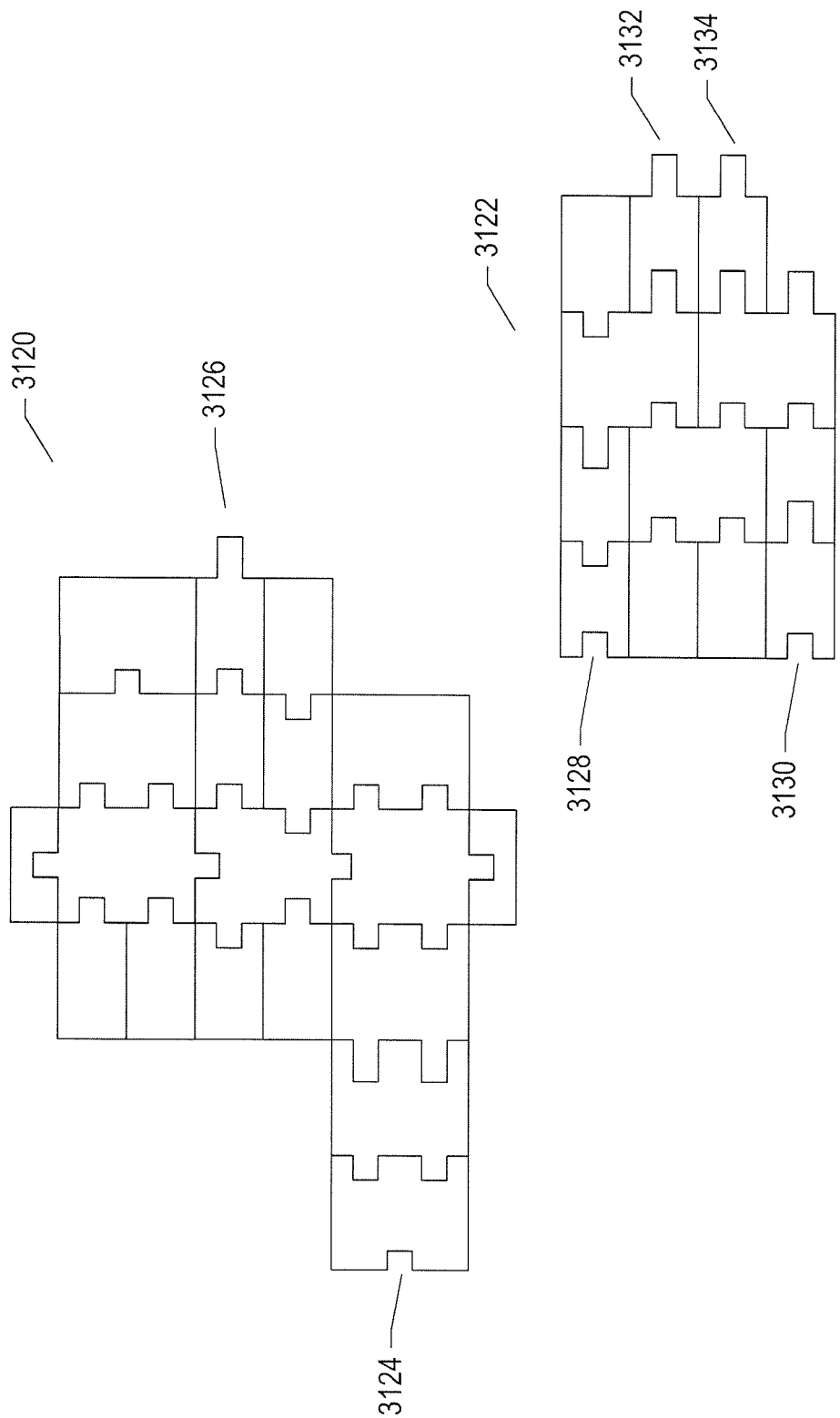

FIGS. 31A-B illustrate the concept of application composition using puzzle-piece-like application-component representations. Modern distributed applications, and even applications that run on standalone computing systems, are often quite complex, and incorporate many different types of components. For example, an e-commerce distributed application that runs within a distributed computing system may execute on a very large number of different physical servers, with the number of servers varying dynamically depending on the workload experienced by the distributed application, and may include front- and subcomponents responsible for communicating with remote clients, database-management-system components for storing large amounts of information, management components which provide various types of management interfaces to different types of personnel within the organization that owns and manages the distributed application, backend components that process various types of client requests, transaction subcomponents responsible for processing credit-card transactions, and many additional types of components. Each of these components may, in turn, incorporate or access additional lower-level components. FIG. 31 a illustrates a variety of different components that may be used to build applications. Each component is represented by a shape, such as component 3102, with protrusions, such as protrusions 3104 and 3106 representing outputs of the component and slots, such as slots 3108 and 3110 representing inputs. In this simple example, there are two different types of outputs, a first type of output represented by small protrusions, such as producing 3112, and a second type of output represented by longer protrusions, such as protrusion 3106. There are 2 differently sized types of complementary inputs, including input 3110 of the first type and input 3114 of the second. Each of the different components may perform different type or set of functions. As shown in FIG. 31B, different types of applications 3120 and 3122 can be generated by combining different sets of components with different structural organizations. The first application has a single input 3124 and a single output 3126 and includes 19 different components. The second type of application 3122 has two inputs 3128 and 3130, two outputs 3132 and 3134, and comprises 11 components. The components are combined by matching outputs, other than the output or outputs for the application, of each component to inputs of other contiguous components and inputs of each component, other than the input or inputs for the application, with outputs of other continuous components. A proper choice of components that produces a proper functional configuration generates a complex application comprising a set of interacting components that carry out high-level application functions composed of the functions provided by the different components. Thus, the current approach to application generation is highly modular, reflective of modern trends in computer science and engineering which stress reuse of modular components for building large, complex entities.

Figure 32:
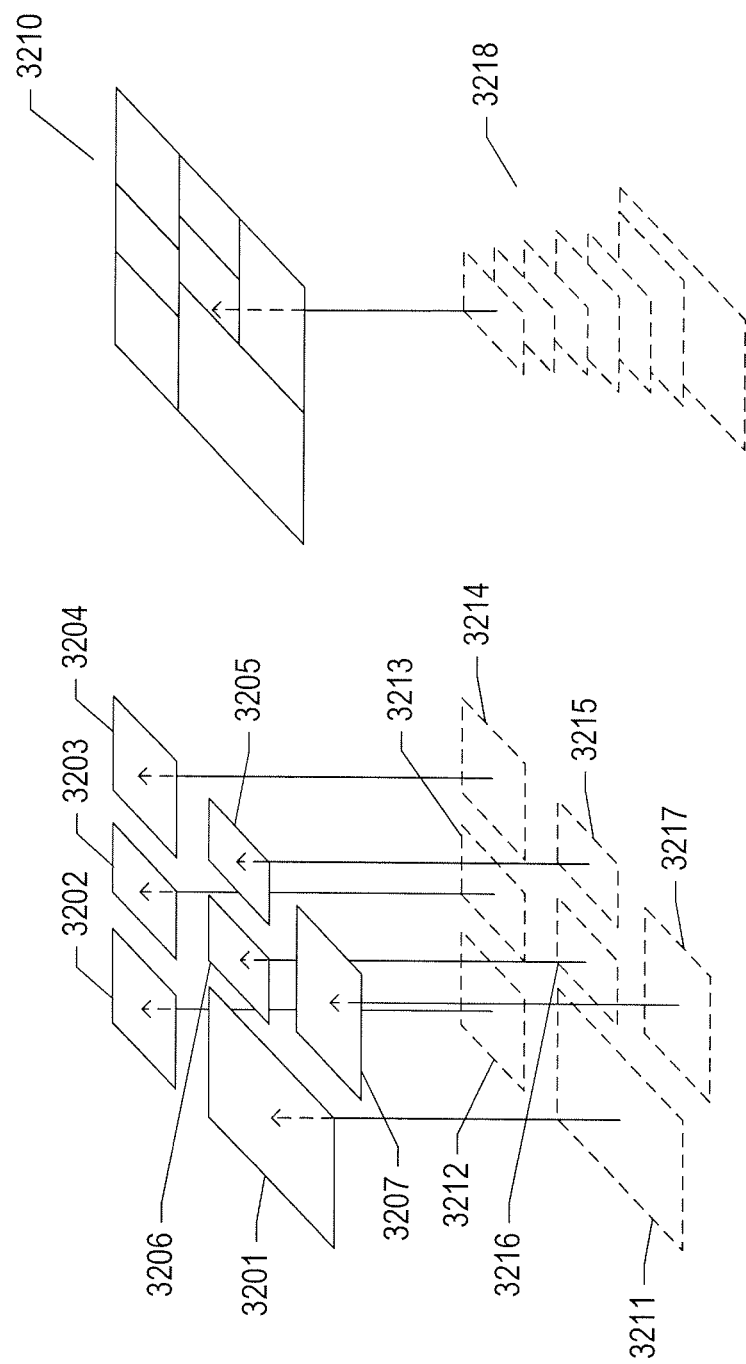
FIG. 32 illustrates a motivating factor for the currently disclosed approach to application generation.

FIG. 32 illustrates a motivating factor for the currently disclosed approach to application generation. In FIG. 32, seven different application components 3201-3207 are combined together to produce an application 3210. If it were possible to separately train automated reinforcement-learning-application managers to control the individual components, so that each component is associated with information obtained through training 3211-3217, and if it were somehow possible to combine this information obtained through training 3218 to generate training relevant to the application, the application 3210 could be generated complete with initial training, so that the application and initial training could be installed within a computing environment managed by an automated reinforcement-learning-application manager that could then be far more efficiently and rapidly trained up to the level required for live control. In other words, extensive training obtained through control of the application components could be reused along with those components in new applications generated from the components, so that many of the various state/action pairs in state/action space will be associated with values that can be used by policies, such as of the policies discussed in preceding sections of this document, that continuously select actions, either deterministically or stochastically, based on state/action-value functions. This would forestall the deleterious consequences of attempting live control of a computational environment by an insufficiently trained automated reinforcement-learning-based application manager, discussed above with reference to FIGS. 30D-E.

Figure 33:
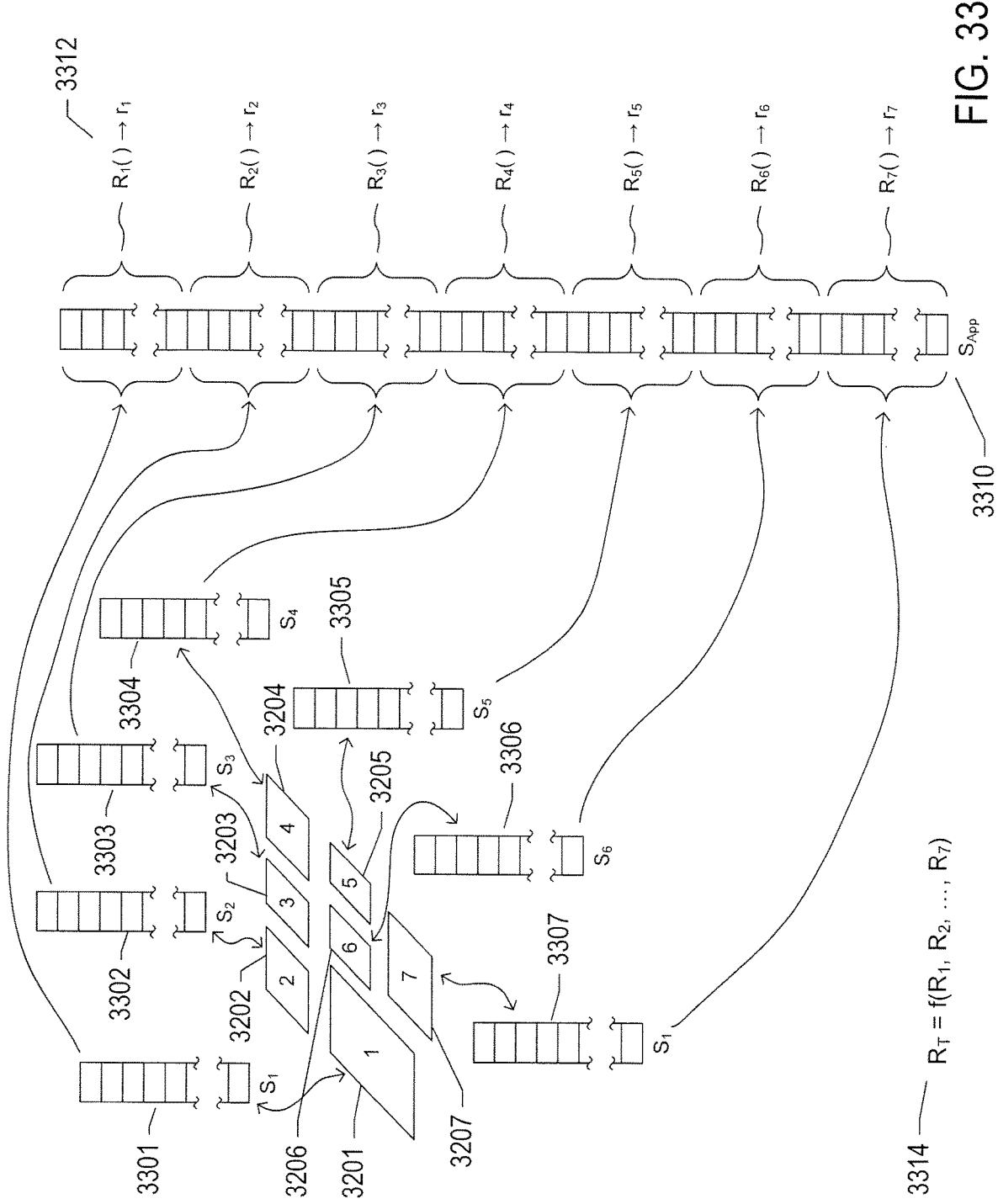
FIG. 33 illustrates one aspect of the currently disclosed approach that facilitates transfer of training associated with application components to applications generated from the components, as discussed above with reference to FIG. 32.

FIG. 33 illustrates one aspect of the currently disclosed approach that facilitates transfer of training associated with application components to applications generated from the components, as discussed above with reference to FIG. 32. When the separate components are associated with training information obtained from operation of various automated reinforcement-learning-based application managers, the automated reinforcement-learning-application managers have used state vectors associated with each of the components, such as state vectors 3301-3307 associated with components 3201-3207 of the example shown in FIG. 32, during control and reinforcement learning. When components 3201-3207 are combined together to generate application 3210, the individual state vectors for the components 3201-3207 can be combined together to generate a state vector for the application 3310. Moreover, when the automated reinforcement-learning-application managers received rewards based on separate reward functions during training, such as reward function 3312, reward function 3314 may be generated from the separate reward functions, including by a weighted linear combination of the rewards produced by the separate reward functions. In fact, as further discussed below, a reward function and state vector corresponding to application components can be extracted from training information obtained during control of an application containing the components by an automated reinforcement-learning based application manager. In other words, it is not necessary for the application component to have been controlled in isolation by an automated reinforcement-learning based application manager in order to determine a reward function and state vector corresponding to an application component from training information.

Figure 34:
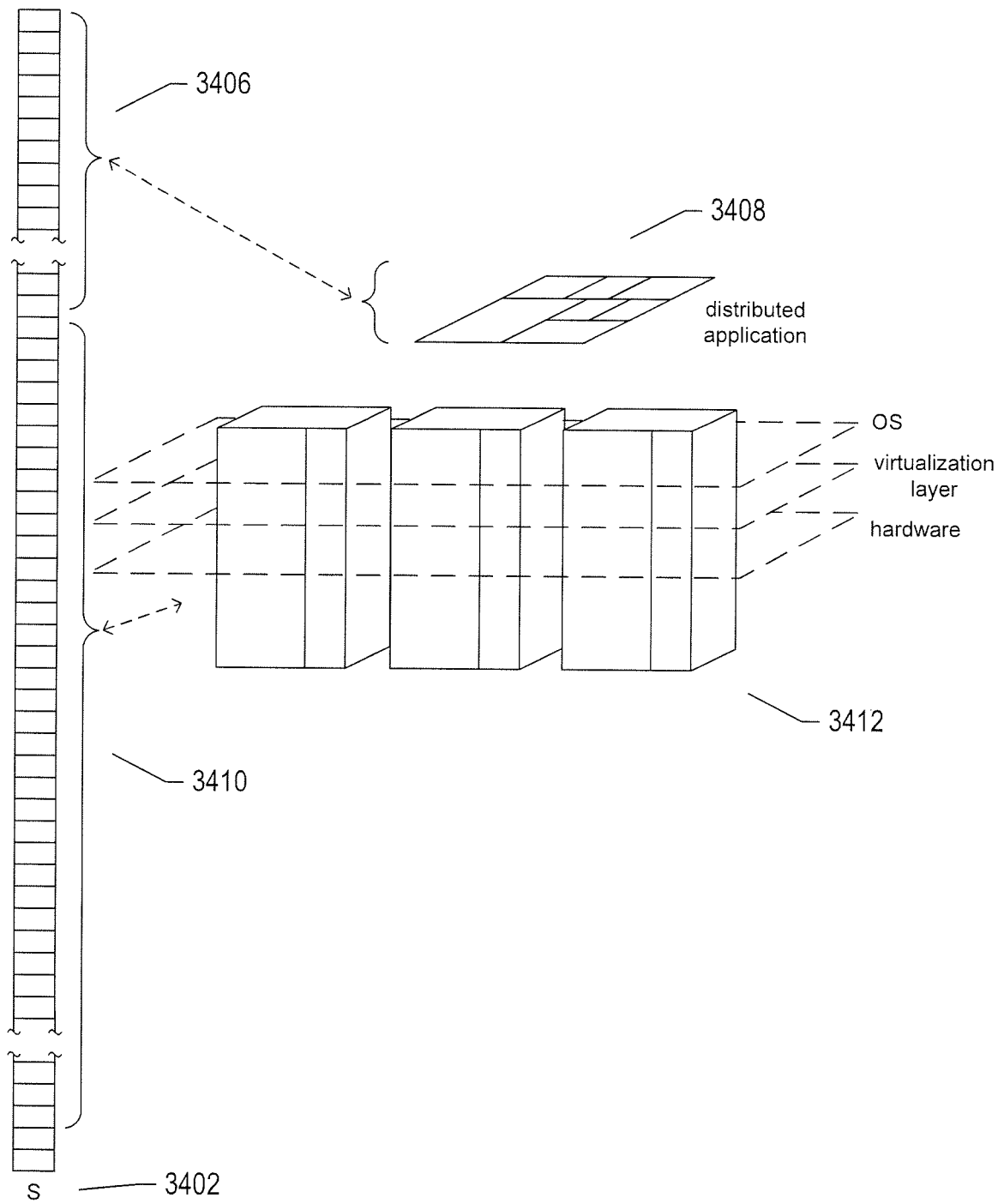
FIG. 34 illustrates composition of an entire state vector for a computing environment managed by an automated reinforcement-learning-based application manager.

FIG. 34 illustrates composition of an entire state vector for a computing environment managed by an automated reinforcement-learning-based application manager. As shown in FIG. 34, the entire state vector 3402 includes a portion 3406 corresponding to a distributed application 3408, and a second portion 3410 corresponding to the many different layers and components within a distributed computer system 3412. The elements in a native state vector may not be arranged to partition the state vector into separate regions, as shown in FIG. 34. However, the order of the elements can be changed in order to do so, or functions that extract elements of the state vector relevant to particular components can accomplish the same partitioning. It is possible that certain of the metrics within the state vector are composite metrics that depend on multiple layers of a computing environment or components, but such vectors may be arranged to occur in composite-metric sections that can be treated as components in a hierarchy of components, each corresponding to a logical sub-vector of the state vector. Just as application-component state vectors can be composed to form an application state vector, as shown in FIG. 33, many different state vectors corresponding to different components within complex component hierarchies can be hierarchically combined to form over larger state vectors that can ultimately be combined to form an overall state vector 3402. Thus, state vectors may decompose and compose in parallel to the decomposition and composition of complex applications and computational environments.

Figure 35:
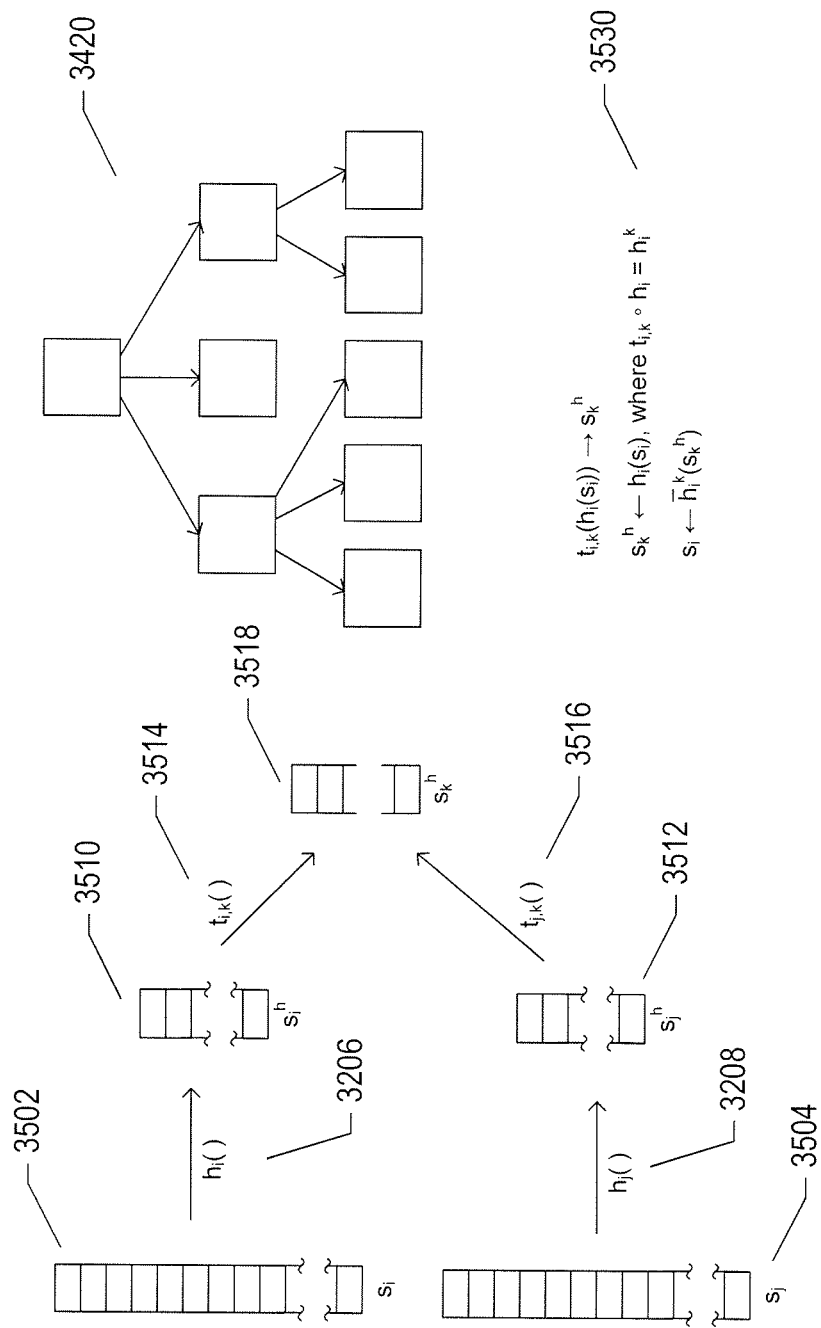
FIG. 35 illustrates the notion of hidden-state vectors.

FIG. 35 illustrates the notion of hidden-state vectors. It is common, in reinforcement-learning-based systems, for native state vectors to be projected into a lower-dimensional space of hidden-state elements. This projection may be accomplished by selecting particularly relevant metrics from the native state vectors or by more complex functional derivation of hidden-state-element values from multiple native-state-vector metrics and parameters. The hidden state is, in general, a more concise encapsulation of the state of system. FIG. 35 shows a first state vector 3502 associated with a first application or computing-environment component and the second state vector 3504 associated with a second application or computing-environment component. A hidden-state-vector function 3206 and 3208 can be applied to these two state vectors to produce corresponding hidden-state vectors 3510 and 3512, respectively. There is, as shown in FIG. 35, a different hidden-state-vector function for each of the two different state vectors, since the two different state vectors are assumed to contain at least some differences in elements, since they correspond to different application or computational-environment components. In addition, these two hidden-state vectors may be transformed, by transformation functions 3514 and 3516, respectively, to a corresponding hidden state vector 3518 for some other related component, such as a generic component for which the components associated with hidden-state vectors 3510 and 3512 are particular types. As an example, the generic component may be a database component while the components associated with hidden-state vectors 3510 and 3512 may be a relational-database component and an object-oriented-database component, respectively. These two components may themselves be generic components for which there are more particular examples, such as different relational databases produced by different relational-database vendors and different object-oriented databases produced by different object-oriented-database vendors. Related components may be hierarchically related, as often represented by a tree-like graph, such as tree-like graph 3520. For related components, it is generally possible to transform the state vector of one of the related components to a corresponding hidden-state vector of another of the related components by composition of the hidden-state-vector functions and transformation functions, as indicated in expressions 3530 in the lower portion of FIG. 35. These transformations are useful because, when the components are related, the training information required for one of the components may often be used for another of the components, as further discussed below.

Figure 36:
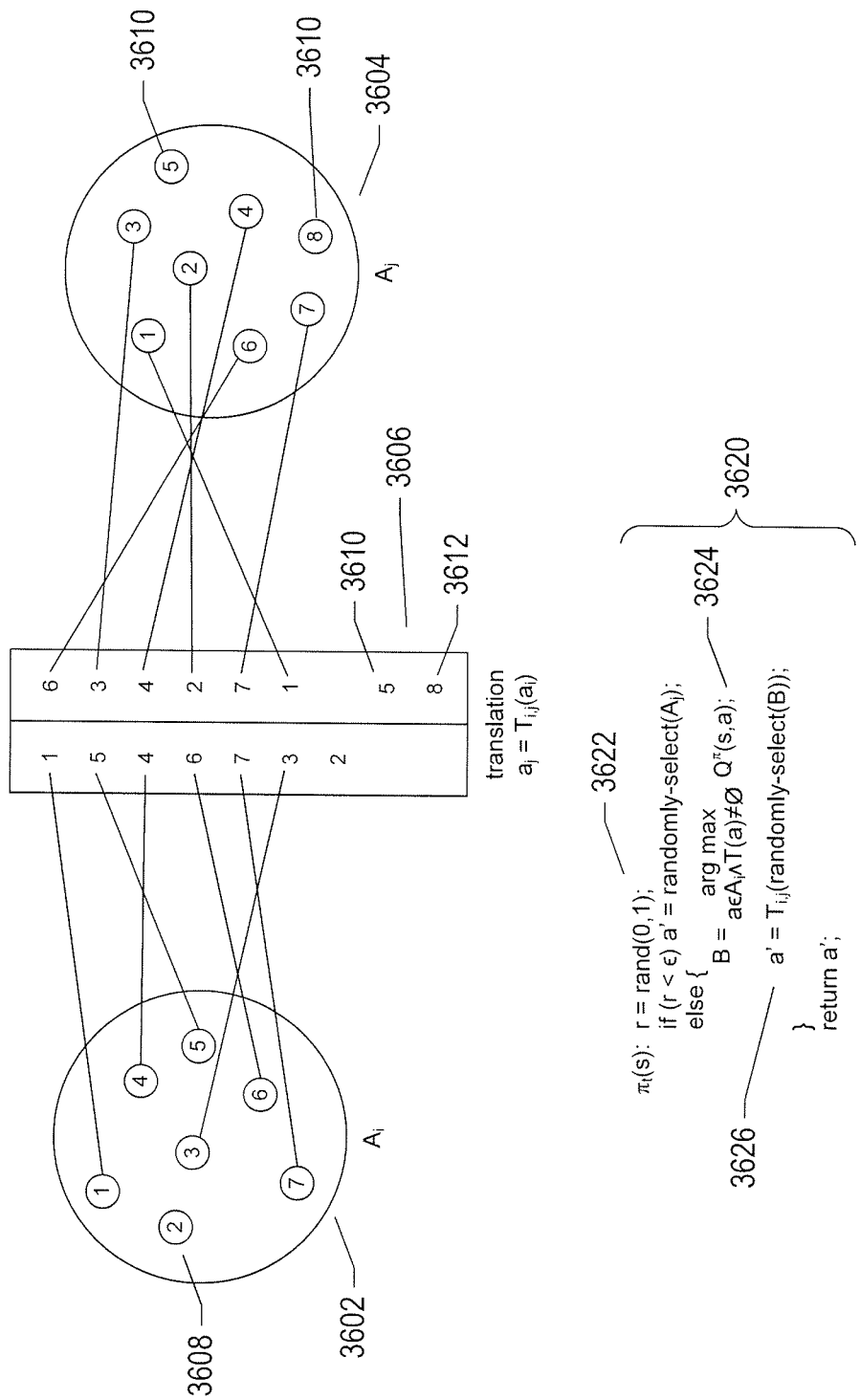
FIG. 36 illustrates action-set translation.

FIG. 36 illustrates action-set translation. In this example, two application or computing-environment components i and j are related and there is a transformation function, as discussed above with reference to FIG. 35, that can be used to transform a component-i state vector to a component-j hidden-state vector. This provides a partial basis for using training data associated with component i to initialize an automated reinforcement-learning-based application manager that will control a system that includes component j. The other necessary basis is for there to be a translation between the action sets the two components. Since they are related components, this is generally possible. In the example shown in FIG. 36, a simple action set 3602 is shown for component i and a simple action set 3604 is shown for component j. Table 3606 is a translation table that translates component-i actions to component-j actions. Most of the actions are directly translated, as represented by entries in the table with two numeric labels corresponding to the numeric labels of the corresponding actions in the two action sets. However, there is an action 3608 in the action set for component i that has no corresponding action in the action set for component j and there are two actions 3610 and 3612 in the action set for component j for which there are no role corresponding actions in the action set for component i. These can be seen to occupy entries in the translation table with only a single numeric label. However, complete correspondence is not required. An $\epsilon$-greedy-based control-policy function 3620 used during training of a newly instantiated automated reinforcement-learning-based application manager is shown in the lower portion of FIG. 36. This training control policy $\pi_t(\ )$ is used during initial training of the automated reinforcement-learning-based application manager into which previously-obtained training information is incorporated by the currently disclosed method. The initial training provides for learning of state/action values for state/action pairs that include actions in the action set for component j for which there are no corresponding actions in the action set for component i, for example. In the training control policy, a random number r is first obtained from a pseudorandom number generator 3622. When r is less than $\epsilon$, a new action is randomly selected from the action set of component j, which, as discussed above, represents a selection made for state/action-space exploration. Otherwise, the action set B is set to contain those actions in the action set of component i for which the action/state values for the current state are maximum and for which translations to corresponding actions in the action set of component j are available 3624. The next action is then randomly selected from the action set B and translated to a corresponding component-j action 3626. Thus, during initial training of the automated reinforcement-learning-based application manager into which previously-obtained training information is incorporated, the lack of complete correspondence between the action sets of component j, included in the application to be managed, and component i, for which training data is available and incorporated into the newly installed automated reinforcement-learning-based application manager is handled by state/action-space exploration.

Figure 37:
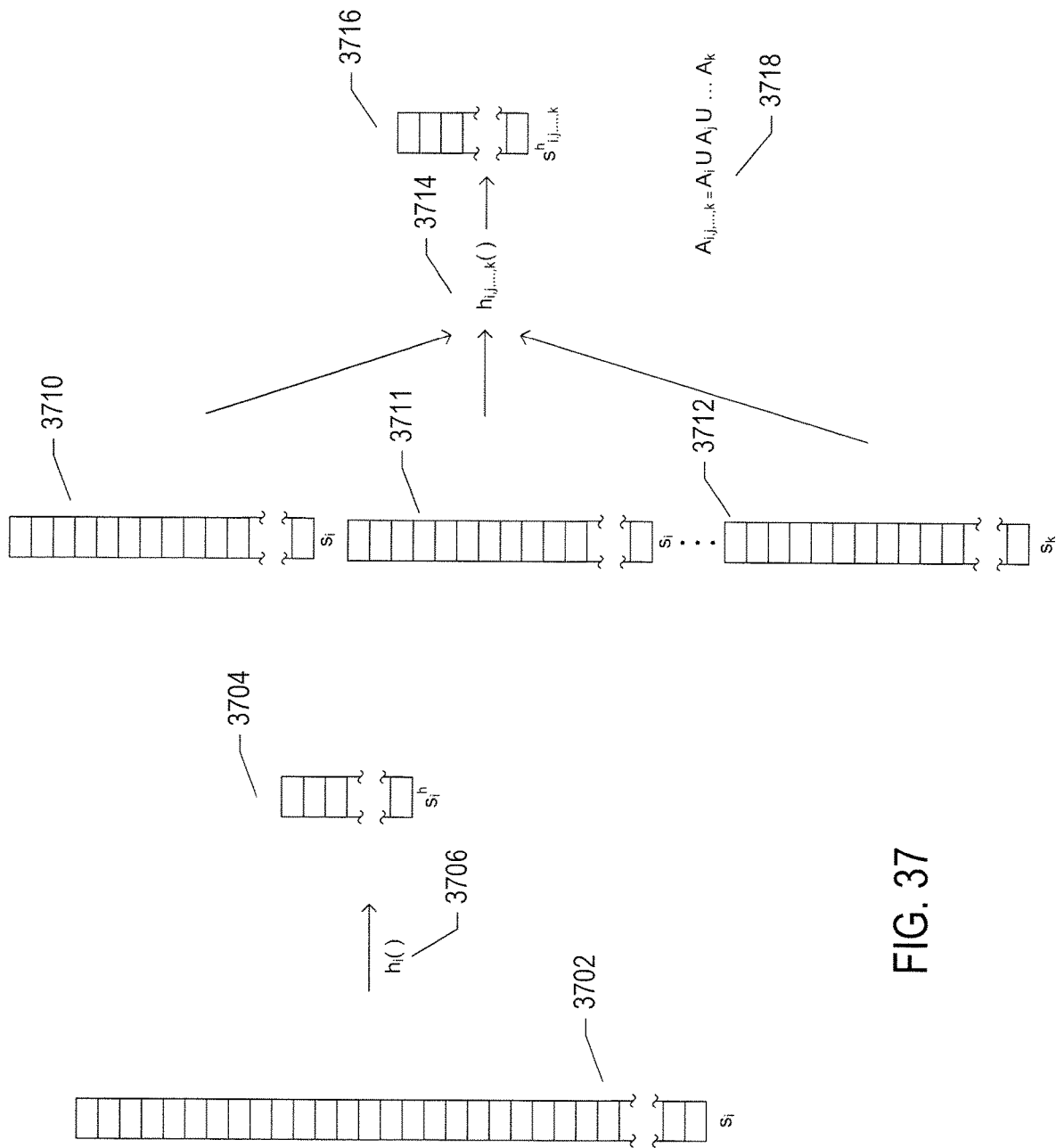
FIG. 37 illustrates component combination with respect to hidden-state vectors.

FIG. 37 illustrates component combination with respect to hidden-state vectors. As discussed above, the action vector for a given component 3702 can be transformed to a hidden-state vector 3704, generally of significantly lower dimensionality, by a hidden-state-vector function 3706. In many cases, different components are often combined, as subcomponents, into a higher-level component, as a result of which the higher-level component may be associated with a hidden-state vector that encompasses the relevant information from the corresponding state vectors of the subcomponents. Thus, the state vectors for a set of components i, j, . . . , k 3710-3712 may be provided, as arguments, to a hidden-state-vector function 3714 that produces a hidden-state vector 3716 for the entire the union of the action sets for the subcomponents component that includes the subcomponents i, j, . . . , k. In certain cases, the action set for the higher-level component may be the union of the action sets for the subcomponents 3718. In other cases, the action set for the higher-level component may differ from the union of the action sets for the subcomponents. However, by using hidden-state vectors for components rather than separate hidden-state vectors for the subcomponents of the components, the overall dimensionality of the final state vector for the entire system (3402 in FIG. 34) can be substantially reduced, which, in turn, greatly reduces the computational overheads associated with reinforcement-learning-based control and learning. Moreover, it is possible to use training information obtained for a higher-level component of subcomponents for a different component for which some of the subcomponents lack training data, using the methods discussed above with reference to FIGS. 35-36.

Figure 38:
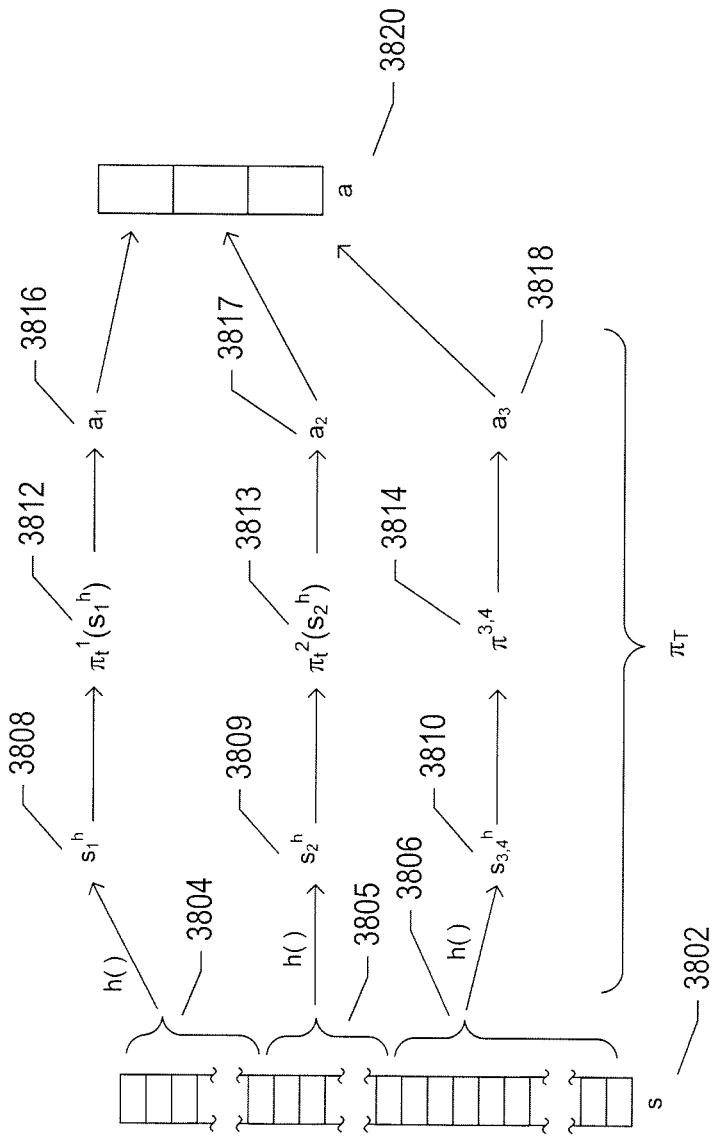
FIG. 38 illustrates a training policy-control function $\pi_T(\ )$ used in one implementation of the currently disclosed automated reinforcement-learning-based application manager, into which previously-obtained training data is incorporated, during initial training.

FIG. 38 illustrates a training policy-control function $\pi_T(\ )$ used in one implementation of the currently disclosed automated reinforcement-learning-based application manager, into which previously-obtained training data is incorporated, during initial training. As discussed above, the state vector for the computational environment, including the controlled application 3802, can be ordered so that the state vector is partitioned into sub-state vectors 3804 for which corresponding hidden-state vectors 3808-3810 can be generated using corresponding hidden-state-vector functions. Although the example in FIG. 38 shows only three sub-state vectors, in an actual system, there may be considerably more. The component hidden-state vectors can each be input to a corresponding policy-control function 3812-3814 to generate a next action 3816-3818 for the subcomponents. These next actions can be coalesced into a multi-component resultant action 3820 that can be issued to the managed computing environment by the automated reinforcement-learning-based application manager. The component-associated policy-control functions 3812-3814 can be extracted from the training information obtained by previously operating automated reinforcement-learning-based application managers controlling computational environments that include the components. The extraction process, of course, depends on the type of policy-control function. In the case of the $\epsilon$-greedy policy-control functions used in previous examples, the needed information is the component-associated state/action-value functions that can be extracted from the state/action-value functions for the entire managed environment. In the example shown in FIG. 38, the policy-control functions 3812 and 3813 are policy control functions of the type shown in FIG. 36, since the imported training data for the associated components was obtained from non-identical, related components. The policy-control function 3814 is a policy-control function for a component composed of subcomponents directly obtained from previously acquired training data, which requires no action translation and no additional exploration for not translatable actions. Additionally, policy-control functions for components for which training information is available may be simple, static, deterministic or stochastic policy-control functions that represent optical or near-optimal policies for the component learned during previous operation of an automated reinforcement-learning-based application manager. It should be noted that, in the current implementation, all of the policy-control functions are static. It is assumed that these policy-control functions have been optimized during previous training. They are initially used, during training of the automated reinforcement-learning-based application manager which incorporates the previously obtained training information, to short-circuit the extensive amount of training that would otherwise be needed to learn initial control policies. In alternative implementations, the policy-control functions may be dynamic, with updates made both to policy control functions and to state-value and/or state/action-value functions being learned for control policies that subsequently replace them. In alternative implementations, multiple automated reinforcement-learning-based application managers may be simultaneously trained from a shared component model, with updates being shared, during initial training, by the multiple automated reinforcement-learning-based application managers.

Figure 39:
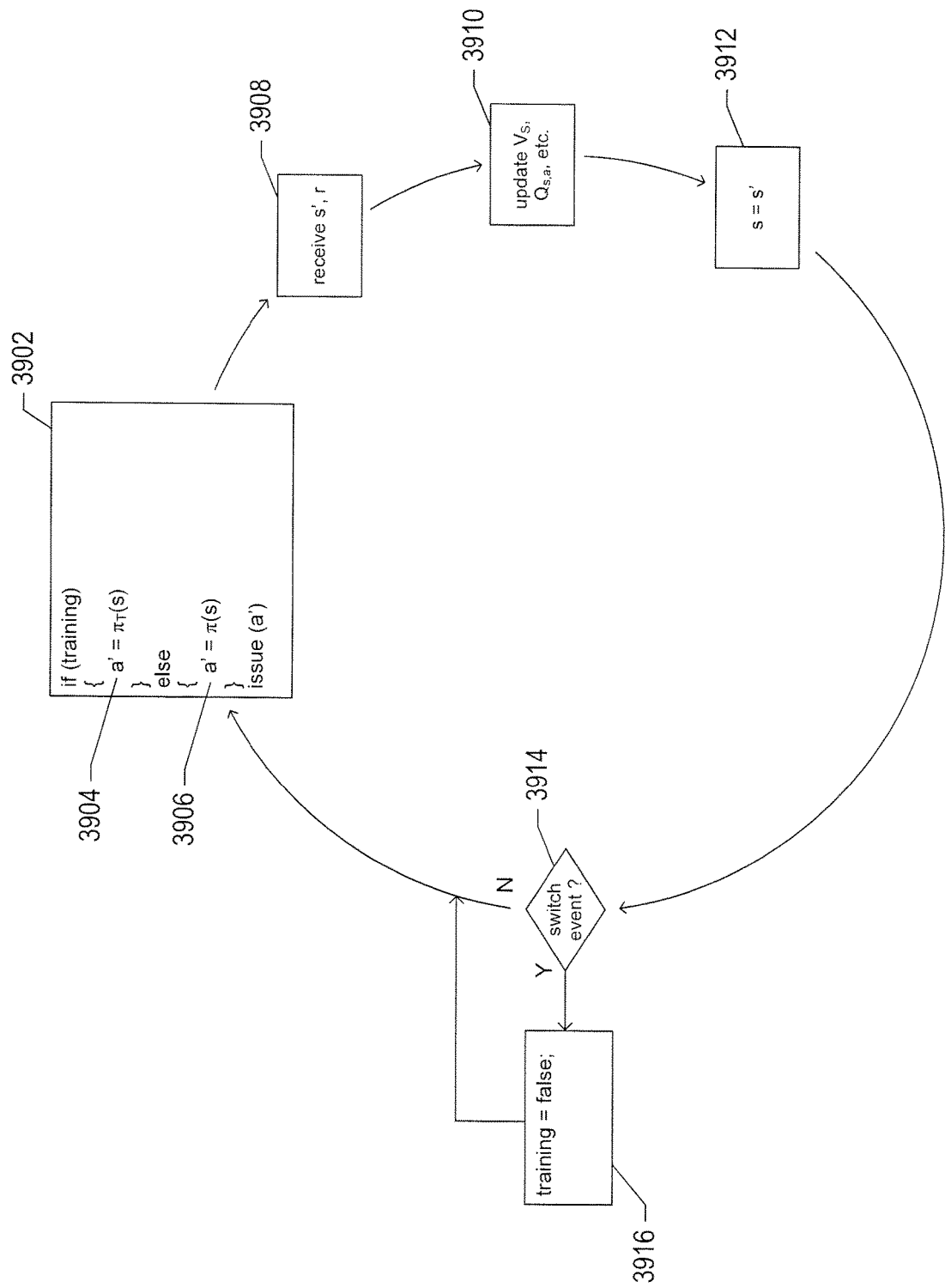
FIG. 39 shows an abbreviated automated-reinforcement-learning-based-application-manager control loop for an automated-reinforcement-learning-based application manager that can be initialized with previously-obtain training information. Each cycle begins with step 3902.

FIG. 39 shows an abbreviated automated-reinforcement-learning-based-application-manager control loop for an automated-reinforcement-learning-based application manager that can be initialized with previously-obtain training information. Each cycle begins with step 3902. During training, the training control policy, discussed above with reference to FIG. 38, is used to select a next action 3904. When initial training is finished, a final, conventional control policy is used to select the next action 3906. In step 3908, the managed environment returns a new state vector and reward. The reward, during training, is generated by a composite reward function, as discussed above with reference to FIG. 33. In step 3910, the various state-value and state/action-value functions are updated and, in step 3912, the current state is set to the state received in 3908. When a switch event occurs, as determined in step 3914, the variable training is set to "false," in step 3916, to discontinue use of the training control policy. In addition, depending on the implementation, certain of the information obtained through previous training may be merged with the new state-value and state/action-value information obtained during initial training of the automated-reinforcement-learning-based application manager and a new reward function may be substituted for the composite reward function used during training.

Figure 40:
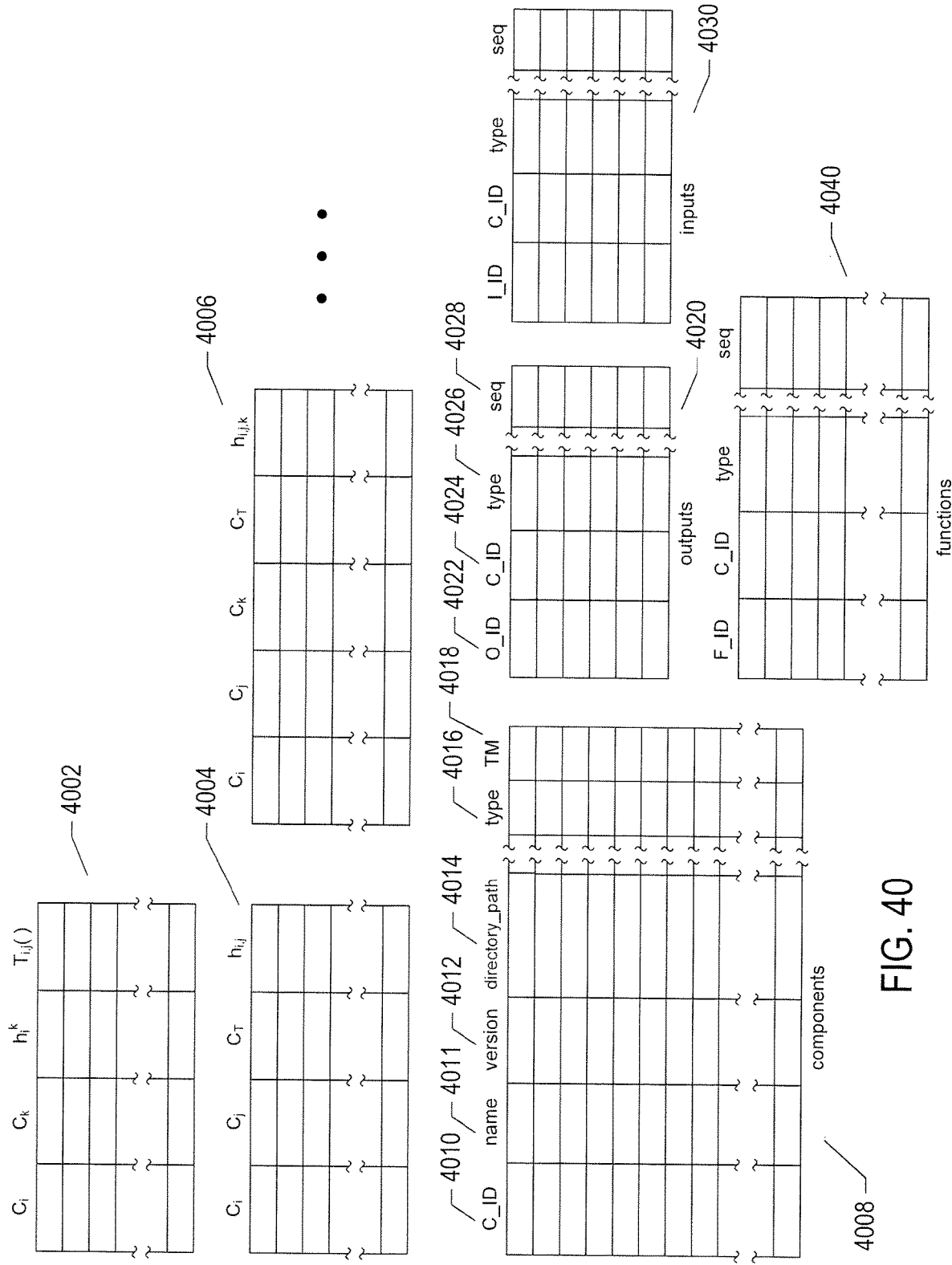
FIG. 40 illustrates the types of information that may be maintained to facilitate automated application generation and training-information transfer according to the currently disclosed methods and systems.

FIG. 40 illustrates the types of information that may be maintained to facilitate automated application generation and training-information transfer according to the currently disclosed methods and systems. A relational-database model is assumed for storing the information in the example shown in FIG. 40. There may be tables to contain the information, discussed above with reference to FIG. 35, for generating a hidden-state vector for a first component from the state vector of a related component 4002. Additional tables 4004 and 4006 contain the hidden-state-vector functions, or references to hidden-state-vector functions, for components composed of subcomponents, as discussed above with reference to FIG. 37. In addition, an entry for component may be stored in a table "components" 4008, with the entry containing fields that specify an identifier for the component 4010, a name for the component 4011, a version for the component 4012, a directory path for component executables, descriptions, training data, and other information needed for incorporating the component into an application 4014, a component type 4016, and an indication of whether or not training data is available for the component 4018. An "outputs" table 4020 contains an entry for each output for each component, each entry including an output identifier 4022, the identifier for the component 4024, an output type 4026, and a sequence number for the output 4028. Similarly, the table "inputs" 4030 contains information for the inputs for each component. Finally, the table "functions" 4040 contains information about the various functions provided by the component.

Figure 41:
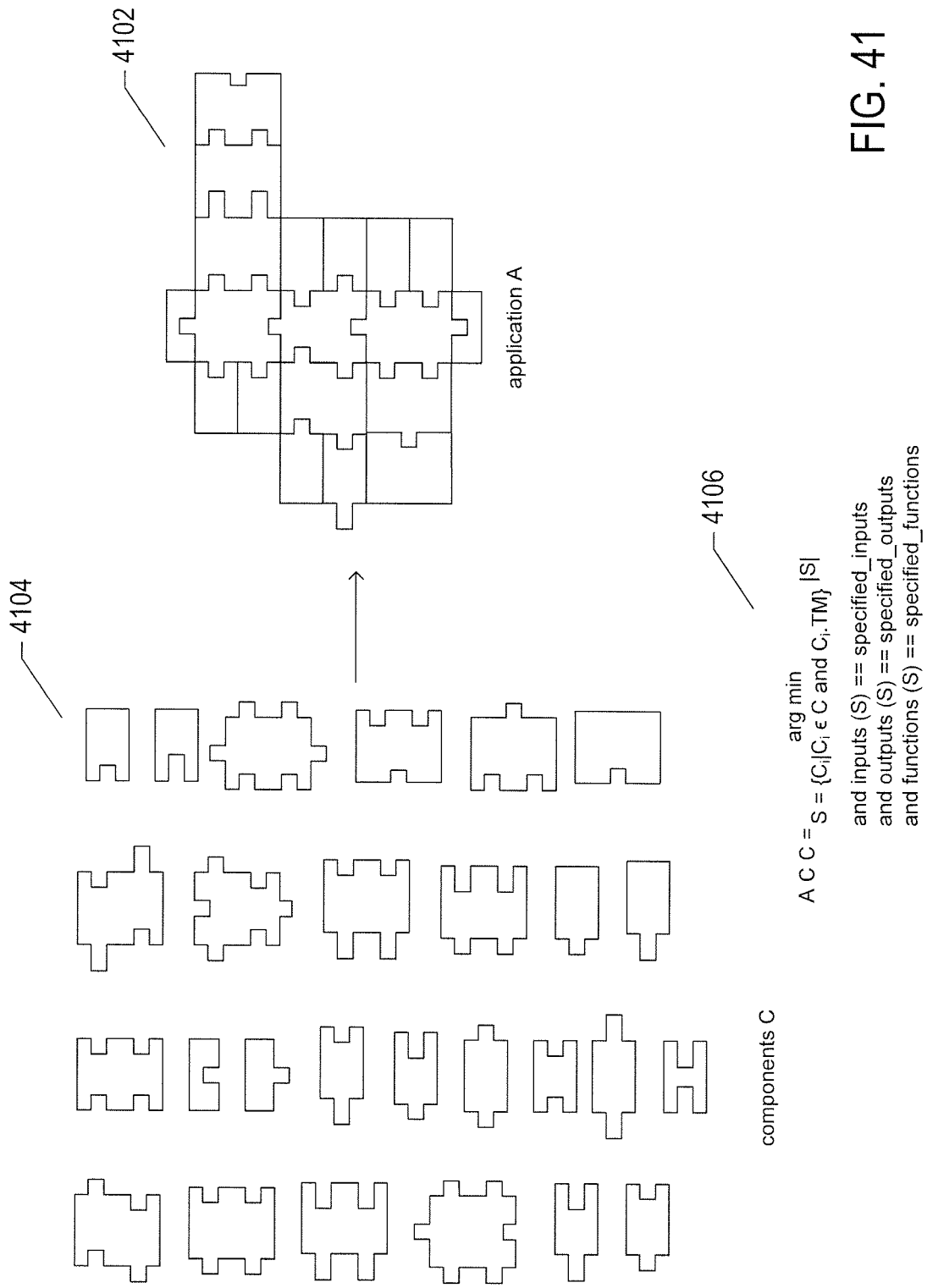
FIG. 41 illustrates the application-generation process using the illustration conventions used previously in FIGS. 31A-B.

FIG. 41 illustrates the application-generation process using the illustration conventions used previously in FIGS. 31A-B. An application 4102 is generated from a set of modular application components 4104 using information such as information discussed above with reference to FIG. 40. The automated application-generation process may use any of many different techniques to carry out what amounts to an optimization problem 4106 in which a set of application components and a structural organization for the set of application components is selected that produces, when combined, a specified set of outputs and a specified set of inputs as well as a specified set of functions, and does so with the minimum number of components. In order for training information associated with the components to be transferable to the automated reinforcement-learning-based application manager that will be instantiated to control the application, the application-generation method preferably employs components for which training data is available. When this is not possible, the additional techniques discussed above can be used to substitute training data for related components. The above-discussed methods additionally allow for transfer of training data when there is no training data available for certain of the components of the application, since, as discussed above, appropriate state/action values relevant to such components can be learned by subsequent training of the automated reinforcement-learning-based application manager.

Although the present invention has been described in terms of particular embodiments, it is not intended that the invention be limited to these embodiments. Modification within the spirit of the invention will be apparent to those skilled in the art. For example, any of a variety of different implementations of the currently disclosed reinforcement-learning-based application manager that uses local agents can be obtained by varying any of many different design and implementation parameters, including modular organization, programming language, underlying operating system, control structures, data structures, and other such design and implementation parameters. As discussed above, many different implementations and variations in addition to the implementations discussed above are possible both for adversarial training of automated reinforcement-learning-based application managers.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. An automated reinforcement-learning-based application manager that manages a computing environment that includes one or more applications and one or more of a distributed computing system having multiple computer systems interconnected by one or more networks, a stand-alone computer system, and a processor-controlled user device, the reinforcement-learning based application manager comprising:
one or more processors, one or more memories, and one or more communications subsystems;
a set of actions A that can be issued to the computing environment; and
an iterative control process that repeatedly
when initial training is not occurring,
selects and issues a next action to the computing environment according to a control policy that uses a state vector that represents a current state of the computational environment,
when initial training is occurring,
selects and issues a next action to the computing environment according to a training control policy that uses a state vector that represents a current state of the computational environment and training information incorporated into the automated reinforcement-learning-based application manager that was acquired by a different automated reinforcement-learning-based application manager, and
receives, from the computing environment, a next state and a reward, which the control process uses to attempt to learn an optimal or near-optimal control policy.

2. The automated reinforcement-learning-based application manager of claim 1 wherein the training control policy uses a state vector that represents a current state of the computing environment and training information incorporated into the automated reinforcement-learning-based application manager to select a next action by:
generating a hidden-state vector for each of multiple components of the computing environment;
applying, to each hidden-state vector, a component-associated control policy for the component of the computing environment for which the hidden-state vector was generated to select an action; and
combining one or more of the actions selected by the component-associated control policies to produce the next action.

3. The automated reinforcement-learning-based application manager of claim 2 wherein the component-associated control policies include:
component-associated control policies associated with components for which training data for related components has been incorporated into the automated reinforcement-learning-based application manager;
static deterministic or stochastic component-associated control policies associated with components for which training data has been incorporated into the automated reinforcement-learning-based application manager; and
static deterministic or stochastic component-associated control policies associated with components comprising subcomponents for which training data has been incorporated into the automated reinforcement-learning-based application manager.

4. The automated reinforcement-learning-based application manager of claim 3 wherein the component-associated control policies associated with components for which training data for related components has been incorporated into the automated reinforcement-learning-based application manager employing exploratory action selection from an action set corresponding to the component.

5. The automated reinforcement-learning-based application manager of claim 2 wherein generating a hidden-state vector for each of multiple components of the computing environment further comprises:
decomposing the computing environment into components;

decomposing the state vector into component subvectors, each component subvector corresponding to a computing-environment component; and applying a hidden-state-vector function to each component subvector to generate the hidden-state vector.

6. The automated reinforcement-learning-based application manager of claim 1 wherein initial training is discontinued after the automated reinforcement-learning-based application manager has learned a near-optimal or optimal control policy for the computing environment.

7. A method for transferring training data from one or more trained automated reinforcement-learning-based application managers to a target automated reinforcement-learning-based application manager that manages a computing environment that includes one or more applications and one or more of a distributed computing environment having multiple computer systems interconnected by one or more networks, a standalone computer system, and a processor-controlled user device, the automated reinforcement-learning-based application manager having one or more processors, one or more memories, one or more communications subsystems, and a set of actions A that can be issued to the computing environment, the method comprising:

decomposing the computing into components;
identifying training data for each of the components;
incorporating the identified training data into the target automated reinforcement-learning-based application manager; and
iteratively, by an iterative control process,
  selecting and issuing a next action to the computing environment according to a control policy that uses a state vector that represents a current state of the computational environment and the training information incorporated into the automated reinforcement-learning-based application manager, and
  receiving, from the computing environment, a next state and a reward, which the control process uses to attempt to learn an optimal or near-optimal control policy.

8. The method of claim 7 wherein the control policy comprises multiple component-associated control policies, each component-associated control policy selecting actions from a set of actions issuable to the component associated with the component-associated control policy.

9. The method of claim 8 wherein selecting and issuing a next action further comprises:

decomposing the state vector into subvectors, each subvector corresponding to one of the components;
generating a hidden-state vector from each state vector;
applying, to each hidden-state vector, a component-associated control policy; and
combining one or more of the actions selected by the component-associated control policies to produce the next action.

10. The method of claim 9 wherein the component-associated control policies include:

component-associated control policies associated with components for which training data for related components has been incorporated into the automated reinforcement-learning-based application manager;
static deterministic or stochastic component-associated control policies associated with components for which training data has been incorporated into the automated reinforcement-learning-based application manager; and
static deterministic or stochastic component-associated control policies associated with components comprising subcomponents for which training data has been incorporated into the automated reinforcement-learning-based application manager.

11. The method of claim 9 wherein the reward is computed by a functional composition of reward functions for each of the components.

12. The method of claim 9 wherein the training data comprises one or more of state-value functions and state/action-value functions.

13. A method that generates a new application for management by a target automated reinforcement-learning-based application manager that manages a computing environment that includes the new application and one or more of a distributed computing environment having multiple computer systems interconnected by one or more networks, a standalone computer system, and a processor-controlled user device, the automated reinforcement-learning-based application manager having one or more processors, one or more memories, one or more communications subsystems, and a set of actions A that can be issued to the computing environment, the method comprising:

carrying out an optimization method to select, based on an application specification, stored component information, and a set of constraints, a set of components from which the application is assembled;
incorporating the new application into the computing environment;
for each component associated with training data obtained during control of the component by an automated reinforcement-learning-based application manager, incorporating the identified training data into the target automated reinforcement-learning-based application manager; and
launching operation of the target automated reinforcement-learning-based application manager.

14. The method of claim 13 wherein the set of constraints includes:

maximizing the number of components associated with training data; and
minimizing the number of components.

15. The method of claim 13 wherein the target automated reinforcement-learning-based application manager
iteratively, by an iterative control process,
  selects and issues a next action to the computing environment according to a control policy that uses a state vector that represents a current state of the computational environment and the training information incorporated into the automated reinforcement-learning-based application manager, and
  receives, from the computing environment, a next state and a reward, which the control process uses to attempt to learn an optimal or near-optimal control policy.

16. The method of claim 15 wherein the control policy comprises multiple component-associated control policies, each component-associated control policy selecting actions from a set of actions issuable to the component associated with the component-associated control policy.

17. The method of claim 16 wherein selecting and issuing a next action further comprises:

decomposing the state vector into subvectors, each subvector corresponding to one of the components;
generating a hidden-state vector from each state vector;
applying, to each hidden-state vector, a component-associated control policy; and combining one or more of the actions selected by the component-associated control policies to produce the next action.

18. The method of claim 17 wherein the component-associated control policies include:
    component-associated control policies associated with components for which training data for related components has been incorporated into the automated reinforcement-learning-based application manager;
    static deterministic or stochastic component-associated control policies associated with components for which training data has been incorporated into the automated reinforcement-learning-based application manager; and
    static deterministic or stochastic component-associated control policies associated with components comprising subcomponents for which training data has been incorporated into the automated reinforcement-learning-based application manager.

19. The method of claim 17 wherein the reward is computed by a functional composition of reward functions for each of the components.

20. The method of claim 17 wherein the training data comprises one or more of state-value functions and state/action-value functions.

21. A physical data-storage device encoded with computer instructions that, when executed by one or more processors of a computer system that implements an automated reinforcement-learning-based application manager having one or more processors, one or more memories, one or more communications subsystems, a set of actions A that can be issued to a computing environment, controls the automated reinforcement-learning-based application manager to:
    iteratively, by an iterative control process,
        selecting and issuing a next action to the computing environment according to a control policy that uses a state vector that represents a current state of the computational environment and the training information incorporated into the automated reinforcement-learning-based application manager, and
        receiving, from the computing environment, a next state and a reward, which the control process uses to attempt to learn an optimal or near-optimal control policy.

* * * * *